United States Patent
Yokoyama et al.

(10) Patent No.: US 11,680,303 B2
(45) Date of Patent: *Jun. 20, 2023

(54) STEEL SHEET AND MANUFACTURING METHOD THEREFOR

(71) Applicant: NIPPON STEEL CORPORATION, Tokyo (JP)

(72) Inventors: Takafumi Yokoyama, Tokyo (JP); Riki Okamoto, Tokyo (JP); Kohichi Sano, Tokyo (JP); Hiroyuki Kawata, Tokyo (JP); Kohei Ueda, Tokyo (JP); Eisaku Sakurada, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 363 days.

This patent is subject to a terminal disclaimer.

(21) Appl. No.: 16/982,003

(22) PCT Filed: Mar. 30, 2018

(86) PCT No.: PCT/JP2018/013791
§ 371 (c)(1),
(2) Date: Sep. 17, 2020

(87) PCT Pub. No.: WO2019/187060
PCT Pub. Date: Oct. 3, 2019

(65) Prior Publication Data
US 2021/0017620 A1    Jan. 21, 2021

(51) Int. Cl.
*C21D 9/46* (2006.01)
*C21D 8/02* (2006.01)
(Continued)

(52) U.S. Cl.
CPC ............. *C21D 9/46* (2013.01); *B32B 15/013* (2013.01); *C21D 6/001* (2013.01); *C21D 6/002* (2013.01);
(Continued)

(58) Field of Classification Search
None
See application file for complete search history.

(56) References Cited

U.S. PATENT DOCUMENTS 11,377,710 B2 * 7/2022 Yokoyama .............. C22C 38/40
11,447,848 B2 * 9/2022 Yokoyama .............. C22C 38/58
(Continued)

FOREIGN PATENT DOCUMENTS

| JP | 6-128688 A | 5/1994 |
| JP | 2003-193193 A | 7/2003 |

(Continued)

OTHER PUBLICATIONS

"Metallic materials—Hole expanding test", JIS Z 2256, (2010), total of 9 pages.
(Continued)

*Primary Examiner* — Xiaowei Su
(74) *Attorney, Agent, or Firm* — Birch, Stewart, Kolasch & Birch, LLP

(57) ABSTRACT

This steel sheet has a predetermined chemical composition, in which a steel structure of an inside of the steel sheet contains, by volume fraction, soft ferrite: 0% to 30%, retained austenite: 3% to 40%, fresh martensite: 0% to 30%, a sum of pearlite and cementite: 0% to 10%, and a remainder includes hard ferrite, a number proportion of the retained austenite having an aspect ratio of 2.0 or more in the total retained austenite is 50% or more, a soft layer having a thickness of 1 to 100 μm from a surface in a sheet thickness direction is present, in ferrite contained in the soft layer, a volume fraction of grains having an aspect ratio of 3.0 or more is 50% or more, a volume fraction of retained austenite in the soft layer is 80% or less of the volume fraction of the retained austenite in the inside of the steel sheet, and a peak of an emission intensity at a wavelength indicating Si
(Continued)

appears in a range of more than 0.2 μm and 10.0 μm or less from the surface.

10 Claims, 4 Drawing Sheets

(51) Int. Cl.
    *C21D 6/00*     (2006.01)
    *C23C 2/06*     (2006.01)
    *C23C 2/40*     (2006.01)
    *C22C 38/00*     (2006.01)
    *B32B 15/01*     (2006.01)
    *C22C 38/02*     (2006.01)
    *C22C 38/04*     (2006.01)
    *C22C 38/06*     (2006.01)
    *C22C 38/08*     (2006.01)
    *C22C 38/10*     (2006.01)
    *C22C 38/12*     (2006.01)
    *C22C 38/14*     (2006.01)
    *C22C 38/16*     (2006.01)
    *C22C 38/18*     (2006.01)
    *C22C 38/60*     (2006.01)

(52) U.S. Cl.
    CPC ............ *C21D 6/005* (2013.01); *C21D 6/007* (2013.01); *C21D 6/008* (2013.01); *C21D 8/0205* (2013.01); *C21D 8/0226* (2013.01); *C21D 8/0236* (2013.01); *C21D 8/0263* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/10* (2013.01); *C22C 38/12* (2013.01); *C22C 38/14* (2013.01); *C22C 38/16* (2013.01); *C22C 38/18* (2013.01); *C22C 38/60* (2013.01); *C23C 2/06* (2013.01); *C23C 2/40* (2013.01); *C21D 2211/001* (2013.01); *C21D 2211/002* (2013.01); *C21D 2211/003* (2013.01); *C21D 2211/005* (2013.01); *C21D 2211/008* (2013.01); *C21D 2211/009* (2013.01)

(56) References Cited

U.S. PATENT DOCUMENTS

| | | | |
|---|---|---|---|
| 2008/0251160 | A1 | 10/2008 | Akamizu et al. |
| 2011/0036465 | A1 | 2/2011 | Kawasaki et al. |
| 2014/0234659 | A1* | 8/2014 | Kawata ............... C23C 2/28 |
| | | | 148/504 |
| 2017/0145534 | A1 | 5/2017 | Takashima et al. |
| 2017/0152580 | A1 | 6/2017 | Kimura et al. |
| 2019/0003009 | A1 | 1/2019 | Kawata et al. |
| 2019/0106760 | A1 | 4/2019 | Yamashita et al. |
| 2019/0161822 | A1 | 5/2019 | Takashima et al. |

FOREIGN PATENT DOCUMENTS

| | | |
|---|---|---|
| JP | 2003-193194 A | 7/2003 |
| JP | 2006-274418 A | 10/2006 |
| JP | 2008-56993 A | 3/2008 |
| JP | 2009-108343 A | 5/2009 |
| JP | 2009-209451 A | 9/2009 |
| JP | 2011-149066 A | 8/2011 |
| JP | 2017-145468 A | 8/2017 |
| JP | 2017-186614 A | 10/2017 |
| WO | WO 2015/151419 A1 | 10/2015 |
| WO | WO 2016/013144 A1 | 1/2016 |
| WO | WO 2017/029814 A1 | 2/2017 |
| WO | WO 2017/164346 A1 | 9/2017 |
| WO | WO 2017/183349 A1 | 10/2017 |
| WO | WO 2018/030500 A1 | 2/2018 |

OTHER PUBLICATIONS

"Metallic materials—Tensile testing—Method of test at room temperature", JIS Z 2241, (2011), total of 23 pages.

Sugimoto et al., "Effects of Second Phase Morphology on Retained Austenite Morphology and Tensile Properties in a TRIP-aided Dual-phase Steel Sheet", ISIJ International, vol. 33 (1993), No. 7, pp. 775-782.

* cited by examiner

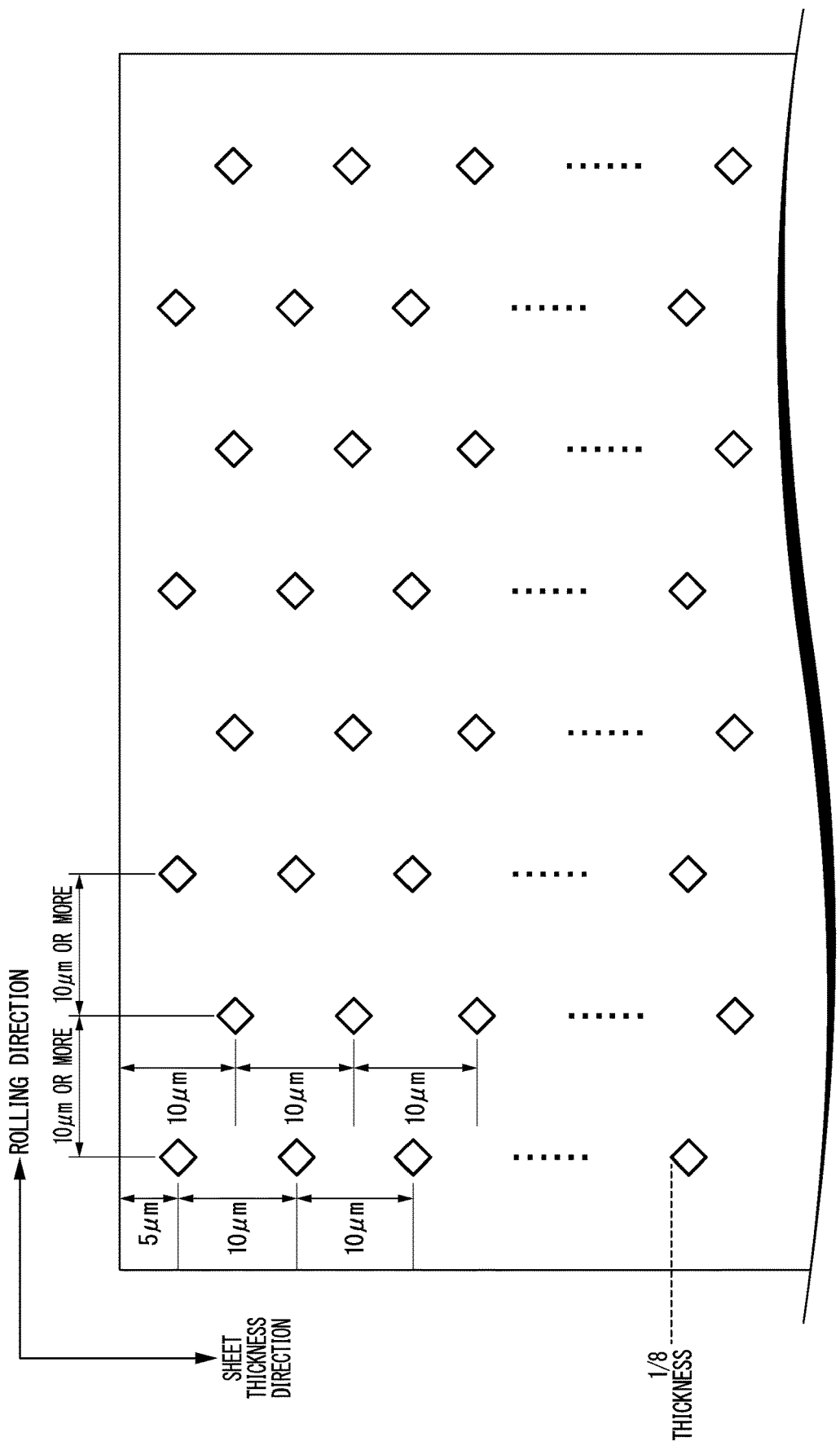

STEEL SHEET AND MANUFACTURING METHOD THEREFOR

TECHNICAL FIELD OF THE INVENTION

The present invention relates to a steel sheet and a method for manufacturing the same.

RELATED ART

In recent years, awareness of environmental problems has increased. Therefore, in the automotive industry, it is important to reduce the weight of the vehicle body for the purpose of improving fuel efficiency. On the other hand, there is also a need to increase the vehicle body strength of a vehicle to secure collision safety. In order to achieve both a reduction in the weight of the vehicle body and collision safety, a high strength steel sheet may be used as the material of the vehicle body. However, the higher the strength of the steel sheet, the more difficult the press formability. This is because, in general, the higher the strength of the steel sheet, the lower the formability such as ductility, bendability, and hole expansibility.

In the case of an ultrahigh-strength steel sheet having a tensile strength of more than 980 MPa, it is necessary to solve problems of not only the formability but also the hydrogen embrittlement cracking of the steel sheet. Hydrogen embrittlement cracking is a phenomenon in which a steel member, to which a high stress is applied in use, suddenly fractures due to hydrogen infiltrating into the steel from the environment. This phenomenon is also called delayed fracture because of the form of occurrence of fracture. It is generally known that hydrogen embrittlement cracking of a steel sheet is more likely to occur as the tensile strength of the steel sheet increases. It is considered that this is because the higher the tensile strength of the steel sheet, the greater the residual stress in the steel sheet after forming a component. The susceptibility to hydrogen embrittlement cracking (delayed fracture) is called hydrogen embrittlement resistance. In the case of steel sheets for vehicles, hydrogen embrittlement cracking is particularly likely to occur in a bent portion to which a large plastic strain is applied. Therefore, in a case where a high strength steel sheet is used for a vehicle member, there is a demand for the improvement in not only the formability such as ductility, bendability, and hole expansibility but also the hydrogen embrittlement resistance of the bent portion.

In the related art, dual phase steel (DP steel) containing ferrite and martensite is known as a high strength steel sheet having high press formability (for example, refer to Patent Document 1). DP steel has excellent ductility. However, DP steel has a hard phase serving as the origin of void formation and is thus inferior in hole expansibility and bendability.

In addition, as a high strength steel sheet having excellent ductility, there is TRIP steel that contains austenite remaining in the steel structure and utilizes a transformation-induced plasticity (TRIP) effect (for example, refer to Patent Documents 2 and 3). TRIP steel has a higher ductility than DP steel. However, TRIP steel is inferior in hole expansibility. In addition, TRIP steel needs to contain a large amount of alloys of Si and the like in order to retain austenite. Therefore, TRIP steel is inferior in plating adhesion and chemical convertibility.

In addition, Patent Document 4 describes a high strength steel sheet having a microstructure containing bainite or bainitic ferrite in an area ratio of 70% or more and having a tensile strength of 800 MPa or more and excellent hole expansibility. Patent Document 5 describes a high strength steel sheet having a microstructure containing bainite or bainitic ferrite as the primary phase, austenite as the secondary phase, and ferrite or martensite as the remainder, and having a tensile strength of 800 MPa or more and excellent hole expansibility and ductility.

Furthermore, Non-Patent Document 1 discloses that the elongation and hole expansibility of a steel sheet are improved by using a double annealing method in which a steel sheet is subjected to double annealing.

However, it has been difficult to simultaneously improve the ductility and hole expansibility of a high strength steel sheet in the related art, and the hydrogen embrittlement resistance of a bent portion.

PRIOR ART DOCUMENT

Patent Document

[Patent Document 1] Japanese Unexamined Patent Application, First Publication No. H6-128688
[Patent Document 2] Japanese Unexamined Patent Application, First Publication No. 2006-274418
[Patent Document 3] Japanese Unexamined Patent Application, First Publication No. 2008-56993
[Patent Document 4] Japanese Unexamined Patent Application, First Publication No. 2003-193194
[Patent Document 5] Japanese Unexamined Patent Application, First Publication No. 2003-193193

Non-Patent Document

[Non-Patent Document 1] K. Sugimoto et al., ISIJ International, Vol. 33 (1993), No. 7, pp. 775-782

DISCLOSURE OF THE INVENTION

Problems to be Solved by the Invention

The present invention has been made in view of the above circumstances. An object of the present invention is to provide a high strength steel sheet excellent in formability, fatigue properties, and hydrogen embrittlement resistance of a bent portion, and a method for manufacturing the same.

Means for Solving the Problem

The present inventors conducted extensive studies in order to solve the above problems. As a result, it was found that by subjecting a hot-rolled steel sheet or a cold-rolled steel sheet having a predetermined chemical composition to two heat treatments (annealing) under different conditions, it is effective to cause the inside of the steel sheet to have a predetermined steel structure, and to form a surface layer having a predetermined thickness and a steel structure.

It was also found that by forming an internal oxide layer containing Si oxides at a predetermined depth, it is possible to secure the plating adhesion and chemical convertibility required for a steel sheet for a vehicle.

Specifically, by the first heat treatment, the metallographic structure of the steel sheet inside and the steel sheet surface layer becomes a structure primarily containing a lath-like structure such as martensite. In addition, in the second heat treatment, a highest heating temperature is set to a dual phase region of $\alpha$ (ferrite) and $\gamma$ (austenite), and a decarburization treatment is performed at the same time. As a result, in the steel sheet obtained after the two heat treatments, the steel sheet inside has a steel structure in which acicular retained austenite is dispersed, and the surface layer has a steel structure primarily containing lath-like ferrite having a large aspect ratio and having a predetermined thickness. It was found that such a steel sheet is excellent in all of formability, fatigue properties, and hydrogen embrittlement resistance of a bent portion.

Furthermore, in the first and second heat treatments described above, oxidation of alloying elements such as Si contained in the steel outside the steel sheet is suppressed, and an internal oxide layer containing Si oxides at a predetermined depth is formed, whereby excellent chemical convertibility is obtained. Moreover, in a case where a plated layer is formed on the surface of the steel sheet, excellent plating adhesion is obtained.

The present invention has been made based on the above findings. The gist of the present invention is as follows.

(1) A steel sheet according to an aspect of the present invention includes, as a chemical composition, by mass %: C: 0.050% to 0.500%; Si: 0.01% to 3.00%; Mn: 0.50% to 5.00%; P: 0.0001% to 0.1000%; S: 0.0001% to 0.0100%; Al: 0.001% to 2.500%; N: 0.0001% to 0.0100%; O: 0.0001% to 0.0100%; Ti: 0% to 0.300%; V: 0% to 1.00%; Nb: 0% to 0.100%; Cr: 0% to 2.00%; Ni: 0% to 2.00%; Cu: 0% to 2.00%; Co: 0% to 2.00%; Mo: 0% to 1.00%; W: 0% to 1.00%; B: 0% to 0.0100%; Sn: 0% to 1.00%; Sb: 0% to 1.00%; Ca: 0% to 0.0100%; Mg: 0% to 0.0100%; Ce: 0% to 0.0100%; Zr: 0% to 0.0100%; La: 0% to 0.0100%; Hf: 0% to 0.0100%; Bi: 0% to 0.0100%; REM: 0% to 0.0100%; and a remainder including Fe and impurities, in which a steel structure in a 1/8 to 3/8 thickness range centered on a 1/4 thickness position from a surface contains, by volume fraction, a soft ferrite: 0% to 30%, a retained austenite: 3% to 40%, a fresh martensite: 0% to 30%, a sum of pearlite and cementite: 0% to 10%, and a remainder includes hard ferrite, in the 1/8 to 3/8 thickness range, a number proportion of the retained austenite having an aspect ratio of 2.0 or more in the total retained austenite is 50% or more, when a region having a hardness of 80% or less of a hardness of the 1/8 to 3/8 thickness range is defined as a soft layer, the soft layer having a thickness of 1 to 100 μm from the surface in a sheet thickness direction is present, in ferrite contained in the soft layer, a volume fraction of grains having an aspect ratio of 3.0 or more is 50% or more, a volume fraction of retained austenite in the soft layer is 80% or less of the volume fraction of the retained austenite in the 1/8 to 3/8 thickness range, and when an emission intensity at a wavelength indicating Si is analyzed in the sheet thickness direction from the surface by a radio-frequency glow discharge analysis method, a peak of the emission intensity at the wavelength indicating Si appears in a range of more than 0.2 μm and 10.0 μm or less from the surface.

(2) The steel sheet according to (1), in which the chemical composition includes one or two or more selected from the group consisting of Ti: 0.001% to 0.300%, V: 0.001% to 1.00%, and Nb: 0.001% to 0.100%.

(3) The steel sheet according to (1) or (2), in which the chemical composition includes one or two or more selected from the group consisting of Cr: 0.001% to 2.00%, Ni: 0.001% to 2.00%, Cu: 0.001% to 2.00%, Co: 0.001% to 2.00%, Mo: 0.001% to 1.00%, W: 0.001% to 1.00%, and B: 0.0001% to 0.0100%.

(4) The steel sheet according to any one of (1) to (3), in which the chemical composition includes one or two selected from the group consisting of Sn: 0.001% to 1.00%, and Sb: 0.001% to 1.00%.

(5) The steel sheet according to any one of (1) to (4), in which the chemical composition includes one or two or more selected from the group consisting of Ca: 0.0001% to 0.0100%, Mg: 0.0001% to 0.0100%, Ce: 0.0001% to 0.0100%, Zr: 0.0001% to 0.0100%, La: 0.0001% to 0.0100%, Hf: 0.0001% to 0.0100%, Bi: 0.0001% to 0.0100%, and REM: 0.0001% to 0.0100%.

(6) The steel sheet according to any one of (1) to (5), in which the chemical composition satisfies Expression (i).

$$Si+0.1 \times Mn+0.6 \times Al \geq 0.35 \quad \text{(i)}$$

(Si, Mn, and Al in the Expression (i) are respectively amounts of corresponding elements by mass %)

(7) The steel sheet according to any one of (1) to (6), in which the steel sheet has a hot-dip galvanized layer or an electrogalvanized layer on the surface.

(8) A method for manufacturing a steel sheet according to another aspect of the present invention is a method for manufacturing the steel sheet according to any one of (1) to (6), the method including: performing a first heat treatment satisfying (a) to (e) on a hot-rolled steel sheet which has been obtained by hot-rolling a slab having the chemical composition according to any one of claims 1 to 6 and pickling, or on a cold-rolled steel sheet which has been obtained by cold-rolling the hot-rolled steel sheet; and thereafter performing a second heat treatment satisfying (A) to (E).

(a) An atmosphere containing 0.1 vol % or more of $H_2$ and satisfying Expression (ii) is adopted from 650° C. to a highest heating temperature is reached.

(b) Holding is performed at the highest heating temperature of $A_{c3}$−30° C. to 1000° C. for 1 second to 1000 seconds.

(c) Heating is performed such that an average heating rate in a temperature range from 650° C. to the highest heating temperature is 0.5° C./s to 500° C./s.

(d) After holding at the highest heating temperature, cooling is performed such that an average cooling rate in a temperature range from 700° C. to Ms is 5° C./s or more.

(e) Cooling at the average cooling rate of 5° C./s or more to a cooling stop temperature of Ms or lower.

(A) An atmosphere containing 0.1 vol % or more of $H_2$ and 0.020 vol % or less of $O_2$ and having a $\log(PH_2O/PH_2)$ satisfying Expression (iii) is adopted from 650° C. to a highest heating temperature is reached.

(B) Holding is performed at the highest heating temperature of $A_{c1}$+25° C. to $A_{c3}$−10° C. for 1 second to 1000 seconds.

(C) Heating is performed such that an average heating rate from 650° C. to the highest heating temperature is 0.5° C./s to 500° C./s.

(D) Cooling is performed such that an average cooling rate in a temperature range of 700° C. to 600° C. is 3° C./s or more.

(E) After cooling at the average cooling rate of 3° C./s or more, holding is performed at 300° C. to 480° C. for 10 seconds or more.

$$\log(PH_2O/PH_2) < -1.1 \quad \text{(ii)}$$

$$-1.1 \leq \log(PH_2O/PH_2) \leq -0.07 \quad \text{(iii)}$$

(In Expression (ii) and Expression (iii), $PH_2O$ represents a partial pressure of water vapor, and $PH_2$ represents a partial pressure of hydrogen.)

(9) The method for manufacturing the steel sheet according to (8), in which hot-dip galvanizing is performed after the cooling in (D).

Effects of the Invention

According to the above aspects of the present invention, it is possible to provide a high strength steel sheet having excellent ductility and hole expansibility, excellent chemical convertibility and plating adhesion, and good fatigue properties and hydrogen embrittlement resistance of a bent portion, and a method for manufacturing the same.

BRIEF DESCRIPTION OF THE DRAWINGS

FIG. 7 is a schematic view showing an example of hardness measurement of the steel sheet according to the present embodiment.

EMBODIMENTS OF THE INVENTION

"Steel Sheet"

Figure 1:
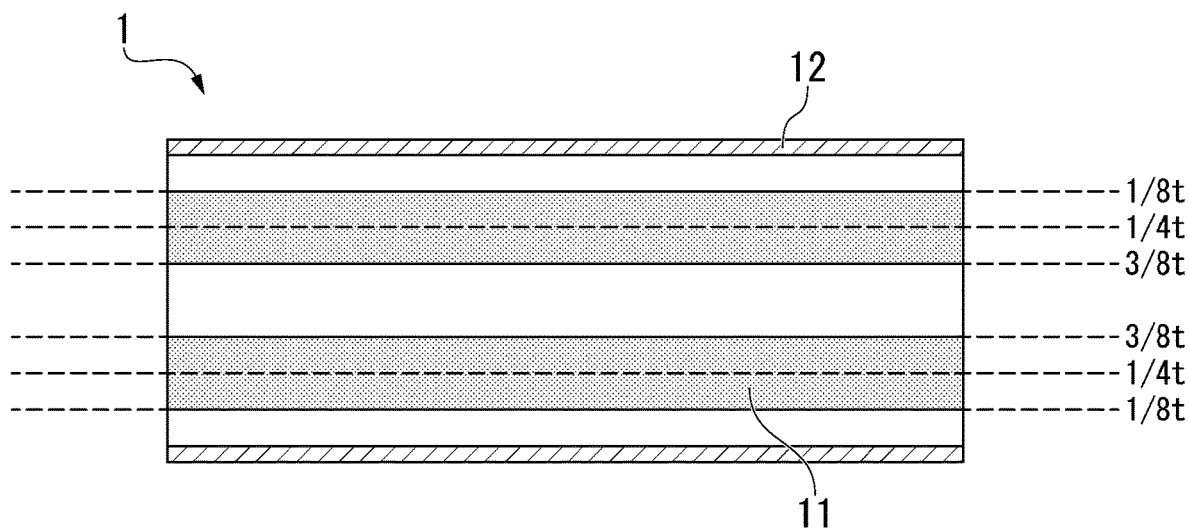
FIG. 1 is a cross-sectional view of a steel sheet according to the present embodiment, which is parallel to a rolling direction and a sheet thickness direction.

Hereinafter, a steel sheet according to an embodiment of the present invention (a steel sheet according to the present embodiment) will be described in detail.

First, the chemical composition of the steel sheet according to the present embodiment will be described. In the following description, [%] indicating the amount of an element means [mass %].

"C: 0.050% to 0.500%"

C is an element that greatly increases the strength of the steel sheet. In addition, C stabilizes austenite and is thus an element necessary for obtaining retained austenite that contributes to the improvement in ductility. Therefore, C is effective in achieving both strength and formability. When the C content is less than 0.050%, sufficient retained austenite cannot be obtained, and it becomes difficult to secure sufficient strength and formability. Therefore, the C content is set to 0.050% or more. In order to further enhance strength and formability, the C content is preferably 0.075% or more, and is more preferably 0.100% or more.

On the other hand, when the C content exceeds 0.500%, weldability significantly deteriorates. Therefore, the C content is set to 0.500% or less. From the viewpoint of spot weldability, the C content is preferably 0.350% or less, and is more preferably 0.250% or less.

"Si: 0.01% to 3.00%"

Si is an element that stabilizes retained austenite by suppressing the generation of iron-based carbides in the steel sheet, and thus enhances strength and formability. When the Si content is less than 0.01%, a large amount of coarse iron-based carbide is generated, and the strength and formability deteriorate. Therefore, the Si content is set to 0.01% or more. From this viewpoint, the lower limit of Si is preferably 0.10% or more, and is more preferably 0.25% or more.

On the other hand, Si is an element that makes the steel material brittle. When the Si content exceeds 3.00%, the hole expansibility of the steel sheet becomes insufficient. In addition, when the Si content exceeds 3.00%, problems such as cracking in a cast slab are likely to occur. Therefore, the Si content is set to 3.00% or less. Furthermore, Si impairs the impact resistance of the steel sheet. Therefore, the Si content is preferably 2.50% or less, and is more preferably 2.00% or less.

"Mn: 0.50% to 5.00%"

Mn is contained in order to enhance the strength by enhancing the hardenability of the steel sheet. When the Mn content is less than 0.50%, a large amount of soft structure is formed during cooling after annealing, so that it becomes difficult to secure a sufficiently high tensile strength. Therefore, the Mn content needs to be 0.50% or more. In order to further increase the strength, the Mn content is preferably 0.80% or more, and is more preferably 1.00% or more.

On the other hand, when the Mn content exceeds 5.00%, the elongation and hole expansibility of the steel sheet become insufficient. On the other hand, when the Mn content exceeds 5.00%, a coarse Mn-concentrated portion occurs at the sheet thickness center portion of the steel sheet, embrittlement easily occurs, and problems such as cracking in a cast slab are likely to occur. Therefore, the Mn content is set to 5.00% or less. In addition, since the spot weldability deteriorates as the Mn content increases, the Mn content is preferably 3.50% or less, and is more preferably 3.00% or less.

"P: 0.0001% to 0.1000%"

P is an element that makes the steel material brittle. When the P content exceeds 0.1000%, the elongation and hole expansibility of the steel sheet become insufficient. When the P content exceeds 0.1000%, problems such as cracking in a cast slab are likely to occur. Therefore, the P content is set to 0.1000% or less. Furthermore, P is an element that embrittles a melted portion produced by spot welding. In order to obtain a sufficient welded joint strength, the P content is preferably set to 0.0400% or less, and is more preferably set to 0.0200% or less.

On the other hand, setting the P content to less than 0.0001% causes a significant increase in manufacturing cost. From this, the P content is set to 0.0001% or more. The P content is preferably set to 0.0010% or more.

"S: 0.0001% to 0.0100%"

S is an element which is bonded to Mn to form coarse MnS and reduces formability such as ductility, hole expansibility (stretch flangeability), and bendability. Therefore, the S content is set to 0.0100% or less. In addition, S deteriorates spot weldability. Therefore, the S content is preferably set to 0.0070% or less, and is more preferably set to 0.0050% or less.

On the other hand, setting the S content to less than 0.0001% causes a significant increase in manufacturing cost. Therefore, the S content is set to 0.0001% or more. The S content is preferably set to 0.0003% or more, and is more preferably set to 0.0006% or more.

"Al: 0.001% to 2.500%"

Al is an element that makes the steel material brittle. When the Al content exceeds 2.500%, problems such as cracking in a cast slab are likely to occur. Therefore, the Al content is set to 2.500% or less. As the Al content increases, spot weldability deteriorates. Therefore, the Al content is set to more preferably 2.000% or less, and even more preferably 1.500% or less.

On the other hand, although the effect can be obtained even if the lower limit of the Al content is not particularly specified, Al is an impurity that is present in a trace amount in the raw material, and setting the Al content to less than 0.001% causes a significant increase in manufacturing cost. Therefore, the Al content is set to 0.001% or more. Al is an element effective as a deoxidizing agent, and in order to obtain a sufficient deoxidizing effect, the Al content is preferably set to 0.010% or more. Furthermore, Al is an element that suppresses the generation of coarse carbides, and may be contained for the purpose of stabilizing retained austenite. In order to stabilize the retained austenite, the Al content is preferably set to 0.100% or more, and is more preferably set to 0.250% or more.

"N: 0.0001% to 0.0100%"

N forms coarse nitrides and deteriorates formability such as ductility, hole expansibility (stretch flangeability), and bendability. Therefore, it is necessary to suppress the N content. When the N content exceeds 0.0100%, the deterioration of the formability is significant. Therefore, the N content is set to 0.0100% or less. In addition, since N causes the generation of blowholes during welding, the N content may be small. The N content is preferably 0.0075% or less, and is more preferably 0.0060% or less.

The effect is obtained even if the lower limit of the N content is not particularly specified. However, setting the N content to less than 0.0001% causes a significant increase in manufacturing cost. From this, the N content is set to 0.0001% or more. The N content is preferably 0.0003% or more, and is more preferably 0.0005% or more.

"O: 0.0001% to 0.0100%"

O forms oxides and deteriorates formability such as ductility, hole expansibility (stretch flangeability), and bendability. Therefore, it is necessary to suppress the O content. When the O content exceeds 0.0100%, the deterioration of the formability is significant. Therefore, the upper limit of the O content is set to 0.0100%. The O content is preferably 0.0050% or less, and is more preferably 0.0030% or less.

The effect is obtained even if the lower limit of the O content is not particularly specified. However, setting the O content to less than 0.0001% causes a significant increase in manufacturing cost. Therefore, the lower limit thereof is set to 0.0001%.

$$Si+0.1\times Mn+0.6\times Al \geq 0.35$$

There is concern that retained austenite may be decomposed into bainite, pearlite, or coarse cementite during a heat treatment. Si, Mn, and Al are elements that are particularly important for suppressing the decomposition of retained austenite and enhancing formability. In order to suppress the decomposition of retained austenite, it is preferable to satisfy Expression (1). The value on the left side of Expression (1) is more preferably 0.60 or more, and even more preferably 0.80 or more.

$$Si+0.1\times Mn+0.6\times Al \geq 0.35 \tag{1}$$

(Si, Mn, and Al in Expression (1) are respectively the amounts of the corresponding elements by mass %)

The steel sheet according to the present embodiment basically contains the above-mentioned elements, but may also contain one or two or more elements selected from Ti, V, Nb, Cr, Ni, Cu, Co, Mo, W, B, Sn, Sb, Ca, Mg, Ce, Zr, La, Hf, Bi, and REM. These elements are optional elements and are not necessarily contained. Therefore, the lower limit thereof is 0%.

"Ti: 0% to 0.300%"

Ti is an element that contributes to an increase in the strength of the steel sheet by precipitation strengthening, grain refinement strengthening by suppressing the growth of ferrite grains, and dislocation strengthening by suppressing recrystallization. However, when the Ti content exceeds 0.300%, the precipitation of carbonitrides increases and the formability deteriorates. Therefore, even in a case where Ti is contained, the Ti content is preferably 0.300% or less. In addition, from the viewpoint of formability, the Ti content is more preferably 0.150% or less.

The effect is obtained even if the lower limit of the Ti content is not particularly specified. However, in order to sufficiently obtain the strength increasing effect by including Ti, the Ti content is preferably 0.001% or more. For further high-strengthening of the steel sheet, the Ti content is more preferably 0.010% or more.

"V: 0% to 1.00%"

V is an element that contributes to an increase in the strength of the steel sheet by precipitation strengthening, grain refinement strengthening by suppressing the growth of ferrite grains, and dislocation strengthening by suppressing recrystallization. However, when the V content exceeds 1.00%, carbonitrides are excessively precipitated and the formability deteriorates. Therefore, even in a case where V is contained, the V content is preferably 1.00% or less, and is more preferably 0.50% or less. The effect is obtained even if the lower limit of the V content is not particularly specified. However, in order to sufficiently obtain the strength increasing effect by including V, the V content is preferably 0.001% or more, and is more preferably 0.010% or more.

"Nb: 0% to 0.100%"

Nb is an element that contributes to an increase in the strength of the steel sheet by precipitation strengthening, grain refinement strengthening by suppressing the growth of ferrite grains, and dislocation strengthening by suppressing recrystallization. However, when the Nb content exceeds 0.100%, the precipitation of carbonitrides increases and the formability deteriorates. Therefore, even in a case where Nb is contained, the Nb content is preferably 0.100% or less. From the viewpoint of formability, the Nb content is more preferably 0.060% or less. The effect is obtained even if the lower limit of the Nb content is not particularly specified. However, in order to sufficiently obtain the strength increasing effect by including Nb, the Nb content is preferably 0.001% or more. For further high-strengthening of the steel sheet, the Nb content is more preferably 0.005% or more.

"Cr: 0% to 2.00%"

Cr is an element that enhances the hardenability of the steel sheet and is effective in high-strengthening. However, when the Cr content exceeds 2.00%, hot workability is impaired and productivity decreases. From this, even in a case where Cr is contained, the Cr content is preferably set to 2.00% or less, and is more preferably set to 1.20% or less.

The effect is obtained even if the lower limit of the Cr content is not particularly specified. However, in order to sufficiently obtain the high-strengthening effect by including Cr, the Cr content is preferably 0.001% or more, and is more preferably 0.010% or more.

"Ni: 0% to 2.00%"

Ni is an element that suppresses phase transformation at a high temperature and is effective in high-strengthening of the steel sheet. However, when the Ni content exceeds 2.00%, the weldability is impaired. From this, even in a case where Ni is contained, the Ni content is preferably set to 2.00% or less, and is more preferably set to 1.20% or less.

The effect is obtained even if the lower limit of the Ni content is not particularly specified. However, in order to sufficiently obtain the high-strengthening effect by including Ni, the Ni content is preferably 0.001% or more, and is more preferably 0.010% or more.

"Cu: 0% to 2.00%"

Cu is an element that enhances the strength of the steel sheet by being present in the steel as fine particles. However, when the Cu content exceeds 2.00%, the weldability is impaired. Therefore, even in a case where Cu is contained, the Cu content is preferably set to 2.00% or less, and is more preferably set to 1.20% or less. The effect is obtained even if the lower limit of the Cu content is not particularly specified. However, in order to sufficiently obtain the high-strengthening effect by including Cu, the Cu content is preferably 0.001% or more, and is more preferably 0.010% or more.

"Co: 0% to 2.00%"

Co is an element that enhances the hardenability and is effective in high-strengthening of the steel sheet. However, when the Co content exceeds 2.00%, the hot workability is impaired and the productivity decreases. From this, even in a case where Co is contained, the Co content is preferably 2.00% or less, and is more preferably 1.20% or less.

The effect is obtained even if the lower limit of the Co content is not particularly specified. However, in order to sufficiently obtain the high-strengthening effect by including Co, the Co content is preferably 0.001% or more, and is more preferably 0.010% or more.

"Mo: 0% to 1.00%"

Mo is an element that suppresses phase transformation at a high temperature and is effective in high-strengthening of the steel sheet. However, when the Mo content exceeds 1.00%, the hot workability is impaired and the productivity decreases. From this, even in a case where Mo is contained, the Mo content is preferably set to 1.00% or less, and is more preferably set to 0.50% or less.

The effect is obtained even if the lower limit of the Mo content is not particularly specified. However, in order to sufficiently obtain the high-strengthening effect by including Mo, the Mo content is preferably 0.001% or more, and is more preferably 0.005% or more.

"W: 0% to 1.00%"

W is an element that suppresses phase transformation at a high temperature and is effective in high-strengthening of the steel sheet. However, when the W content exceeds 1.00%, the hot workability is impaired and the productivity decreases. From this, even in a case where W is contained, the W content is preferably 1.00% or less, and is more preferably 0.50% or less.

The effect is obtained even if the lower limit of the W content is not particularly specified. However, in order to sufficiently obtain the high-strengthening effect by including W, the W content is preferably 0.001% or more, and is more preferably 0.010% or more.

"B: 0% to 0.0100%"

B is an element that suppresses phase transformation at a high temperature and is effective in high-strengthening of the steel sheet. However, when the B content exceeds 0.0100%, the hot workability is impaired and the productivity decreases. From this, even in a case where B is contained, the B content is preferably set to 0.0100% or less. From the viewpoint of productivity, the B content is more preferably 0.0050% or less.

The effect is obtained even if the lower limit of the B content is not particularly specified. However, in order to sufficiently obtain the high-strengthening effect by including B, the B content is preferably set to 0.0001% or more. For further high-strengthening, the B content is more preferably 0.0005% or more.

"Sn: 0% to 1.00%"

Sn is an element that suppresses the coarsening of the structure and is effective in high-strengthening of the steel sheet. However, when the Sn content exceeds 1.00%, the steel sheet may be excessively embrittled and the steel sheet may fracture during rolling. Therefore, even in a case where Sn is contained, the Sn content is preferably 1.00% or less.

The effect is obtained even if the lower limit of the Sn content is not particularly specified. However, in order to sufficiently obtain the high-strengthening effect by including Sn, the Sn content is preferably 0.001% or more, and is more preferably 0.010% or more.

"Sb: 0% to 1.00%"

Sb is an element that suppresses the coarsening of the structure and is effective in high-strengthening of the steel sheet. However, when the Sb content exceeds 1.00%, the steel sheet may be excessively embrittled and the steel sheet may fracture during rolling. Therefore, even in a case where Sb is contained, the Sb content is preferably 1.00% or less.

The effect is obtained even if the lower limit of the Sb content is not particularly specified. However, in order to sufficiently obtain the high-strengthening effect by including Sb, the Sb content is preferably 0.001% or more, and is more preferably 0.005% or more.

"One or Two or More Selected from the Group Consisting of Ca, Mg, Ce, Zr, La, Hf, Bi, and REM Each in 0% to 0.0100%"

REM is an abbreviation for rare earth metals, and in the present embodiment, refers to elements belonging to the lanthanoid series excluding Ce and La. In the present embodiment, REM, Ce, and La are often added as mischmetal, and there are cases where elements in the lanthanoid series in a composite form. Even if the elements in the lanthanoid series other than La and/or Ce are included as impurities, the effect is obtained. Furthermore, even if the metal La and/or Ce is added, the effect is obtained. In the present embodiment, the REM content is the total value of the amounts of elements belonging to the lanthanoid series excluding Ce and La.

The reason for including these elements is as follows.

Ca, Mg, Ce, Zr, La, Hf, Bi, and REM are elements effective in improving formability, and one or two or more thereof may be contained each in 0.0001% to 0.0100%. When the amounts of one or two or more selected from the group consisting of Ca, Mg, Ce, Zr, La, Hf, Bi, and REM each exceed 0.0100%, there is concern that the ductility may decrease. Therefore, even in a case where these elements, the amount of each of the elements is preferably 0.0100% or less, and is more preferably 0.0070% or less. In a case where two or more of the above elements, the total amount of Ca, Mg, Ce, Zr, La, Hf, Bi, and REM is preferably set to 0.0100% or less.

The effect is obtained even if the lower limit of the amount of each of the elements is not particularly specified. However, in order to sufficiently obtain the effect of improving the formability of the steel sheet, the amount of each of the elements is 0.0001% or more. From the viewpoint of formability, the total amount of one or two or more selected from the group consisting of Ca, Mg, Ce, Zr, La, Hf, Bi, and REM is more preferably 0.0010% or more.

The steel sheet according to the present embodiment contains the above elements, and the remainder consisting of Fe and impurities. A case where Ti, V, Nb, Cr, Ni, Cu, Co, Mo, W, B, Sn, and Sb described above are all contained as impurities in small amounts lower than the lower limits is allowed.

In addition, including Ca, Mg, Ce, Zr, La, Hf, Bi, and REM as impurities in trace amounts lower than the lower limits is also allowed.

Furthermore, including H, Na, Cl, Sc, Zn, Ga, Ge, As, Se, Y, Tc, Ru, Rh, Pd, Ag, Cd, in, Te, Cs, Ta, Re, Os, Ir, Pt, Au, and Pb as impurities in a total amount of 0.0100% or less is allowed.

Next, the steel structure (microstructure) of the steel sheet according to the present embodiment will be described. [%] in the description of the amount of each structure is [vol %].

(Steel Structure of Steel Sheet Inside)

As illustrated in FIG. 1, in a steel sheet 1 according to the present embodiment, the steel structure (hereinafter, sometimes referred to as "steel structure of the steel sheet inside") in a ⅛ to ⅜ thickness range 11 centered on a ¼ thickness position (¼ position of the sheet thickness from the surface in a sheet thickness direction) of the sheet thickness from the surface of the steel sheet 1 contains 0% to 30% of soft ferrite, 3% to 40% of retained austenite, 0% to 30% of fresh martensite, and 0% to 10% of the sum of pearlite and cementite, and the number proportion of the retained austenite having an aspect ratio of 2.0 or more in the total retained austenite is 50% or more.

"Soft Ferrite: 0% to 30%"

Ferrite is a structure having excellent ductility. However, ferrite has low strength and is thus a structure that is difficult to be utilized in a high strength steel sheet. In the steel sheet according to the present embodiment, the steel structure of the steel sheet inside (microstructure of the steel sheet inside) contains 0% to 30% of soft ferrite.

The "soft ferrite" in the present embodiment means a ferrite that does not contain retained austenite in the grains. The soft ferrite has low strength, and strain is more likely to be concentrated and fracture is more likely to occur than in the peripheral portions. When the volume fraction of the soft ferrite exceeds 30%, the balance between strength and formability deteriorates significantly. Therefore, the soft ferrite is limited to 30% or less. The soft ferrite is more preferably limited to 15% or less, and may be 0%.

"Retained Austenite: 3% to 40%"

Retained austenite is a structure that enhances the balance between strength and ductility. In the steel sheet according to the present embodiment, the steel structure of the steel sheet inside contains 3% to 40% of retained austenite. From the viewpoint of formability, the volume fraction of the retained austenite of the steel sheet inside is preferably set to 3% or more, more preferably 5% or more, and even more preferably 7% or more.

On the other hand, in order to cause the volume fraction of the retained austenite to exceed 40%, it is necessary to contain a large amount of C, Mn, and/or Ni. In this case, the weldability is significantly impaired. Therefore, the volume fraction of the retained austenite is set to 40% or less. In order to improve the weldability and the convenience of the steel sheet, the volume fraction of the retained austenite is preferably set to 30% or less, and is more preferably set to 20% or less.

"Fresh Martensite: 0% to 30%"

Fresh martensite greatly improves tensile strength. On the other hand, fresh martensite becomes the origin of fracture and significantly deteriorates impact resistance. Therefore, the volume fraction of the fresh martensite is set to 30% or less. In particular, in order to improve impact resistance, the volume fraction of the fresh martensite is preferably set to 15% or less, and is more preferably set to 7% or less. The fresh martensite may be 0%, but is preferably 2% or more in order to secure the strength of the steel sheet.

"Sum of Pearlite and Cementite: 0% to 10%"

The steel structure of the steel sheet inside may contain pearlite and/or cementite. However, when the volume fraction of the pearlite and/or cementite is high, the ductility deteriorates. Therefore, the total volume fraction of the pearlite and/or cementite is limited to 10% or less. The volume fraction of the pearlite and/or cementite is preferably 5% or less in total, and may be 0%.

"Number Proportion of Retained Austenite Having Aspect Ratio of 2.0 or More is 50% or More of Total Retained Austenite"

In the present embodiment, the aspect ratio of retained austenite grains in the steel structure of the steel sheet inside is important. Retained austenite having a large aspect ratio, that is, stretched retained austenite is stable in the early stage of deformation of the steel sheet due to working. However, in the retained austenite having a large aspect ratio, strain is concentrated at the tip end portion as the working progresses, and the retained austenite is appropriately transformed to cause the transformation-induced plasticity (TRIP) effect. Therefore, the steel structure of the steel sheet inside contains the retained austenite having a large aspect ratio, whereby the ductility can be improved without impairing the toughness, hydrogen embrittlement resistance, hole expansibility, and the like. From the above viewpoint, in the steel sheet according to the present embodiment, the number proportion of the retained austenite having an aspect ratio of 2.0 or more in the total retained austenite is set to 50% or more. The number proportion of the retained austenite having an aspect ratio of 2.0 or more is preferably 70% or more, and is more preferably 80% or more.

"Tempered Martensite"

Tempered martensite is a structure that greatly improves the tensile strength of the steel sheet without impairing the impact resistance, and may be contained in the steel structure of the steel sheet inside. However, when a large amount of tempered martensite is generated in the steel sheet inside, there may be cases where retained austenite is not sufficiently obtained. Therefore, the volume fraction of the tempered martensite is preferably limited to 50% or less, and is more preferably 30% or less.

In the steel sheet according to the present embodiment, the residual structure in the steel structure of the steel sheet inside primarily contains "hard ferrite" containing retained austenite in the grains. "Primarily contains" means that hard ferrite has the largest volume fraction in the residual structure.

The hard ferrite is formed by subjecting a steel sheet for a heat treatment having a steel structure including a lath-like structure including one or two or more selected from the group consisting of bainite, tempered martensite, and fresh martensite to a second heat treatment, which will be described later. Hard ferrite contains retained austenite in the grains and thus has high strength. In addition, hard ferrite is less likely to cause interfacial delamination between ferrite and the retained austenite compared to a case where retained austenite is present in ferrite grain boundaries, and thus has good formability.

Furthermore, the residual structure in the steel structure of the steel sheet inside may contain bainite in addition to the above-mentioned hard ferrite. The bainite in the present embodiment includes granular bainite composed of fine BCC crystals and coarse iron-based carbides, upper bainite composed of lath-like BCC crystals and coarse iron-based carbides, lower bainite composed of plate-like BCC crystals and fine iron-based carbides arranged in parallel therein, and bainitic ferrite containing no iron-based carbides.

(Microstructure of Surface Layer)

Next, the steel structure (microstructure) of the surface layer of the steel sheet will be described.

"When Region Having Hardness of 80% or Less of Hardness in ⅛ to ⅜ Thickness Range (Steel Sheet Inside) is Defined as Soft Layer, Soft Layer Having Thickness of 1 to 100 µm is Present on Surface Layer"

In order to improve bendability after working, softening the surface layer of the steel sheet is one of the requirements. In the steel sheet according to the present embodiment, when a region having a hardness of 80% or less of the hardness (average hardness) of the steel sheet inside is defined as a soft layer, a soft layer having a thickness of 1 to 100 µm from the surface of the steel sheet in the sheet thickness direction is present. In other words, a soft layer having a hardness of 80% or less of the average hardness of the steel sheet inside is present in the surface layer portion of the steel sheet, and the thickness of the soft layer is 1 to 100 µm.

When the thickness of the soft layer is less than 1 µm in a depth direction (sheet thickness direction) from the surface, sufficient bendability after working cannot be obtained. The thickness (depth range from the surface) of the soft layer is preferably 5 µm or more, and is more preferably 10 µm or more.

On the other hand, when the thickness of the soft layer exceeds 100 µm, the strength of the steel sheet is significantly reduced. Therefore, the thickness of the soft layer is set to 100 µm or less. The thickness of the soft layer is preferably 70 µm or less.

[Volume Fraction of Grains Having Aspect Ratio of 3.0 or More in Ferrite Contained in Soft Layer is 50% or More]

When the volume fraction of grains having an aspect ratio of 3.0 or more in the ferrite contained in the soft layer (the ratio of ferrite grains having an aspect ratio of less than 3.0 to the volume fraction of all ferrite grains in the soft layer) is less than 50%, the hydrogen embrittlement resistance of the bent portion deteriorates. Therefore, the volume fraction of grains having an aspect ratio of 3.0 or more in the ferrite contained in the soft layer is set to 50% or more. The volume fraction thereof is preferably 60% or more, and is more preferably 70% or more. Here, the target ferrite includes soft ferrite and hard ferrite.

The reason why the aspect ratio of the ferrite in the soft layer affects the hydrogen embrittlement resistance of the bent portion is not necessarily clear, but it is presumed as follows. That is, in the steel sheet according to the present embodiment, the steel structure of the soft layer and the steel structure of the steel sheet inside (internal structure) are significantly different from each other. However, in the steel sheet according to the present embodiment, since the number proportion of grains having an aspect ratio of 3.0 or more contained in the surface layer is 50% or more, the shape similarity between the surface layer and the internal structure is high. As a result, it is presumed that the local concentration of stress and strain due to bending at the boundary between the surface layer and the inside is suppressed, and the hydrogen embrittlement resistance is improved.

[Volume Fraction of Retained Austenite in Soft Layer is 80% or Less of Volume Fraction of Retained Austenite of Steel Sheet Inside]

When the volume fraction of retained austenite contained in the soft layer is limited to 80% or less of the volume fraction of retained austenite contained in the ⅛ to ⅜ thickness range centered on the ¼ thickness position of the sheet thickness of the steel sheet from the surface, the hydrogen embrittlement resistance of the bent portion is improved. The volume fraction of the retained austenite contained in the soft layer with respect to the volume fraction of the retained austenite contained in the ⅛ to ⅜ thickness range is preferably 50% or less, and is more preferably 30% or less.

The mechanism by which the hydrogen embrittlement resistance of the bent portion is improved by the volume fraction of the retained austenite in the soft layer is not clear, but it is estimated as follows. That is, in the bent portion, a large plastic strain occurs from the center of the sheet thickness toward the outer surface of the bend. Therefore, most of the retained austenite present in the vicinity of the surface on the outside of the bend is transformed into martensite by strain-induced transformation. It is considered that such martensite into which the retained austenite is transformed by strain-induced transformation is extremely hard and brittle, and thus adversely affects hydrogen embrittlement cracking resistance. Therefore, it is considered that as the volume fraction of the retained austenite contained in the soft layer decreases with respect to the volume fraction of the retained austenite contained in the ⅛ to ⅜ thickness range of the steel sheet, the hydrogen embrittlement resistance of the bent portion is improved.

"Internal Oxide Layer Containing Si Oxides"

In the steel sheet according to the present embodiment, when the emission intensity at a wavelength indicating Si is analyzed by a radio-frequency glow discharge (radio-frequency GDS) analysis method in the depth direction (sheet thickness direction) from the surface, a peak of the emission intensity at the wavelength indicating Si appears in a range of more than 0.2 µm to 10.0 µm or less from the surface. The peak of the emission intensity at the wavelength indicating Si appearing in the range of more than 0.2 µm to 10.0 µm or less from the surface indicates that the steel sheet is internally oxidized and an internal oxide layer containing Si oxides is provided in a range of more than 0.2 µm to 10.0 µm or less from the surface of the steel sheet. The steel sheet having the internal oxide layer in the above depth range has excellent chemical convertibility and plating adhesion because the generation of oxide films such as Si oxides on the surface of the steel sheet due to heat treatments during manufacturing is suppressed.

The steel sheet according to the present embodiment may have a peak of the emission intensity at the wavelength indicating Si in both the range of more than 0.2 µm to 10.0 µm or less from the surface and a range of 0 µm to 0.2 µm (a region shallower than a depth of 0.2 µm) from the surface when analyzed by the radio-frequency glow discharge analysis method in the depth direction from the surface. Having a peak in both ranges indicates that the steel sheet has the internal oxide layer and an external oxide layer containing Si oxides on the surface.

Figure 2:
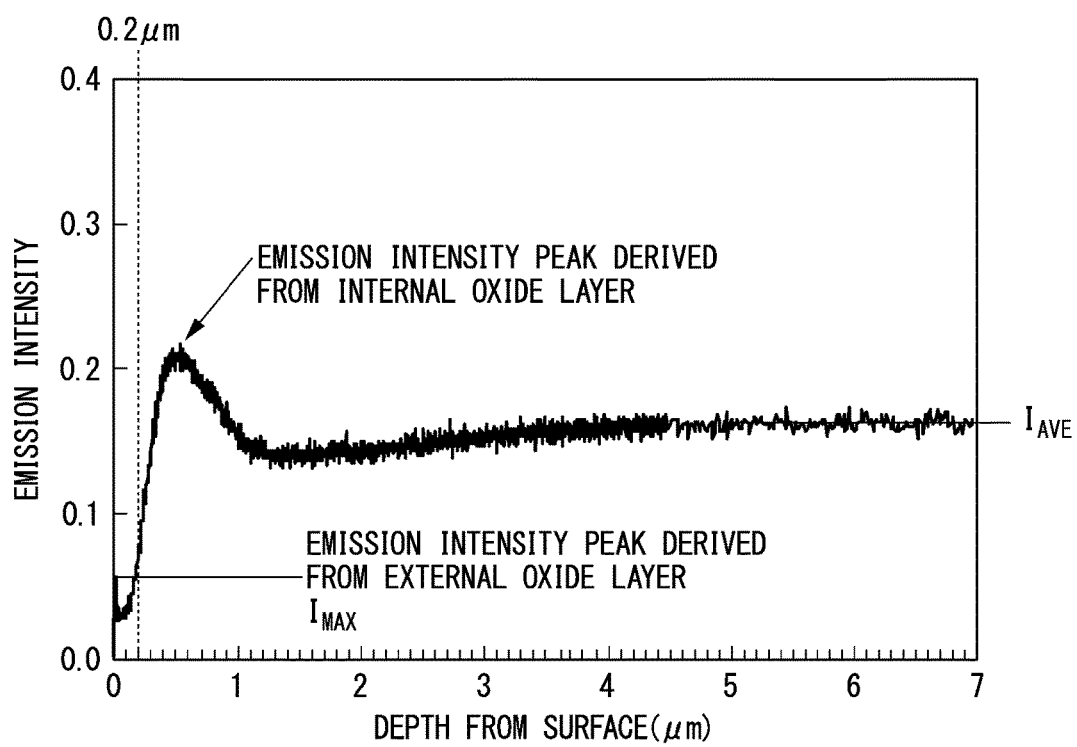
FIG. 2 is a graph showing a relationship between a depth from a surface and an emission intensity at a wavelength indicating Si when the steel sheet according to the present embodiment is analyzed by a radio-frequency glow discharge analysis method in a depth direction (sheet thickness direction) from the surface.

FIG. 2 is a graph showing the relationship between the depth from the surface and the emission intensity at the wavelength indicating Si when the emission intensity at the wavelength indicating Si is analyzed by the radio-frequency glow discharge analysis method in the depth direction from the surface in the steel sheet according to the present embodiment. In the steel sheet according to the present embodiment shown in FIG. 2, a peak of the emission intensity at the wavelength indicating Si (derived from the internal oxide layer) appears in the range of more than 0.2 µm to 10.0 µm or less from the surface. In addition, a peak of the emission intensity at the wavelength indicating Si (derived from the external oxide layer ($I_{MAX}$)) appears also in the range of 0 (outermost surface) to 0.2 µm from the surface. Therefore, it can be seen that the steel sheet shown in FIG. 2 has the internal oxide layer and the external oxide layer.

Figure 3:
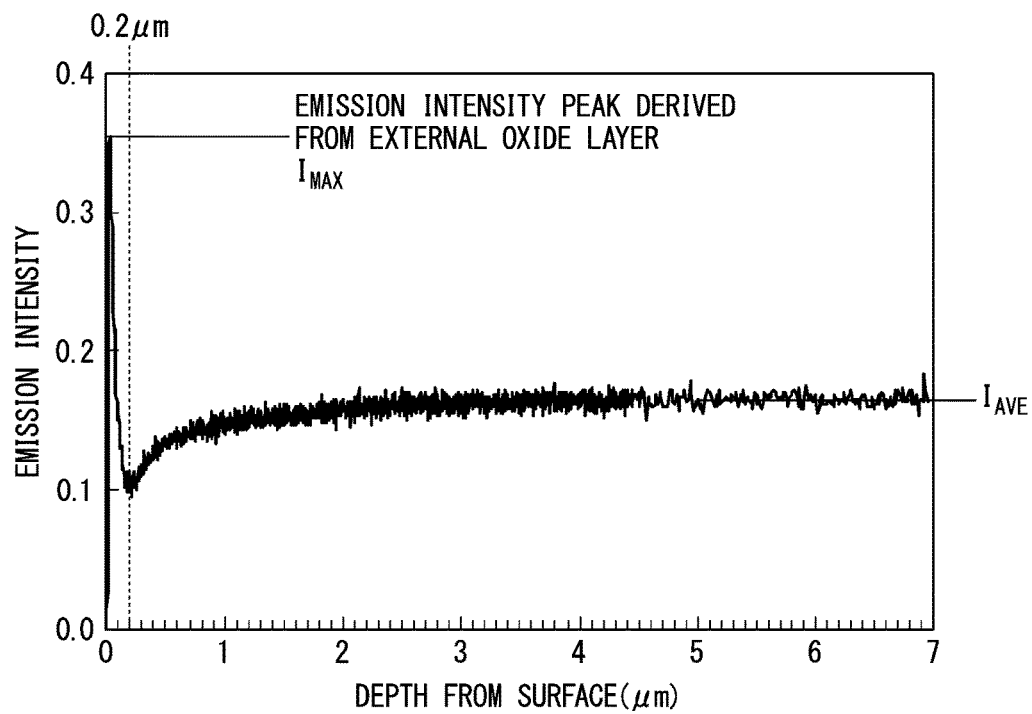
FIG. 3 is a graph showing a relationship between a depth from a surface and an emission intensity at a wavelength indicating Si when a steel sheet (comparative steel sheet) different from the present embodiment is analyzed by the radio-frequency glow discharge analysis method in a depth direction (sheet thickness direction) from the surface.

FIG. 3 is a graph showing the relationship between the depth from the surface and the emission intensity at the wavelength indicating Si when a steel sheet different from the present embodiment is analyzed by the radio-frequency glow discharge analysis method in the depth direction from the surface. In the steel sheet shown in FIG. 3, a peak of the emission intensity at the wavelength indicating Si appears in the range of 0 (outermost surface) to 0.2 µm from the surface, but does not appear in the range of more than 0.2 µm to 10.0 µm or less. This means that the steel sheet does not have an internal oxide layer but has only an external oxide layer.

"Galvanized Layer"

A galvanized layer (hot-dip galvanized layer or electrogalvanized layer) may be formed on the surface (both sides or one side) of the steel sheet according to the present embodiment. The hot-dip galvanized layer may be a hot-dip galvannealed layer obtained by alloying the hot-dip galvanized layer.

In a case where the hot-dip galvanized layer is not alloyed, the Fe content in the hot-dip galvanized layer is preferably less than 7.0 mass %.

In a case where the hot-dip galvanized layer is a hot-dip galvannealed layer which is alloyed, the Fe content is preferably 6.0 mass % or more. The hot-dip galvannealed steel sheet has better weldability than the hot-dip galvanized steel sheet.

The plating adhesion amount of the galvanized layer is not particularly limited, but from the viewpoint of corrosion resistance, is preferably 5 g/m² or more per side, more preferably in a range of 20 to 120 g/m², and even more preferably in a range of 25 to 75 g/m².

The steel sheet according to the present embodiment may be provided with the galvanized layer, and furthermore, on the galvanized layer, an upper layer plated layer for the purpose of improving coatability, weldability, and the like. Furthermore, the galvanized steel sheet may be subjected to various treatments such as a chromate treatment, a phosphate treatment, a lubricity improvement treatment, and a weldability improvement treatment.

The steel sheet according to the present embodiment is formed by performing a second heat treatment, which will be described later, on the following steel sheet (a material before the second heat treatment; hereinafter referred to as "steel sheet for a heat treatment") obtained by steps including a first heat treatment.

"Steel Sheet for Heat Treatment"

The steel sheet for a heat treatment according to the present embodiment is used as a material of the steel sheet according to the present embodiment.

Specifically, it is preferable that the steel sheet for a heat treatment which is to be the material of the steel sheet according to the present embodiment has the same chemical composition as the steel sheet according to the above-mentioned embodiment, and has a steel structure (microstructure) described below. In the description of the amount of each structure, [%] indicates [vol %] unless otherwise specified.

That is, it is preferable that the steel structure (the steel structure of the steel sheet inside) in the ⅛ to ⅜ thickness range centered on the ¼ thickness position of the sheet thickness from the surface contains a lath-like structure including one or two or more selected from the group consisting of bainite, tempered martensite, and fresh martensite in a volume fraction of 70% or more in total, contains retained austenite, and has a number density of retained austenite grains having an aspect ratio of less than 1.3 and a major axis of more than 2.5 µm of $1.0 \times 10^{-2}/m^2$ or less, and the steel structure of the surface layer portion in the range of 0 to 20 µm in the depth direction from the surface has a volume fraction of ferrite of less than 50%. In addition, the bainite includes granular bainite composed of fine BCC crystals and coarse iron-based carbides, upper bainite composed of lath-like BCC crystals and coarse iron-based carbides, lower bainite composed of plate-like BCC crystals and fine iron-based carbides arranged in parallel therein, and bainitic ferrite containing no iron-based carbides.

A preferable steel structure (microstructure) of the steel sheet for a heat treatment which is to be the material of the steel sheet according to the present embodiment will be described below. [%] in the description of the amount of each structure is [vol %].

(Steel Structure of Inside of Steel Sheet for Heat Treatment)

"Lath-Like Structure in Volume Fraction of 70% or More in Total"

It is preferable that in the steel sheet for a heat treatment of the present embodiment, the steel structure (the steel structure of the steel sheet inside) in the ⅛ to ⅜ thickness range centered on the ¼ thickness position of the sheet thickness of the steel sheet from the surface contains the lath-like structure including one or two or more selected from the group consisting of bainite, tempered martensite, and fresh martensite in a volume fraction of 70% or more in total.

By including the lath-like structure in a volume fraction of 70% or more in total, in the steel sheet obtained by subjecting the steel sheet for a heat treatment to the second heat treatment described later, the steel structure of the steel sheet inside primarily contains hard ferrite. When the total volume fraction of the lath-like structure is less than 70%, in the steel sheet obtained by subjecting the steel sheet for a heat treatment to the second heat treatment, the steel structure of the steel sheet inside contains a large amount of soft ferrite, so that the steel sheet according to the present embodiment cannot be obtained. The steel structure of the steel sheet inside in the steel sheet for a heat treatment contains the lath-like structure preferably in a volume fraction of 80% or more in total, and more preferably 90% or more in total, and may be 100%.

"Number Density of Retained Austenite Grains Having Aspect Ratio of Less than 1.3 and Major Axis of More than 2.5 mm"

The steel structure of the steel sheet inside in the steel sheet for a heat treatment may contain retained austenite in addition to the above-mentioned lath-like structure. However, in a case where retained austenite is contained, it is preferable to limit the number density of retained austenite grains having an aspect ratio of less than 1.3 and a major axis of more than 2.5 µm to $1.0 \times 10^{-2}/\mu m^2$ or less.

When the retained austenite present in the steel structure of the steel sheet inside is in the form of coarse lumps, coarse lump-like retained austenite grains are present inside the steel sheet obtained by subjecting the steel sheet for a heat treatment to the second heat treatment, and a sufficient number proportion of retained austenite having an aspect ratio of 2.0 or more cannot be secured in some cases. Therefore, the number density of coarse lump-like retained austenite grains having an aspect ratio of less than 1.3 and a major axis of more than 2.5 µm is set to $1.0 \times 10^{-2}/\mu m^2$ or less. The number density of coarse lump-like retained austenite grains is preferably as low as possible, and is preferably $0.5 \times 10^{-2}/\mu m^2$ or less.

When the retained austenite is excessively present in the steel sheet inside of the steel sheet for a heat treatment, the retained austenite partially becomes isotropic by subjecting the steel sheet for a heat treatment to the second heat treatment described later. As a result, there are cases where retained austenite having an aspect ratio of 2.0 or more cannot be sufficiently secured inside the steel sheet obtained after the second heat treatment. Therefore, it is preferable that the volume fraction of the retained austenite contained in the steel structure of the steel sheet inside of the steel sheet for a heat treatment is preferably 10% or less.

(Microstructure of Surface Layer of Steel Sheet for Heat Treatment)

"Volume Fraction of Ferrite in Surface Layer Portion within Range from Surface of Steel Sheet to 20 µm in Depth Direction is Less than 20%"

In the steel sheet for a heat treatment which is to be the material of the steel sheet according to the present embodiment, it is preferable that the volume fraction of ferrite is less than 20% in a range from the surface of the steel sheet to 20 µm in the depth direction. When the volume fraction of ferrite is 20% or more, in the soft layer formed on the steel sheet obtained by subjecting the steel sheet for a heat treatment to the second heat treatment, the volume fraction of ferrite grains having an aspect ratio of more than 3.0 does not satisfy a predetermined range. The volume fraction of ferrite is preferably as small as possible, and is more preferably 10% or less, and may be 0%.

"Method for Manufacturing Steel Sheet According to Present Embodiment"

Next, a method for manufacturing the steel sheet according to the present embodiment will be described.

In the method for manufacturing the steel sheet according to the present embodiment, a hot-rolled steel sheet which has been obtained by hot-rolling a slab having the above chemical composition and pickling, or a cold-rolled steel sheet which has been obtained by cold-rolling a hot-rolled steel sheet is subjected to the first heat treatment described below, whereby the steel sheet for a heat treatment is manufactured. Then, the steel sheet for a heat treatment is subjected to the second heat treatment described below. The first heat treatment and/or the second heat treatment may be performed using a dedicated heat treatment line or may be performed using an existing annealing line.

(Casting Step)

In order to manufacture the steel sheet according to the present embodiment, first, a slab having the above chemical composition (composition) is cast. As the slab to be subjected to hot rolling, a continuous cast slab or one manufactured by a thin slab caster can be used. The slab after casting may be once cooled to room temperature and then hot-rolled, or may be directly hot-rolled while being at a high temperature. It is preferable to directly subject the slab after casting to hot rolling while being at a high temperature because the energy required for heating in hot rolling can be reduced.

(Slab Heating)

The slab is heated prior to hot rolling. In a case of manufacturing the steel sheet according to the present embodiment, it is preferable to select slab heating conditions that satisfy Expression (4).

(Expression 1)

$$10^4 \cdot \frac{\Sigma_{A_{C1}}^{A_{C3}} f\gamma \cdot WMn\gamma \cdot \sqrt{D \cdot ts(T)}}{\Sigma_{A_{C1}}^{A_{C3}} \sqrt{D \cdot ts(T)}} \leq 1.0 \qquad (4)$$

(in Expression (4), fγ is a value represented by Expression (5), WMnγ is a value represented by Expression (6), D is a value represented by Expression (7), and $A_{c1}$ is a value represented by Expression (8), $A_{c3}$ is a value represented by Expression (9), and ts(T) is a slab retention time (sec) at a slab heating temperature T)

(Expression 2)

$$f\gamma = \frac{WC}{0.8} + \left(1 - \frac{WC}{0.8}\right) \cdot \frac{T - A_{C1}}{A_{C3} - A_{C1}} \qquad (5)$$

(in Expression (5), T is a slab heating temperature (° C.), WC is a C content (mass %) in steel, $A_{c1}$ is a value represented by Expression (8), and $A_{c3}$ is a value represented by Expression (9))

(Expression 3)

(in Expression (6), T is a slab heating temperature (° C.), WMn is a Mn content (mass %) in steel, $A_{c1}$ is a value represented by Expression (8), and $A_{c3}$ is a value represented by Expression (9))

(Expression 4)

$$D = 10^{-4.8} \cdot \exp\left(\frac{-262000}{R \cdot T}\right) \qquad (7)$$

(in Expression (7), T is a slab heating temperature (° C.), and R is a gas constant; 8.314 J/mol)

$$A_{c1} = 723 - 10.7 \times Mn - 16.9 \times Ni + 29.1 \times Si + 16.9 \times Cr \qquad (8)$$

(element symbols in Expression (8) indicate the mass % of the corresponding elements in steel)

$$A_{c3} = 879 - 346 \times C + 65 \times Si - 18 \times Mn + 54 \times Al \qquad (9)$$

(element symbols in Expression (9) indicate the mass % of the corresponding elements in steel)

The numerator of Expression (4) represents the degree of Mn content to which Mn is distributed from α to γ during retention in a dual phase region of α (ferrite) and γ (austenite). The larger the numerator of Expression (4), the more inhomogeneous the Mn concentration distribution in the steel.

The denominator of Expression (4) is a term corresponding to the distance of Mn atoms diffusing into γ during the retention in a γ single phase region. The larger the denominator of Expression (4), the more homogeneous the Mn concentration distribution. In order to sufficiently homogenize the Mn concentration distribution in the steel, it is preferable to select the slab heating conditions so that the value of Expression (4) is 1.0 or less. The smaller the value of Expression (4), the more the number density of coarse lump-like austenite grains in the steel sheet inside of the steel sheet obtained by performing the second heat treatment on the steel sheet for a heat treatment can be reduced.

(Hot Rolling)

After heating the slab, hot rolling is performed. When the hot rolling completion temperature (finishing temperature) is lower than 850° C., the rolling reaction force increases and it becomes difficult to stably obtain a specified sheet thickness. Therefore, the hot rolling completion temperature is preferably set to 850° C. or higher. From the viewpoint of rolling reaction force, the hot rolling completion temperature is preferably set to 870° C. or higher. On the other hand, in order to cause the hot rolling completion temperature to be higher than 1050° C., it is necessary to heat the steel sheet using a heating apparatus or the like in the steps from the end of the heating of the slab to the end of the hot rolling, which requires a high cost. For this reason, it is preferable to set the hot rolling completion temperature to 1050° C. or lower. In order to easily secure the steel sheet temperature during hot rolling, the hot rolling completion temperature is preferably set to 1000° C. or lower, and is more preferably set to 980° C. or lower.

(Pickling Step)

Next, the hot-rolled steel sheet thus manufactured is pickled. The pickling is a step of removing oxides on the surface of the hot-rolled steel sheet, and is important for improving the chemical convertibility and plating adhesion of the steel sheet. The pickling of the hot-rolled steel sheet may be performed once or may be performed a plurality of times.

(Cold Rolling)

The pickled hot-rolled steel sheet may be cold-rolled into a cold-rolled steel sheet. By performing cold rolling on the hot-rolled steel sheet, it is possible to manufacture a steel sheet having a predetermined sheet thickness with high accuracy. In the cold rolling, when the total rolling reduction (cumulative rolling reduction in the cold rolling) exceeds 85%, the ductility of the steel sheet is lost, and the risk of the steel sheet fracturing during the cold rolling increases. Therefore, the total rolling reduction is preferably set to 85% or less, and is more preferably set to 75% or less. The lower limit of the total rolling reduction in the cold rolling step is not particularly specified, and cold rolling may be omitted. In order to improve the shape homogeneity of the steel sheet to obtain a good external appearance and to cause the steel sheet temperature during the first heat treatment and the second heat treatment to be uniform to obtain good ductility, the total rolling reduction in the cold rolling is preferably set to 0.5% or more, and is more preferably set to 1.0% or more.

(First Heat Treatment)

Next, the pickled hot-rolled steel sheet or the cold-rolled steel sheet obtained by cold-rolling the hot-rolled steel sheet is subjected to the first heat treatment, whereby the steel sheet for a heat treatment is manufactured. The first heat treatment is performed under the conditions that satisfy the following (a) to (e).

(a) An atmosphere containing 0.1 vol % or more of $H_2$ and satisfying Expression (3) is adopted from 650° C. to a highest heating temperature reached.

$$\log(PH_2O/PH_2) < -1.1 \quad (3)$$

(in Expression (3), log represents the common logarithm, $PH_2O$ represents the partial pressure of water vapor, and $PH_2$ represents the partial pressure of hydrogen)

In the first heat treatment, by satisfying the above (a), a decarburization reaction in the steel sheet surface layer portion is suppressed, and thus the formation of ferrite is suppressed.

When $H_2$ in the atmosphere is less than 0.1 vol %, an oxide film present on the surface of the steel sheet cannot be sufficiently reduced and the oxide film is formed on the steel sheet. For this reason, the chemical convertibility and plating adhesion of the steel sheet obtained after the second heat treatment are reduced.

On the other hand, when the $H_2$ content in the atmosphere exceeds 20 vol %, the effect is saturated. When the $H_2$ content in the atmosphere exceeds 20 vol %, the risk of hydrogen explosion during an operation increases. Therefore, it is preferable to set the $H_2$ content in the atmosphere to 20 vol % or less.

In a case where the $\log(PH_2O/PH_2)$ is $-1.1$ or more, the decarburization reaction proceeds on the surface layer portion of the steel sheet and ferrite is formed in the surface layer portion. As a result, in the steel sheet after the second heat treatment, the proportion of ferrite grains having an aspect ratio of less than 3.0 increases.

(b) Holding is performed at a highest heating temperature of $A_{c3}-30°$ C. to 1000° C. for 1 second to 1000 seconds.

In the first heat treatment, the highest heating temperature is set to $A_{c3}-30°$ C. or higher. When the highest heating temperature is lower than $A_{c3}-30°$ C., lump-like coarse ferrite remains in the steel structure of the steel sheet inside of the steel sheet for a heat treatment. As a result, the volume fraction of the soft ferrite of the steel sheet obtained after the second heat treatment of the steel sheet for a heat treatment becomes excessive, and the number proportion of retained austenite having an aspect ratio of 2.0 or more becomes insufficient, resulting in the deterioration of properties. The highest heating temperature is preferably set to $A_{c3}-15°$ C. or higher, and is more preferably set to $A_{c3}+5°$ C. or higher. On the other hand, heating to an excessively high temperature increases the fuel cost required for heating and also causes damage to the furnace body. Therefore, the highest heating temperature is set to 1000° C. or lower.

In the first heat treatment, the retention time at the highest heating temperature is set to 1 second to 1000 seconds. When the retention time is shorter than 1 second, lump-like coarse ferrite remains in the steel structure of the steel sheet inside in the steel sheet for a heat treatment. As a result, the volume fraction of soft ferrite in the steel sheet obtained after the second heat treatment becomes excessive, resulting in the deterioration of properties. The retention time is preferably 10 seconds or more, and is more preferably 50 seconds or more. On the other hand, when the retention time is too long, not only is the effect of heating to the highest heating temperature saturated, but also productivity is impaired. Therefore, the retention time is set to 1000 seconds or shorter.

(c) Heating is performed such that the average heating rate in a temperature range from 650° C. to the highest heating temperature is 0.5° C./s to 500° C./s.

In the first heat treatment, during heating, when the average heating rate is less than 0.5° C./s in a temperature range from 650° C. to the highest heating temperature, Mn segregation proceeds during the heating treatment, and a coarse lump-like Mn-concentrated region is formed. In this case, the properties of the steel sheet obtained after the second heat treatment deteriorate. In order to suppress the generation of lump-like austenite, the average heating rate from 650° C. to the highest heating temperature is set to 0.5° C./s or more. The average heating rate is preferably 1.5° C./s or more.

On the other hand, regarding the upper limit of the average heating rate, the upper limit of the average heating rate is set to 500° C./s because the average heating rate of more than 500° C./s causes a difficulty in actual operations and it is also difficult to perform temperature control. The average heating rate from 650° C. to the highest heating temperature is obtained by dividing the difference between 650° C. and the highest heating temperature by the elapsed time from when the surface temperature of the steel sheet reaches 650° C. until the highest heating temperature is reached.

(d) After holding at the highest heating temperature, cooling is performed such that the average cooling rate in a temperature range from 700° C. to Ms is 5° C./s or more.

In the first heat treatment, in order to cause the steel structure of the steel sheet inside of the steel sheet for a heat treatment to primarily have a lath-like structure, cooling is performed so that a cooling rate in a temperature range from 700° C. to Ms represented by Expression (10) after holding at the highest heating temperature is 5° C./s or more in terms of average cooling rate. When the average cooling rate is less than 5° C./s, there are cases where lump-like ferrite is formed in the steel sheet for a heat treatment. In this case, the volume fraction of soft ferrite in the steel sheet obtained after the second heat treatment becomes excessive, and the properties such as tensile strength deteriorate. The average cooling rate is preferably set to 10° C./s or more, and is more preferably set to 30° C./s or more.

The upper limit of the average cooling rate need not be particularly specified, but special equipment is required to perform cooling at an average cooling rate of more than 500° C./s. Therefore, the average cooling rate is preferably 500° C./s or less. The average cooling rate in the temperature range from 700° C. to Ms or lower is obtained by dividing the difference between 700° C. and Ms by the elapsed time until the steel sheet surface temperature reaches from 700° C. to Ms.

$$Ms=561-407\times C-7.3\times Si-37.8\times Mn-20.5\times Cu-19.5\times Ni-19.8\times Cr-4.5\times Mo \quad (10)$$

(element symbols in Expression (10) indicate the mass % of the corresponding elements in steel)

(e) Cooling at the average cooling rate of 5° C./s or more is performed to a cooling stop temperature of Ms or lower.

In the first heat treatment, cooling in which the average cooling rate in the temperature range of 700° C. to Ms is 5° C./s or more is performed to a cooling stop temperature of Ms or lower represented by Expression (10). The cooling stop temperature may be room temperature (25° C.). By setting the cooling stop temperature to Ms or lower, the steel structure of the steel sheet inside of the steel sheet for a heat treatment obtained after the first heat treatment primarily has the lath-like structure.

In the manufacturing method of the present embodiment, the steel sheet cooled to the cooling stop temperature of Ms or lower and room temperature or higher in the first heat treatment may be continuously subjected to the second heat treatment described below. In the first heat treatment, the second heat treatment described below may be performed after cooling to room temperature and winding.

The steel sheet cooled to room temperature in the first heat treatment is the steel sheet for a heat treatment of the present embodiment described above. The steel sheet for a heat treatment becomes the steel sheet according to the present embodiment by performing the second heat treatment described below.

In the present embodiment, various treatments may be performed on the steel sheet for a heat treatment before performing the second heat treatment. For example, the steel sheet for a heat treatment may be subjected to a temper rolling treatment in order to correct the shape of the steel sheet for a heat treatment. Otherwise, in order to remove oxides present on the surface of the steel sheet for a heat treatment, the steel sheet for a heat treatment may be subjected to a pickling treatment.

(Second Heat Treatment)

The second heat treatment is applied to the steel sheet (steel sheet for a heat treatment) subjected to the first heat treatment. The second heat treatment is performed under the conditions that satisfy the following (A) to (E).

(A) An atmosphere containing 0.1 vol % or more of $H_2$ and 0.020 vol % or less of $O_2$ and having a $\log(PH_2O/PH_2)$ satisfying Expression (4) is adopted from 650° C. to a highest heating temperature reached.

$$-1.1 \leq \log(PH_2O/PH_2) \leq -0.07 \quad (4)$$

(in Expression (3), log represents the common logarithm, $PH_2O$ represents the partial pressure of water vapor, and $PH_2$ represents the partial pressure of hydrogen)

In the second heat treatment, by satisfying the above (A), an oxidation reaction outside the steel sheet is suppressed, and the decarburization reaction in the surface layer portion is promoted.

When $H_2$ in the atmosphere is less than 0.1 vol % or $O_2$ is more than 0.020 vol %, the oxide film present on the surface of the steel sheet cannot be sufficiently reduced and the oxide film is formed on the steel sheet. As a result, the chemical convertibility and plating adhesion of the steel sheet obtained after the second heat treatment are reduced. A preferable range of $H_2$ is 1.0 vol % or more, and is more preferably 2.0 vol % or more. A preferable range of $O_2$ is 0.010 vol % or less, and is more preferably 0.005 vol % or less.

When the $H_2$ content in the atmosphere exceeds 20 vol %, the effect is saturated. When the $H_2$ content in the atmosphere exceeds 20 vol %, the risk of hydrogen explosion during an operation increases. Therefore, it is preferable to set the $H_2$ content in the atmosphere to 20 vol % or less.

In a case where the $\log(PH_2O/PH_2)$ is less than −1.1, external oxidation of Si and Mn in the surface layer of the steel sheet occurs, and the decarburization reaction becomes insufficient, so that the surface layer structure of the steel sheet obtained after the second heat treatment does not satisfy a desired range. Therefore, $\log(PH_2O/PH_2)$ is set to −1.1 or more. $\log(PH_2O/PH_2)$ is preferably −0.8 or more.

On the other hand, when the $\log(PH_2O/PH_2)$ exceeds −0.07, the decarburization reaction proceeds excessively, and the strength of the steel sheet obtained after the second heat treatment becomes insufficient. Therefore, $\log(PH_2O/PH_2)$ is set to −0.07 or less.

(B) Holding is performed at a highest heating temperature of $(A_{c1}+25)°$ C. to $(A_{c3}-10)°$ C. for 1 second to 1000 seconds.

In the second heat treatment, the highest heating temperature is set to $(A_{c1}+25)°$ C. to $(A_{c3}-10)°$ C. When the highest heating temperature is lower than $(A_{c1}+25)°$ C., cementite in the steel is left dissolved, and the retained austenite fraction in the internal structure of the steel sheet obtained after the second heat treatment becomes insufficient, resulting in the deterioration of properties. The highest heating temperature is preferably set to $(A_{c1}+40)°$ C. or higher in order to increase the hard structure fraction of the steel sheet obtained after the second heat treatment and obtain a steel sheet having higher strength.

On the other hand, when the highest heating temperature exceeds $(A_{c3}-10)°$ C., most or all of the steel structure of the inside becomes austenite, so that the lath-like structure in the steel sheet (steel sheet for a heat treatment) before the second heat treatment disappears, and the lath-like structure of the steel sheet before the second heat treatment is not remained to the steel sheet after the second heat treatment. As a result, the retained austenite fraction in the internal structure of the steel sheet obtained after the second heat treatment becomes insufficient, and the number proportion of retained austenite having an aspect ratio of 2.0 or more becomes insufficient, resulting in a significant deterioration in properties. Therefore, the highest heating temperature is set to $(A_{c3}-10)°$ C. or lower. The highest heating temperature is preferably set to $(A_{c3}-20)°$ C. or lower, and is more preferably set to $(A_{c3}-30)°$ C. or lower in order to cause the lath-like structure in the steel sheet before the second heat treatment to be sufficiently remained and further improve the properties of the steel sheet.

In the second heat treatment, the retention time at the highest heating temperature is set to 1 second to 1000 seconds. When the retention time is shorter than 1 second, there is concern that cementite in the steel may remain dissolved and the properties of the steel sheet may deteriorate. The retention time is preferably 30 seconds or more. On the other hand, when the retention time is too long, not only is the effect of heating to the highest heating temperature saturated, but also productivity is reduced. Therefore, the retention time is set to 1000 seconds or shorter.

(C) Heating is performed such that the average heating rate from 650° C. to the highest heating temperature is 0.5° C./s to 500° C./s.

When the average heating rate from 650° C. to the highest heating temperature in the second heat treatment is less than 0.5° C./s, recovery of the lath-like structure generated in the first heat treatment progresses and the volume fraction of soft ferrite having no austenite grains in the grains increases. On the other hand, when the average heating rate exceeds 500° C./s, the decarburization reaction does not proceed sufficiently.

(D) Cooling from the highest heating temperature to 480° C. or lower is performed such that the average cooling rate from 700° C. to 600° C. is 3° C./s or more.

In the second heat treatment, cooling from the highest heating temperature to 480° C. or lower is performed. Here, the average cooling rate between 700° C. and 600° C. is set to 3° C./s or more. When cooling of the above range is performed at an average cooling rate of less than 3° C./s, coarse carbides are generated and the properties of the steel sheet are impaired. The average cooling rate is preferably set to 10° C./s or more. The upper limit of the average cooling rate need not be particularly provided, but a special cooling device is required to perform cooling at more than 200° C./s. Therefore, the upper limit is preferably set to 200° C./s or less.

(E) Holding is performed at 300° C. to 480° C. for 10 seconds or more.

Subsequently, the steel sheet is held for 10 seconds or more in a temperature range between 300° C. and 480° C. When the retention time is shorter than 10 seconds, carbon is not sufficiently concentrated in untransformed austenite. In this case, lath-like ferrite does not grow sufficiently and concentration of C in austenite does not proceed. As a result, fresh martensite is generated during the final cooling after the holding, and the properties of the steel sheet greatly deteriorate. The retention time is preferably set to 100 seconds or more in order to cause the concentration of carbon into austenite to sufficiently proceed, reduce the amount of martensite produced, and improve the properties of the steel sheet. Although it is not necessary to limit the upper limit of the retention time, the retention time may be set to 1000 seconds or shorter because an excessively long retention time causes a reduction in productivity.

In a case where the cooling stop temperature is lower than 300° C., the steel sheet may be reheated to 300° C. to 480° C. and then held.

<Galvanizing Step>

The steel sheet after the second heat treatment may be subjected to hot-dip galvanizing to form a hot-dip galvanized layer on the surface. Furthermore, subsequent to the formation of the hot-dip galvanized layer, an alloying treatment may be performed on the plated layer.

Moreover, electrogalvanizing may be performed on the steel sheet after the second heat treatment to form an electrogalvanized layer on the surface.

Figure 4:
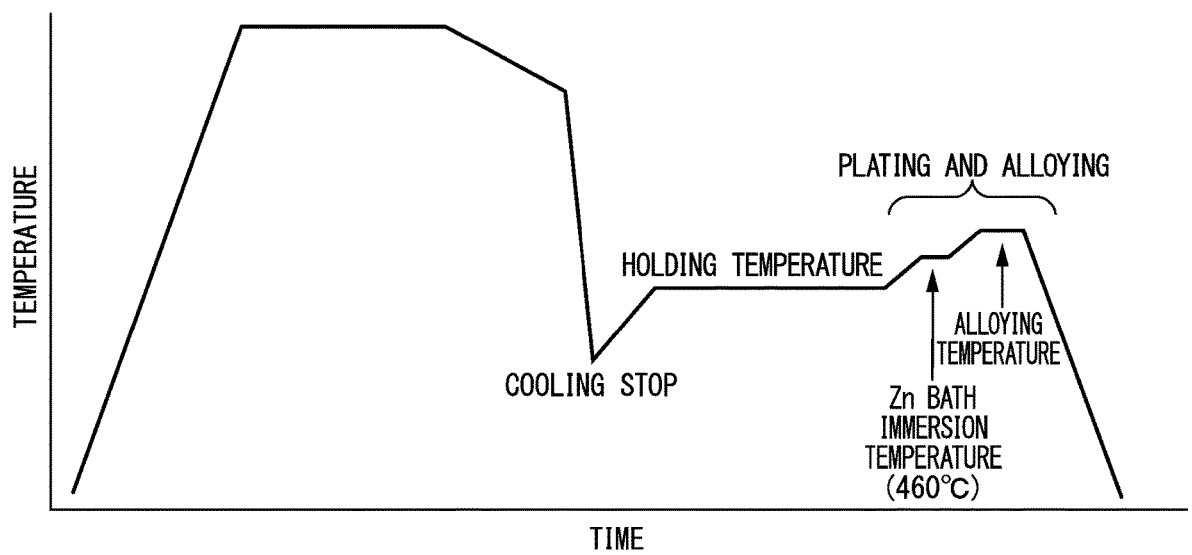
FIG. 4 is a diagram showing a first example of a temperature-time pattern of a second heat treatment to a hot-dip galvanizing and alloying treatment in a method for manufacturing the steel sheet according to the present embodiment.

The hot-dip galvanizing, alloying treatment, and electrogalvanizing may be performed at any timing after the completion of the cooling step (D) in the second heat treatment as long as the conditions specified by the present invention are satisfied. For example, as shown as a pattern [1] in FIG. 4, a plating treatment (and an alloying treatment as necessary) may be performed after the cooling step (D) and the isothermal holding step (E). Otherwise, as shown as a pattern [2] in FIG. 5, a plating treatment (and an alloying treatment as necessary) may be performed after the cooling step (D), and thereafter the isothermal holding step (E) may be performed. Alternatively, as shown as a pattern [3] in FIG. 6, cooling to room temperature is performed once after the cooling step (D) and the isothermal holding step (E), and thereafter a plating treatment (and an alloying treatment as necessary) may be performed.

As plating conditions such as a molten zinc bath temperature and a molten zinc bath composition in the hot-dip galvanizing step, general conditions can be used, and there is no particular limitation. For example, the plating bath temperature may be 420° C. to 500° C., the sheet temperature of the steel sheet input to the plating bath may be 420° C. to 500° C., and the immersion time may be 5 seconds or shorter. The plating bath is preferably a plating bath containing 0.08% to 0.2% of Al, but may further contain Fe, Si, Mg, Mn, Cr, Ti, and Pb as unavoidable impurities. Furthermore, it is preferable to control the hot-dip galvanizing adhesion amount by a known method such as gas wiping. The adhesion amount may be usually 5 $g/m^2$ or more per side, but is preferably 20 to 120 $g/m^2$, and is more preferably 25 to 75 $g/m^2$.

The high strength hot-dip galvanized steel sheet on which the hot-dip galvanized layer is formed may be subjected to an alloying treatment, as necessary, as described above.

In the alloying treatment, the alloying treatment temperature is preferably set to 460° C. to 600° C. When the alloying treatment is performed at lower than 460° C., the alloying rate becomes slow, the productivity is lowered, and an irregular alloying treatment occurs.

On the other hand, when the alloying treatment temperature exceeds 600° C., alloying proceeds excessively and the plating adhesion of the steel sheet deteriorates. The alloying treatment temperature is more preferably 480° C. to 580° C. The heating time of the alloying treatment is preferably set to 5 to 60 seconds.

Furthermore, the alloying treatment is preferably performed under the condition that the iron concentration in the hot-dip galvanized layer is 6.0 mass % or more.

In a case of performing electrogalvanizing, the conditions thereof are not particularly limited.

By performing the second heat treatment described above, the steel sheet according to the present embodiment described above is obtained.

In the present embodiment, the steel sheet may be subjected to cold rolling for the purpose of shape correction. The cold rolling may be performed after performing the first heat treatment or after performing the second heat treatment. Otherwise, the cold rolling may be performed both after performing the first heat treatment and after performing the second heat treatment. Regarding the rolling reduction of the cold rolling, the rolling reduction is preferably set to 3.0% or less, and is more preferably set to 1.2% or less. When the rolling reduction of the cold rolling exceeds 3.0%, a part of the retained austenite is transformed into martensite by strain-induced transformation, and there is concern that the volume fraction of the retained austenite may decrease and the properties may be impaired. On the other hand, the lower limit of the rolling reduction of the cold rolling is not particularly specified, and the properties of the steel sheet according to the present embodiment can also be obtained without cold rolling.

Next, a method for measuring each configuration of the steel sheet according to the present embodiment and the steel sheet for a heat treatment according to the present embodiment will be described.

"Measurement of Steel Structure"

The volume fractions of ferrite (soft ferrite, hard ferrite), bainite, tempered martensite, fresh martensite, pearlite, cementite, and retained austenite contained in the steel structures of the steel sheet inside and the soft layer can be measured using the method described below.

A sample is taken with a sheet thickness cross section parallel to the rolling direction of the steel sheet as an observed section, and the observed section is polished and subjected to nital etching. Next, in the case of observing the steel structure of the inside of the steel sheet, in one or a plurality of observed visual fields of the ⅛ to ⅜ thickness range centered on the ¼ thickness position from the surface of the observed section, and in the case of observing the steel structure of the soft layer, in one or a plurality of observed visual fields of the region including the depth range of the soft layer from the outermost layer of the steel sheet, a total area of $2.0 \times 10^{-9}$ m$^2$ or more is observed with a field emission scanning electron microscope (FE-SEM). In addition, the area fractions of ferrite, bainite, tempered martensite, fresh martensite, pearlite, cementite, and retained austenite are measured, and are regarded as the volume fractions.

Here, a region having a substructure in the grains and containing carbides precipitated with a plurality of variants is determined as tempered martensite. A region where cementite is precipitated in a lamellar form is determined as pearlite or cementite. A region where the brightness is low and the substructure is not recognized is determined as ferrite (soft ferrite or hard ferrite). A region where the brightness is high and the substructure is not revealed by etching is determined as fresh martensite or retained austenite. The remainder is determined as bainite. The volume fraction of each thereof is calculated by a point counting method and determined as the volume fraction of each structure.

Regarding the volume fractions of hard ferrite and soft ferrite, the volume fraction of each thereof is obtained by the method described below based on the measured volume fraction of ferrite.

The volume fraction of fresh martensite can be obtained by subtracting the volume fraction of retained austenite obtained by an X-ray diffraction method described below from the volume fraction of fresh martensite or retained austenite.

In the steel sheet according to the present embodiment and the steel sheet for a heat treatment which is to be the material thereof, the volume fraction of retained austenite contained in the steel sheet inside is evaluated by the X-ray diffraction method. Specifically, in the ⅛ to ⅜ thickness range centered on the ¼ thickness position of the sheet thickness from the surface, a surface parallel to the sheet surface is mirror-finished, and the area fraction of FCC iron is measured by the X-ray diffraction method and is determined as the volume fraction of retained austenite.

"Ratio Between Volume Fraction of Retained Austenite Contained in Soft Layer and Volume Fraction of Retained Austenite Contained in Steel Sheet Inside"

In the steel sheet according to the present embodiment, the ratio between the volume fraction of retained austenite contained in the soft layer and the volume fraction of retained austenite of the steel sheet inside is evaluated by performing a high-resolution crystal structure analysis by an electron back scattering diffraction (EBSD) method. Specifically, a sample is taken with a sheet thickness cross section parallel to the rolling direction of the steel sheet as an observed section, and the observed section is polished and mirror-finished. Furthermore, in order remove the processed layer of the surface layer, electrolytic polishing or mechanical polishing using colloidal silica is performed. Next, for the surface layer portion of the steel sheet including the soft layer and the steel sheet inside (in the ⅛ to ⅜ thickness range centered on the ¼ thickness position from the surface), a crystal structure analysis according to the EBSD method is performed so that the total area of the observed visual fields is $2.0 \times 10^{-9}$ m$^2$ or more in total (allowed in a plurality of visual fields or the same visual field). For the analysis of the data obtained by the EBSD method in the measurement, "OIM Analysis 6.0" manufactured by TSL is used. A step size is set to 0.01 to 0.20 μm. From the observation result, the region determined as FCC iron is determined as retained austenite, and the volume fraction of retained austenite of each of the soft layer and the steel sheet inside is calculated.

"Measurement of Aspect Ratio and Major Axis of Retained Austenite Grains"

The aspect ratio and major axis of the retained austenite grains contained in the steel structure of the steel sheet inside are evaluated by performing a high-resolution crystal orientation analysis by the EBSD method. Specifically, a sample is taken with a sheet thickness cross section parallel to the rolling direction of the steel sheet as an observed section, and the observed section is polished and mirror-finished. Furthermore, in order remove the processed layer of the surface layer, electrolytic polishing or mechanical polishing using colloidal silica is performed. Next, for the steel sheet inside (in the ⅛ to ⅜ thickness range centered on the ¼ thickness position from the surface), a crystal structure analysis according to the EBSD method is performed on an area of $2.0 \times 10^{-9}$ m$^2$ or more in total (allowed in a plurality of visual fields or the same visual field). From the observation result, the region determined as FCC iron is determined as retained austenite.

Next, from the crystal orientations of the retained austenite grains measured by the above method, in order to avoid a measurement error, only austenite grains having a major axis length of 0.1 μm or more are extracted and a crystal orientation map is drawn. A boundary that causes a crystal orientation difference of 10° or more is regarded as a grain boundary between retained austenite grains. The aspect ratio is a value obtained by dividing the major axis length of the retained austenite grains by the minor axis length. The major axis is the major axis length of the retained austenite grains. From this result, the number proportion of the retained austenite having an aspect ratio of 2.0 or more in the total retained austenite is obtained.

For the analysis of the data obtained by the EBSD method, "OIM Analysis 6.0" manufactured by TSL is used. The distance between marks (step) is set to 0.01 to 0.20

"Ferrite Grains Containing Austenite Grains (Hard Ferrite)/Ferrite Grains not Containing Austenite Grains (Soft Ferrite)"

A method for separating ferrite grains into grains containing (encapsulating) austenite grains and grains not containing austenite grains will be described. First, grains are observed using FE-SEM, and a high-resolution crystal orientation analysis is performed by the EBSD method. Specifically, a sample is taken with a sheet thickness cross section parallel to the rolling direction of the steel sheet as an observed section, and the observed section is polished and mirror-finished. Furthermore, in order remove the processed layer of the surface layer, electrolytic polishing or mechanical polishing using colloidal silica is performed. Next, for the steel sheet inside (in the ⅛ to ⅜ thickness range centered on the ¼ thickness position from the surface), a crystal structure analysis according to the EBSD method is performed on an area of $2.0 \times 10^{-9}$ m² or more in total (allowed in a plurality of visual fields or the same visual field). Next, for the data obtained from BCC iron, a boundary that causes a crystal orientation difference of 15° or more is regarded as a grain boundary, and a grain boundary map of ferrite grains is drawn. Next, from the data obtained from FCC iron, in order to avoid a measurement error, a grain distribution map is drawn only with austenite grains with a major axis length of 0.1 μm or more, and is superimposed on the grain boundary map of ferrite grains.

When one ferrite grain has one or more austenite grains completely incorporated therein, the ferrite grain is referred to as "ferrite grain containing austenite grain". Furthermore, a case where the austenite grains are not adjacent to each other or only the austenite grains are adjacent to each other only at the boundary between the other grains is determined as "ferrite grains containing no austenite grain".

"Hardness from Surface Layer to Steel Sheet Inside"

The hardness distribution from the surface layer to the steel sheet inside for determining the thickness of the soft layer can be obtained, for example, by the following method.

A sample is taken with a sheet thickness cross section parallel to the rolling direction of the steel sheet as an observed section, the observed section is polished and mirror-finished, and chemical polishing is performed using colloidal silica to remove the processed layer of the surface layer. For the observed section of the obtained sample, using a micro hardness measuring device, a Vickers indenter having a square-based pyramid shape with an apex angle of 136° is pressed against a range from a position at a depth of 5 μm from the outermost layer as the starting point to a ⅛ thickness position of the sheet thickness from the surface, at a pitch of 10 μm in the thickness direction of the steel sheet. At this time, the pressing load is set so that the Vickers indentations do not interfere with each other. For example, the pressing load is 2 gf. Thereafter, the diagonal length of the indentation is measured using an optical microscope, a scanning electron microscope, or the like, and converted into a Vickers hardness (Hv).

Next, the measurement position is moved by 10 μm or more in the rolling direction, and the same measurement is performed on a range from a position at a depth of 10 μm from the outermost layer as the starting point to a ⅛ thickness position of the sheet thickness. Next, the measurement position is moved again by 10 μm or more in the rolling direction, and the same measurement is performed on a range from a position at a depth of 5 μm from the outermost layer as the starting point to a ⅛ thickness position of the sheet thickness. Next, the measurement position is moved by 10 μm or more in the rolling direction, and the same measurement is performed on a range from a position at a depth of 10 μm from the outermost layer as the starting point to a ⅛ thickness position of the sheet thickness. As illustrated in FIG. 7, by repeating this, five Vickers hardnesses were measured at each thickness position. In this manner, in effect, hardness measurement data can be obtained at a pitch of 5 μm in the depth direction. The measurement interval is not simply set to a pitch of 5 μm in order to avoid interference between the indentations. The average value of the 5 points is taken as the hardness at that thickness position. By interpolating the data with a straight line, a hardness profile in the depth direction is obtained. The thickness of the soft layer is obtained by reading the depth position where the hardness is 80% or less of the hardness of the base metal from the hardness profile.

On the other hand, the hardness of the steel sheet inside is obtained by measuring at least five hardnesses in the ⅛ to ⅜ thickness range centered on the ¼ thickness position using the micro hardness measuring device in the same manner as above and averaging the values.

As the micro hardness measuring device, for example, FISCHERSCOPE (registered trademark) HM2000 XYp can be used.

"Aspect Ratio of Ferrite Contained in Soft Layer and Proportion of Grains Having Aspect Ratio of 3.0 or More"

The aspect ratio of ferrite in the soft layer is evaluated by observing grains using FE-SEM and performing a high-resolution crystal orientation analysis by the electron back scattering diffraction (EBSD) method. For the analysis of the data obtained by the EBSD method, "OIM Analysis 6.0" manufactured by TSL is used. A step size is set to 0.01 to 0.20 μm.

From the observation result, a region determined as BCC iron is regarded as ferrite, and a crystal orientation map is drawn. In addition, a boundary that causes a crystal orientation difference of 15° or more is regarded as a grain boundary. The aspect ratio is a value obtained by dividing the major axis length of each ferrite grain by the minor axis length.

"Radio-Frequency Glow Discharge (Radio-Frequency GDS) Analysis"

When the steel sheet and the steel sheet for a heat treatment according to the present embodiment are analyzed by a radio-frequency glow discharge analysis method, a known radio-frequency GDS analysis method can be used.

Specifically, a method in which the surface of the steel sheet is analyzed in the depth direction while the surface of the steel sheet is sputtered in a state where a glow plasma is generated by applying a voltage in an Ar atmosphere. In addition, an element contained in the material (steel sheet) is identified from the emission spectrum wavelength peculiar to the element that is emitted when atoms are excited in the glow plasma, and the amount of the element contained in the material is estimated from the emission intensity of the identified element. Data in the depth direction can be estimated from a sputtering time. Specifically, the sputtering time can be converted into a sputtering depth by obtaining the relationship between the sputtering time and the sputtering depth using a standard sample in advance. Therefore, the sputtering depth converted from the sputtering time can be defined as the depth from the surface of the material.

In the radio-frequency GDS analysis, a commercially available analyzer can be used. In the present embodiment, a radio-frequency glow discharge optical emission spectrometer GD-Profiler 2 manufactured by Horiba Ltd. is used.

Example

Next, examples of the present invention will be described. The conditions in the examples are one example of conditions adopted to confirm the feasibility and effects of the present invention. The present invention is not limited to this one example of conditions. The present invention can adopt various conditions as long as the object of the present invention is achieved without departing from the gist of the present invention.

Steel having the chemical composition shown in Table 1 was melted to produce a slab. This slab was heated at the slab heating temperature shown in Tables 2 to 5 under the slab heating conditions having the numerical values of Expression (4) shown in Tables 2 to 5, and subjected to hot rolling at the temperature shown in Tables 2 to 5 as the rolling completion temperature, whereby a hot-rolled steel sheet was manufactured. Thereafter, the hot-rolled steel sheet was pickled to remove the scale on the surface. Thereafter, some of the hot-rolled steel sheets were subjected to cold rolling to obtain cold-rolled steel sheets.

TABLE 1

| Kind of steel | C | Si | Mn | P | S | Al | N | O | Nb | Ti | V |
|---|---|---|---|---|---|---|---|---|---|---|---|
| | mass % remainder consisting of Fe and impurities | | | | | | | | | | |
| A | 0.195 | 1.12 | 2.45 | 0.005 | 0.0016 | 0.059 | 0.0035 | 0.0008 | — | — | — |
| B | 0.220 | 1.71 | 2.48 | 0.012 | 0.0015 | 0.035 | 0.0014 | 0.0011 | — | — | — |
| C | 0.350 | 1.80 | 2.80 | 0.005 | 0.0011 | 0.030 | 0.0008 | 0.0032 | — | — | — |
| D | 0.079 | 1.09 | 2.60 | 0.009 | 0.0005 | 0.020 | 0.0015 | 0.0017 | — | 0.030 | — |
| E | 0.155 | 1.15 | 1.28 | 0.005 | 0.0030 | 0.042 | 0.0020 | 0.0012 | — | 0.036 | — |
| F | 0.135 | 0.86 | 1.92 | 0.005 | 0.0016 | 0.059 | 0.0035 | 0.0008 | — | — | — |
| G | 0.309 | 0.71 | 2.95 | 0.015 | 0.0034 | 0.035 | 0.0073 | 0.0010 | — | — | — |
| H | 0.360 | 0.38 | 2.35 | 0.008 | 0.0048 | 0.750 | 0.0014 | 0.0010 | 0.013 | — | — |
| I | 0.194 | 1.19 | 3.09 | 0.012 | 0.0038 | 0.086 | 0.0008 | 0.0020 | — | — | — |
| J | 0.194 | 0.22 | 2.94 | 0.008 | 0.0040 | 1.246 | 0.0022 | 0.0019 | — | — | 0.109 |
| K | 0.193 | 0.94 | 0.94 | 0.017 | 0.0003 | 0.038 | 0.0017 | 0.0025 | — | — | — |
| L | 0.105 | 1.76 | 2.87 | 0.016 | 0.0040 | 0.081 | 0.0050 | 0.0018 | — | — | — |
| M | 0.111 | 0.94 | 2.41 | 0.011 | 0.0015 | 0.004 | 0.0030 | 0.0027 | — | — | — |
| N | 0.086 | 1.52 | 1.56 | 0.014 | 0.0008 | 0.046 | 0.0096 | 0.0008 | — | — | — |
| O | 0.170 | 0.33 | 2.49 | 0.012 | 0.0029 | 0.644 | 0.0008 | 0.0012 | — | — | — |
| P | 0.171 | 1.90 | 2.00 | 0.010 | 0.0069 | 0.027 | 0.0041 | 0.0015 | — | — | — |
| Q | 0.220 | 1.20 | 3.20 | 0.007 | 0.0030 | 0.032 | 0.0030 | 0.0010 | — | — | — |
| R | 0.210 | 1.15 | 2.20 | 0.011 | 0.0034 | 0.040 | 0.0035 | 0.0010 | 0.020 | — | — |
| S | 0.180 | 2.20 | 2.70 | 0.011 | 0.0048 | 0.035 | 0.0032 | 0.0020 | 0.050 | — | — |
| T | 0.163 | 0.25 | 0.80 | 0.009 | 0.0026 | 0.020 | 0.0042 | 0.0013 | — | — | — |
| U | 0.220 | 1.50 | 2.40 | 0.013 | 0.0015 | 0.040 | 0.0043 | 0.0020 | — | 0.050 | — |
| V | 0.180 | 1.60 | 2.60 | 0.008 | 0.0011 | 0.032 | 0.0043 | 0.0008 | 0.020 | 0.020 | — |
| W | <u>0.041</u> | 1.15 | 1.86 | 0.006 | 0.0028 | 0.054 | 0.0027 | 0.0009 | — | — | — |
| X | 0.163 | 0.38 | 1.92 | 0.009 | 0.0026 | 0.063 | 0.0042 | 0.0013 | <u>0.350</u> | — | — |
| Y | 0.156 | 1.17 | <u>0.47</u> | 0.010 | 0.0024 | 0.059 | 0.0035 | 0.0011 | — | — | — |
| Z | 0.200 | <u>3.20</u> | 1.20 | 0.008 | 0.0033 | 0.035 | 0.0042 | 0.0012 | — | — | — |
| AA | 0.210 | 1.10 | <u>5.20</u> | <u>0.150</u> | 0.0030 | 0.035 | 0.0035 | 0.0013 | — | — | — |

| Kind of steel | Ni | Cu | Cr | Mo | B | Others | Formula (1) | Ac1 °C. | Ac3 °C. | Ms °C. |
|---|---|---|---|---|---|---|---|---|---|---|
| | mass % remainder consisting of Fe and impurities | | | | | | | | | |
| A | — | — | — | — | — | | 1.40 | 729 | 825 | 381 |
| B | — | — | — | — | — | Co: 0.13 | 1.98 | 746 | 846 | 365 |
| C | — | — | — | — | — | Ca: 0.0018 | 2.10 | 745 | 812 | 300 |
| D | — | — | — | 0.200 | — | | 1.36 | 727 | 856 | 422 |
| E | — | — | — | — | — | | 1.30 | 743 | 861 | 441 |
| F | — | — | — | — | — | | 1.09 | 727 | 841 | 427 |
| G | — | — | — | — | — | | 1.03 | 712 | 775 | 319 |
| H | — | — | — | — | — | | 1.07 | 709 | 868 | 323 |
| I | — | — | — | — | — | | 1.55 | 725 | 822 | 357 |
| J | — | — | — | — | — | | 1.26 | 698 | 953 | 369 |
| K | — | — | 1.05 | — | — | | 1.05 | 758 | 847 | 419 |
| L | — | — | — | — | — | Sb: 0.086 | 2.10 | 744 | 878 | 397 |
| M | — | — | — | — | 0.0014 | | 1.18 | 725 | 837 | 418 |
| N | 0.350 | 0.090 | — | — | 0.0020 | | 1.70 | 751 | 892 | 456 |
| O | — | — | — | — | — | La: 0.0016 | 0.97 | 706 | 887 | 395 |
| P | — | — | — | 0.160 | — | | 2.12 | 757 | 880 | 401 |
| Q | — | — | — | — | — | Zr: 0.003, REM: 0.003 | 1.54 | 724 | 802 | 342 |
| R | — | — | — | 0.050 | 0.0020 | | 1.39 | 733 | 832 | 384 |

TABLE 1-continued

| | | | | | | | | | |
|---|---|---|---|---|---|---|---|---|---|
| S | — | — | — | — | — | W: 0.03, Sn: 0.03 | 2.49 | 758 | 871 | 370 |
| T | — | — | 0.40 | — | — | Mg: 0.004 | 0.34 | 728 | 826 | 455 |
| U | — | — | — | — | — | Hf: 0.005 | 1.76 | 741 | 840 | 370 |
| V | — | — | — | — | — | Bi: 0.002, Ce: 0.002 | 1.88 | 742 | 844 | 378 |
| W | — | — | — | — | — | | 1.37 | 737 | 889 | 466 |
| X | — | — | — | — | — | | 0.61 | 714 | 816 | 419 |
| Y | — | — | — | — | — | | 1.25 | 752 | 888 | 471 |
| Z | — | — | — | — | — | | 3.34 | 803 | 945 | 411 |
| AA | — | — | — | — | — | | 1.64 | 699 | 853 | 271 |

* Underlined values are outside the range of the present invention

TABLE 2

| Experimental Example | Kind of steel | Hot rolling step Slab heating temperature °C. | Formula (4) | Rolling completion temperature °C. | Cold rolling step Cold rolling reduction % |
|---|---|---|---|---|---|
| 1 | A | 1260 | 0.6 | 900 | 53 |
| 2 | A | 1250 | 0.6 | 930 | 53 |
| 3 | A | 1220 | 0.6 | 950 | 53 |
| 4 | A | 1290 | 1.4 | 940 | 53 |
| 5 | A | 1280 | 0.6 | 970 | 53 |
| 6 | A | 1290 | 0.6 | 970 | 53 |
| 7 | A | 1230 | 0.4 | 950 | 53 |
| 8 | A | 1200 | 0.8 | 990 | 53 |
| 9 | A | 1220 | 0.5 | 940 | 53 |
| 10 | A | 1200 | 0.6 | 890 | 53 |
| 11 | A | 1290 | 0.5 | 950 | 53 |
| 12 | A | 1250 | 0.5 | 990 | 53 |
| 13 | B | 1290 | 0.6 | 960 | 53 |
| 14 | B | 1270 | 0.4 | 890 | 53 |
| 15 | B | 1300 | 0.5 | 950 | 53 |
| 16 | B | 1260 | 0.5 | 920 | 53 |
| 17 | B | 1250 | 0.5 | 900 | 53 |
| 18 | C | 1280 | 0.6 | 950 | 53 |
| 19 | C | 1240 | 1.3 | 890 | 53 |
| 20 | C | 1260 | 0.5 | 980 | 53 |
| 21 | C | 1200 | 0.7 | 950 | 53 |
| 22 | D | 1230 | 0.6 | 950 | 53 |
| 23 | D | 1240 | 0.5 | 950 | 53 |
| 24 | D | 1280 | 0.8 | 990 | 53 |
| 25 | D | 1210 | 0.5 | 950 | 53 |
| 26 | D | 1220 | 0.6 | 930 | 53 |
| 27 | D | 1230 | 0.7 | 950 | 53 |
| 28 | D | 1280 | 0.6 | 920 | 53 |
| 29 | D | 1280 | 0.7 | 960 | 53 |
| 30 | E | 1250 | 0.5 | 960 | 53 |
| 31 | E | 1280 | 0.4 | 970 | 53 |
| 32 | F | 1250 | 0.4 | 950 | 53 |
| 33 | F | 1250 | 0.5 | 990 | 53 |
| 34 | G | 1300 | 0.5 | 900 | 53 |
| 35 | G | 1300 | 0.7 | 950 | 53 |
| 36 | G | 1250 | 0.8 | 940 | 53 |
| 37 | G | 1290 | 0.6 | 900 | 53 |
| 38 | G | 1230 | 0.6 | 930 | 53 |
| 39 | H | 1240 | 0.5 | 910 | 53 |

* Underlined values are outside the range of the present invention

TABLE 3

| Experimental Example | Kind of steel | Hot rolling step Slab heating temperature °C. | Formula (4) | Rolling completion temperature °C. | Cold rolling step Cold rolling reduction % |
|---|---|---|---|---|---|
| 40 | I | 1210 | 0.5 | 980 | 53 |
| 41 | I | 1290 | 0.6 | 940 | 53 |
| 42 | I | 1210 | 0.6 | 950 | 53 |
| 43 | I | 1260 | 0.8 | 960 | 53 |
| 44 | I | 1260 | 0.6 | 980 | 53 |
| 45 | I | 1270 | 0.5 | 920 | Absent |
| 46 | I | 1220 | 0.6 | 950 | Absent |
| 47 | I | 1290 | 0.6 | 990 | 53 |
| 48 | I | 1260 | 0.5 | 970 | 53 |
| 49 | I | 1270 | 1.6 | 980 | 53 |
| 50 | J | 1210 | 0.7 | 970 | 53 |
| 51 | J | 1250 | 0.5 | 990 | 53 |
| 52 | K | 1210 | 0.7 | 940 | 53 |
| 53 | L | 1220 | 0.6 | 940 | 53 |
| 54 | L | 1200 | 0.5 | 930 | 53 |
| 55 | M | 1260 | 0.7 | 970 | 53 |
| 56 | N | 1230 | 0.7 | 940 | 53 |
| 57 | O | 1260 | 0.5 | 940 | 53 |
| 58 | P | 1200 | 0.8 | 940 | 53 |
| 59 | Q | 1290 | 0.6 | 940 | 53 |
| 60 | R | 1250 | 0.5 | 990 | 53 |
| 61 | S | 1200 | 0.6 | 940 | 53 |
| 62 | T | 1280 | 0.6 | 890 | 53 |
| 63 | U | 1290 | 0.5 | 900 | 53 |
| 64 | U | 1260 | 0.8 | 900 | 53 |
| 65 | U | 1220 | 0.4 | 890 | 53 |
| 66 | U | 1240 | 0.6 | 950 | 53 |
| 67 | U | 1230 | 0.7 | 920 | 53 |
| 68 | U | 1290 | 0.6 | 920 | 53 |
| 69 | U | 1250 | 0.4 | 940 | 53 |
| 70 | V | 1300 | 0.6 | 950 | 53 |
| 71 | W | 1290 | 0.5 | 960 | 53 |
| 72 | X | 1260 | 0.8 | 990 | 53 |
| 73 | Y | 1250 | 0.5 | 940 | 53 |
| 74 | Z | 1240 | 0.6 | 910 | 53 |
| 75 | AA | 1240 | 0.5 | 960 | 53 |
| 76 | A | 1220 | 0.6 | 980 | 53 |
| 77 | A | 1280 | 0.7 | 990 | 53 |
| 78 | A | 1200 | 0.7 | 900 | 53 |

* Underlined values are outside the range of the present invention

TABLE 4

| Experimental Example | Kind of steel | Hot rolling step Slab heating temperature °C. | Formula (4) | Rolling completion temperature °C. | Cold rolling step Cold rolling reduction % |
|---|---|---|---|---|---|
| 1' | A | 1270 | 0.7 | 950 | 53 |
| 2' | A | 1200 | 0.5 | 950 | 53 |
| 3' | A | 1260 | 0.7 | 910 | 53 |
| 4' | A | 1230 | 1.5 | 940 | 53 |
| 5' | A | 1270 | 0.6 | 930 | 53 |
| 6' | A | 1290 | 0.6 | 970 | 53 |

TABLE 4-continued

| Experi-mental Example | Kind of steel | Hot rolling step | | | Cold rolling step Cold rolling reduction % |
|---|---|---|---|---|---|
| | | Slab heating temperature °C. | Formula (4) | Rolling completion temperature °C. | |
| 7' | A | 1210 | 0.5 | 930 | 53 |
| 8' | A | 1230 | 0.6 | 910 | 53 |
| 9' | A | 1260 | 0.4 | 930 | 53 |
| 10' | A | 1260 | 0.8 | 940 | 53 |
| 11' | A | 1260 | 0.5 | 900 | 53 |
| 12' | A | 1230 | 0.5 | 990 | 53 |
| 13' | A | 1270 | 0.8 | 900 | 53 |
| 14' | A | 1290 | 0.8 | 970 | 53 |
| 15' | A | 1240 | 0.7 | 910 | 53 |
| 16' | A | 1230 | 0.7 | 920 | 53 |
| 17' | A | 1290 | 0.5 | 920 | 53 |
| 18' | B | 1220 | 0.6 | 930 | 53 |
| 19' | B | 1230 | 0.6 | 890 | 53 |
| 20' | B | 1220 | 0.6 | 930 | 53 |
| 21' | B | 1230 | 0.6 | 940 | 53 |
| 22' | B | 1270 | 0.4 | 990 | 53 |
| 23' | C | 1200 | 0.6 | 980 | 53 |
| 24' | C | 1220 | 1.2 | 930 | 53 |
| 25' | C | 1250 | 0.5 | 940 | 53 |
| 26' | C | 1280 | 0.5 | 950 | 53 |
| 27' | D | 1220 | 0.6 | 950 | 53 |
| 28' | D | 1250 | 0.6 | 910 | 53 |
| 29' | D | 1300 | 0.7 | 960 | 53 |
| 30' | D | 1230 | 0.5 | 950 | 53 |
| 31' | D | 1210 | 0.5 | 920 | 53 |
| 32' | D | 1210 | 0.6 | 990 | 53 |
| 33' | D | 1260 | 0.6 | 950 | 53 |
| 34' | D | 1250 | 0.7 | 890 | 53 |
| 35' | E | 1230 | 0.5 | 920 | 53 |
| 36' | E | 1290 | 0.6 | 920 | 53 |
| 37' | F | 1210 | 0.5 | 930 | 53 |
| 38' | F | 1270 | 0.6 | 900 | 53 |
| 39' | G | 1220 | 0.4 | 990 | 53 |
| 40' | G | 1300 | 0.7 | 900 | 53 |
| 41' | G | 1240 | 0.8 | 990 | 53 |
| 42' | G | 1260 | 0.5 | 910 | 53 |
| 43' | G | 1290 | 0.7 | 960 | 53 |

* Underlined values are outside the range of the present invention

TABLE 5

| Experi-mental Example | Kind of steel | Hot rolling step | | | Cold rolling step Cold rolling reduction % |
|---|---|---|---|---|---|
| | | Slab heating temperature °C. | Formula (4) | Rolling completion temperature °C. | |
| 44' | H | 1250 | 0.6 | 960 | 53 |
| 45' | I | 1200 | 0.5 | 910 | 53 |
| 46' | I | 1290 | 0.5 | 950 | 53 |
| 47' | I | 1220 | 0.6 | 930 | 53 |
| 48' | I | 1200 | 0.6 | 910 | 53 |
| 49' | I | 1280 | 0.7 | 910 | 53 |
| 50' | I | 1290 | 0.5 | 940 | Absent |
| 51' | I | 1230 | 0.8 | 950 | Absent |
| 52' | I | 1270 | 0.5 | 980 | 53 |
| 53' | I | 1250 | 0.6 | 980 | 53 |
| 54' | I | 1280 | 1.7 | 990 | 53 |
| 55' | J | 1290 | 0.7 | 980 | 53 |
| 56' | J | 1230 | 0.6 | 920 | 53 |
| 57' | K | 1300 | 0.7 | 980 | 53 |
| 58' | L | 1200 | 0.8 | 970 | 53 |
| 59' | L | 1220 | 0.5 | 930 | 53 |
| 60' | M | 1230 | 0.7 | 930 | 53 |
| 61' | N | 1250 | 0.6 | 990 | 53 |
| 62' | O | 1220 | 0.6 | 940 | 53 |
| 63' | P | 1250 | 0.6 | 960 | 53 |
| 64' | Q | 1290 | 0.6 | 990 | 53 |
| 65' | R | 1290 | 0.5 | 900 | 53 |

TABLE 5-continued

| Experi-mental Example | Kind of steel | Hot rolling step | | | Cold rolling step Cold rolling reduction % |
|---|---|---|---|---|---|
| | | Slab heating temperature °C. | Formula (4) | Rolling completion temperature °C. | |
| 66' | S | 1270 | 0.6 | 960 | 53 |
| 67' | T | 1300 | 0.8 | 940 | 53 |
| 68' | U | 1240 | 0.4 | 910 | 53 |
| 69' | U | 1230 | 0.8 | 930 | 53 |
| 70' | U | 1300 | 0.4 | 940 | 53 |
| 71' | U | 1280 | 0.5 | 980 | 53 |
| 72' | U | 1250 | 0.7 | 970 | 53 |
| 73' | U | 1300 | 0.6 | 920 | 53 |
| 74' | U | 1270 | 0.4 | 970 | 53 |
| 75' | V | 1290 | 0.7 | 920 | 53 |
| 76' | <u>W</u> | 1200 | 0.4 | 990 | 53 |
| 77' | <u>X</u> | 1300 | 0.7 | 990 | 53 |
| 78' | <u>Y</u> | 1260 | 0.5 | 950 | 53 |
| 79' | <u>Z</u> | 1210 | 0.6 | 890 | 53 |
| 80' | <u>AA</u> | 1300 | 0.5 | 940 | 53 |
| 81' | A | 1300 | 0.6 | 930 | 53 |
| 82' | A | 1200 | 0.8 | 990 | 53 |
| 83' | A | 1270 | 0.6 | 920 | 53 |
| 84' | A | 1230 | 0.5 | 960 | 53 |
| 85' | A | 1280 | 0.6 | 910 | 53 |
| 86' | A | 1290 | 0.5 | 890 | 53 |
| 87' | B | 1300 | 0.4 | 890 | 53 |
| 88' | C | 1260 | 0.6 | 960 | 53 |
| 89' | A | 1210 | 0.7 | 940 | 53 |

* Underlined values are outside the range of the present invention

The hot-rolled steel sheet having a sheet thickness of 1.2 mm or the cold-rolled steel sheet having a sheet thickness of 1.2 mm thus obtained was subjected to the following first heat treatment and/or second heat treatment. In some of the examples, the cold-rolled steel sheet cooled to the cooling stop temperature shown in Tables 6 to 9 in the first heat treatment was continuously subjected to the second heat treatment without being cooled to room temperature. In the other examples, after cooling to the cooling stop temperature in the first heat treatment and then cooling to room temperature, the second heat treatment was performed. In addition, in some of the examples, the second heat treatment was performed without performing the first heat treatment.

(First Heat Treatment)

Under the conditions shown in Tables 6 to 9, heating to the highest heating temperature was performed and holding at the highest heating temperature was performed. Then, cooling to the cooling stop temperature was performed. In the first heat treatment, heating was performed in the atmosphere containing $H_2$ at the concentration shown in Tables 6 to 9 and having a $\log(P_{H_2O}/P_{H_2})$ of the numerical value shown in Tables 6 to 9 until the temperature reached from 650° C. to the highest heating temperature.

$A_{c3}$ was obtained by Expression (9), and Ms was obtained by Expression (10).

$$A_{c3}=879-346\times C+65\times Si-18\times Mn+54 \tag{9}$$

(element symbols in Expression (9) indicate the mass % of the corresponding elements in steel)

$$Ms=561-407\times C-7.3\times Si-37.8\times Mn-20.5\times Cu-19.5\times Ni-19.8\times Cr-4.5\times Mo \tag{10}$$

(element symbols in Expression (10) indicate the mass % of the corresponding elements in steel)

TABLE 6

| Experimental Example | Ac3 °C. | Ms °C. | First heat treatment | | | | | | |
|---|---|---|---|---|---|---|---|---|---|
| | | | Average heating rate at 650° C. or higher °C./s | Highest heating temperature °C. | Retention time s | Atmosphere log($P_{H2O}/P_{H2}$) | Atmosphere $H_2$ vol % | Average cooling rate between 700° C. and Ms °C./s | Cooling stop temperature °C. |
| 1 | 825 | 381 | 2.0 | 850 | 60 | −1.9 | 2.0 | 40.0 | Room temperature |
| 2 | 825 | 381 | 2.0 | 780 | 60 | −1.9 | 2.0 | 40.0 | Room temperature |
| 3 | 825 | 381 | 2.0 | 990 | 60 | −2.0 | 2.0 | 40.0 | Room temperature |
| 4 | 825 | 381 | 2.0 | 820 | 60 | −1.7 | 2.0 | 40.0 | Room temperature |
| 5 | 825 | 381 | 0.04 | 860 | 60 | −1.9 | 2.0 | 40.0 | Room temperature |
| 6 | 825 | 381 | 2.0 | 840 | 60 | 0.7 | 2.0 | 40.0 | Room temperature |
| 7 | 825 | 381 | 2.0 | 845 | 60 | −1.8 | 2.0 | 12.0 | Room temperature |
| 8 | 825 | 381 | 2.0 | 855 | 60 | −1.9 | 2.0 | 2.0 | Room temperature |
| 9 | 825 | 381 | 2.0 | 860 | 60 | −1.9 | 2.0 | 40.0 | Room temperature |
| 10 | 825 | 381 | 2.0 | 850 | 60 | −1.9 | 2.0 | 40.0 | Room temperature |
| 11 | 825 | 381 | | | | Absent | | | |
| 12 | 825 | 381 | 2.0 | 860 | 60 | −1.9 | 2.0 | 40.0 | 220 |
| 13 | 846 | 365 | 2.0 | 880 | 60 | −1.8 | 2.0 | 40.0 | Room temperature |
| 14 | 846 | 365 | 2.0 | 860 | 60 | −1.8 | 2.0 | 40.0 | 280 |
| 15 | 846 | 365 | 2.0 | 850 | 60 | −0.7 | 2.0 | 40.0 | Room temperature |
| 16 | 846 | 365 | 2.0 | 880 | 60 | −0.8 | 2.0 | 40.0 | Room temperature |
| 17 | 846 | 365 | | | | Absent | | | |
| 18 | 812 | 300 | 2.0 | 820 | 60 | −2.0 | 2.0 | 40.0 | Room temperature |
| 19 | 812 | 300 | 2.0 | 820 | 60 | −2.0 | 2.0 | 40.0 | Room temperature |
| 20 | 812 | 300 | 2.0 | 820 | 60 | −1.9 | 2.0 | 40.0 | Room temperature |
| 21 | 812 | 300 | 2.0 | 830 | 60 | −1.9 | 2.0 | 40.0 | 230 |
| 22 | 856 | 422 | 2.0 | 850 | 60 | −1.9 | 2.0 | 40.0 | Room temperature |
| 23 | 856 | 422 | 2.0 | 905 | 60 | −1.8 | 2.0 | 40.0 | Room temperature |
| 24 | 856 | 422 | 2.0 | 905 | 60 | −0.7 | 2.0 | 40.0 | Room temperature |
| 25 | 856 | 422 | 2.0 | 865 | 60 | −1.9 | 2.0 | 40.0 | Room temperature |
| 26 | 856 | 422 | 2.0 | 875 | 60 | −1.9 | 2.0 | 40.0 | Room temperature |
| 27 | 856 | 422 | 2.0 | 895 | 5 | −2.0 | 2.0 | 40.0 | Room temperature |
| 28 | 856 | 422 | 2.0 | 875 | 60 | −1.9 | 2.0 | 40.0 | 310 |
| 29 | 856 | 422 | | | | Absent | | | |
| 30 | 861 | 441 | 2.0 | 880 | 60 | −1.8 | 2.0 | 40.0 | Room temperature |
| 31 | 861 | 441 | 2.0 | 890 | 60 | −1.9 | 2.0 | 40.0 | 320 |
| 32 | 841 | 427 | 2.0 | 850 | 60 | −1.9 | 2.0 | 40.0 | Room temperature |
| 33 | 841 | 427 | 2.0 | 890 | 60 | −1.9 | 2.0 | 40.0 | 240 |
| 34 | 775 | 319 | 2.0 | 790 | 60 | −2.0 | 2.0 | 40.0 | Room temperature |
| 35 | 775 | 319 | 2.0 | 810 | 60 | −1.9 | 2.0 | 40.0 | Room temperature |
| 36 | 775 | 319 | 2.0 | 810 | 60 | −1.9 | 2.0 | 40.0 | Room temperature |
| 37 | 775 | 319 | 2.0 | 800 | 60 | −2.0 | 2.0 | 40.0 | 270 |
| 38 | 775 | 319 | 2.0 | 800 | 60 | −1.9 | 2.0 | 40.0 | 400 |
| 39 | 868 | 323 | 2.0 | 860 | 60 | −1.9 | 2.0 | 40.0 | Room temperature |

\* Underlined values are outside the range of the present invention

TABLE 7

| Experimental Example | Ac3 °C. | Ms °C. | First heat treatment | | | | | | |
|---|---|---|---|---|---|---|---|---|---|
| | | | Average heating rate at 650° C. or higher °C./s | Highest heating temperature °C. | Retention time s | Atmosphere log($P_{H2O}/P_{H2}$) | Atmosphere $H_2$ vol % | Average cooling rate between 700° C. and Ms °C./s | Cooling stop temperature °C. |
| 40 | 822 | 357 | 2.0 | 830 | 60 | −2.0 | 2.0 | 40.0 | Room temperature |
| 41 | 822 | 357 | 0.7 | 815 | 60 | −2.0 | 2.0 | 40.0 | Room temperature |
| 42 | 822 | 357 | 2.0 | 825 | 60 | −2.0 | 2.0 | 40.0 | Room temperature |
| 43 | 822 | 357 | 2.0 | 870 | 60 | −2.0 | 2.0 | 40.0 | Room temperature |
| 44 | 822 | 357 | 2.0 | 840 | 60 | −2.0 | 2.0 | 40.0 | 260 |
| 45 | 822 | 357 | 2.0 | 865 | 60 | −2.0 | 2.0 | 40.0 | Room temperature |
| 46 | 822 | 357 | 2.0 | 805 | 60 | −2.0 | 2.0 | 40.0 | Room temperature |
| 47 | 822 | 357 | | | | Absent | | | |
| 48 | 822 | 357 | | | | Absent | | | |
| 49 | 822 | 357 | 2.0 | 870 | 60 | −1.9 | 2.0 | 40.0 | Room temperature |
| 50 | 953 | 369 | 2.0 | 960 | 60 | −2.0 | 2.0 | 40.0 | Room temperature |
| 51 | 953 | 369 | 2.0 | 980 | 60 | −1.9 | 2.0 | 40.0 | Room temperature |
| 52 | 847 | 419 | 2.0 | 840 | 60 | −1.9 | 2.0 | 40.0 | Room temperature |
| 53 | 878 | 397 | 2.0 | 890 | 60 | −1.9 | 2.0 | 40.0 | Room temperature |
| 54 | 878 | 397 | 2.0 | 900 | 60 | −1.9 | 2.0 | 40.0 | Room temperature |
| 55 | 837 | 418 | 2.0 | 860 | 60 | −1.9 | 2.0 | 40.0 | Room temperature |
| 56 | 892 | 456 | 2.0 | 930 | 60 | −1.9 | 2.0 | 40.0 | Room temperature |
| 57 | 887 | 395 | 2.0 | 940 | 60 | −2.0 | 2.0 | 40.0 | Room temperature |

TABLE 7-continued

| | | | First heat treatment | | | | | | |
|---|---|---|---|---|---|---|---|---|---|
| Experi-mental Example | Ac3 ° C. | Ms ° C. | Average heating rate at 650° C. or higher ° C./s | Highest heating temperature ° C. | Retention time s | Atmosphere log($P_{H2O}$/$P_{H2}$) | $H_2$ vol % | Average cooling rate between 700° C. and Ms ° C./s | Cooling stop temperature ° C. |
| 58 | 880 | 401 | 2.0 | 905 | 60 | −1.9 | 2.0 | 40.0 | Room temperature |
| 59 | 802 | 342 | 2.0 | 880 | 60 | −1.9 | 2.0 | 40.0 | Room temperature |
| 60 | 832 | 384 | 2.0 | 850 | 60 | −1.9 | 2.0 | 40.0 | Room temperature |
| 61 | 871 | 370 | 2.0 | 870 | 60 | −1.9 | 2.0 | 40.0 | Room temperature |
| 62 | 826 | 455 | 2.0 | 865 | 60 | −1.9 | 2.0 | 40.0 | Room temperature |
| 63 | 840 | 370 | 2.0 | 880 | 60 | −2.0 | 2.0 | 40.0 | Room temperature |
| 64 | 840 | 370 | 2.0 | 860 | 60 | −1.9 | 2.0 | 40.0 | Room temperature |
| 65 | 840 | 370 | 2.0 | 840 | 60 | −1.9 | 2.0 | 40.0 | Room temperature |
| 66 | 840 | 370 | 2.0 | 845 | 60 | −1.2 | 2.0 | 40.0 | Room temperature |
| 67 | 840 | 370 | 2.0 | 880 | 60 | −2.0 | 2.0 | 40.0 | 300 |
| 68 | 840 | 370 | 2.0 | 880 | 60 | −2.0 | 2.0 | 40.0 | 190 |
| 69 | 840 | 370 | 2.0 | 835 | 60 | −1.9 | 2.0 | 40.0 | Room temperature |
| 70 | 844 | 378 | 2.0 | 895 | 60 | −1.9 | 2.0 | 40.0 | Room temperature |
| 71 | 889 | 466 | 2.0 | 900 | 60 | −1.9 | 2.0 | 40.0 | Room temperature |
| 72 | 816 | 419 | 2.0 | 870 | 60 | −1.9 | 2.0 | 40.0 | Room temperature |
| 73 | 888 | 471 | 2.0 | 915 | 60 | −1.9 | 2.0 | 40.0 | Room temperature |
| 74 | 945 | 411 | 2.0 | 945 | 60 | −1.9 | 2.0 | 40.0 | Room temperature |
| 75 | 853 | 271 | 2.0 | 885 | 60 | −1.9 | 2.0 | 40.0 | Room temperature |
| 76 | 825 | 381 | 2.0 | 830 | 60 | −1.9 | 4.0 | 40.0 | Room temperature |
| 77 | 825 | 381 | 2.0 | 850 | 60 | −1.9 | 2.0 | 40.0 | Room temperature |
| 78 | 825 | 381 | 2.0 | 850 | 60 | −1.9 | 2.0 | 40.0 | Room temperature |

* Underlined values are outside the range of the present invention

TABLE 8

| | | | First heat treatment | | | | | | |
|---|---|---|---|---|---|---|---|---|---|
| Experi-mental Example | Ac3 ° C. | Ms ° C. | Average heating rate at 650° C. or higher ° C./s | Highest heating temperature ° C. | Retention time s | Atmosphere log($P_{H2O}$/$P_{H2}$) | $H_2$ vol % | Average cooling rate between 700° C. and Ms ° C./s | Cooling stop temperature ° C. |
| 1' | 825 | 381 | 2.0 | 830 | 60 | −1.9 | 2.0 | 40.0 | Room temperature |
| 2' | 825 | 381 | 2.0 | 790 | 60 | −2.0 | 2.0 | 40.0 | Room temperature |
| 3' | 825 | 381 | 2.0 | 980 | 60 | −1.9 | 2.0 | 40.0 | Room temperature |
| 4' | 825 | 381 | 2.0 | 820 | 60 | −1.9 | 2.0 | 40.0 | Room temperature |
| 5' | 825 | 381 | 0.05 | 840 | 60 | −1.9 | 2.0 | 40.0 | Room temperature |
| 6' | 825 | 381 | 2.0 | 870 | 60 | −0.7 | 2.0 | 40.0 | Room temperature |
| 7' | 825 | 381 | 2.0 | 845 | 60 | −1.8 | 2.0 | 12.0 | Room temperature |
| 8' | 825 | 381 | 2.0 | 855 | 60 | −1.9 | 2.0 | 2.0 | Room temperature |
| 9' | 825 | 381 | 2.0 | 830 | 60 | −1.9 | 2.0 | 40.0 | Room temperature |
| 10' | 825 | 381 | 2.0 | 840 | 60 | −1.9 | 2.0 | 40.0 | Room temperature |
| 11' | 825 | 381 | 2.0 | 840 | 60 | −2.2 | 6.0 | 40.0 | Room temperature |
| 12' | 825 | 381 | 2.0 | 870 | 60 | −1.9 | 2.0 | 40.0 | Room temperature |
| 13' | 825 | 381 | 2.0 | 820 | 60 | −1.9 | 2.0 | 40.0 | Room temperature |
| 14' | 825 | 381 | 2.0 | 860 | 60 | −1.9 | 2.0 | 40.0 | Room temperature |
| 15' | 825 | 381 | | | | Absent | | | |
| 16' | 825 | 381 | 2.0 | 870 | 60 | −1.8 | 2.0 | 40.0 | 250 |
| 17' | 825 | 381 | 2.0 | 860 | 60 | −2.0 | 2.0 | 40.0 | Room temperature |
| 18' | 846 | 365 | 2.0 | 870 | 60 | −1.8 | 2.0 | 40.0 | Room temperature |
| 19' | 846 | 365 | 2.0 | 860 | 60 | −1.8 | 2.0 | 40.0 | 260 |
| 20' | 846 | 365 | 2.0 | 860 | 60 | −0.7 | 2.0 | 40.0 | Room temperature |
| 21' | 846 | 365 | 2.0 | 880 | 60 | −0.6 | 2.0 | 40.0 | Room temperature |
| 22' | 846 | 365 | | | | Absent | | | |
| 23' | 812 | 300 | 2.0 | 840 | 60 | −1.9 | 2.0 | 40.0 | Room temperature |
| 24' | 812 | 300 | 2.0 | 830 | 60 | −2.0 | 2.0 | 40.0 | Room temperature |
| 25' | 812 | 300 | 2.0 | 840 | 60 | −2.0 | 2.0 | 40.0 | Room temperature |
| 26' | 812 | 300 | 2.0 | 840 | 60 | −1.9 | 2.0 | 40.0 | 170 |
| 27' | 856 | 422 | 2.0 | 840 | 60 | −1.9 | 2.0 | 40.0 | Room temperature |
| 28' | 856 | 422 | 2.0 | 865 | 60 | −2.0 | 2.0 | 40.0 | Room temperature |
| 29' | 856 | 422 | 2.0 | 865 | 60 | −0.6 | 2.0 | 40.0 | Room temperature |
| 30' | 856 | 422 | 2.0 | 885 | 60 | −2.0 | 2.0 | 40.0 | Room temperature |
| 31' | 856 | 422 | 2.0 | 905 | 60 | −2.0 | 2.0 | 40.0 | Room temperature |
| 32' | 856 | 422 | 2.0 | 885 | 5 | −1.9 | 2.0 | 40.0 | Room temperature |
| 33' | 856 | 422 | 2.0 | 855 | 60 | −2.0 | 2.0 | 40.0 | 310 |
| 34' | 856 | 422 | | | | Absent | | | |
| 35' | 861 | 441 | 2.0 | 900 | 60 | −2.2 | 2.0 | 40.0 | Room temperature |
| 36' | 861 | 441 | 2.0 | 880 | 60 | −2.2 | 2.0 | 40.0 | 290 |

TABLE 8-continued

| | | | First heat treatment | | | | | |
|---|---|---|---|---|---|---|---|---|
| Experimental Example | Ac3 °C. | Ms °C. | Average heating rate at 650° C. or higher °C./s | Highest heating temperature °C. | Retention time s | Atmosphere log($P_{H2O}/P_{H2}$) | Atmosphere $H_2$ vol % | Average cooling rate between 700° C. and Ms °C./s | Cooling stop temperature °C. |
| 37' | 841 | 427 | 2.0 | 870 | 60 | −2.0 | 2.0 | 40.0 | Room temperature |
| 38' | 841 | 427 | 2.0 | 880 | 60 | −2.0 | 2.0 | 40.0 | 240 |
| 39' | 775 | 319 | 2.0 | 790 | 60 | −1.9 | 2.0 | 40.0 | Room temperature |
| 40' | 775 | 319 | 2.0 | 790 | 60 | −2.1 | 2.0 | 40.0 | Room temperature |
| 41' | 775 | 319 | 2.0 | 780 | 60 | −2.0 | 2.0 | 40.0 | Room temperature |
| 42' | 775 | 319 | 2.0 | 820 | 60 | −2.0 | 2.0 | 40.0 | 280 |
| 43' | 775 | 319 | 2.0 | 800 | 60 | −2.0 | 2.0 | 40.0 | <u>400</u> |

\* Underlined values are outside the range of the present invention

TABLE 9

| | | | First heat treatment | | | | | |
|---|---|---|---|---|---|---|---|---|
| Experimental Example | Ac3 °C. | Ms °C. | Average heating rate at 650° C. or higher °C./s | Highest heating temperature °C. | Retention time s | Atmosphere log($P_{H2O}/P_{H2}$) | Atmosphere $H_2$ vol % | Average cooling rate between 700° C. and Ms °C./s | Cooling stop temperature °C. |
| 44' | 868 | 323 | 2.0 | 860 | 60 | −1.9 | 2.0 | 40.0 | Room temperature |
| 45' | 822 | 357 | 2.0 | 820 | 60 | −2.2 | 2.0 | 40.0 | Room temperature |
| 46' | 822 | 357 | 0.7 | 825 | 60 | −2.1 | 2.0 | 40.0 | Room temperature |
| 47' | 822 | 357 | 2.0 | 825 | 60 | −2.0 | 2.0 | 40.0 | Room temperature |
| 48' | 822 | 357 | 2.0 | 870 | 60 | −2.2 | 2.0 | 40.0 | Room temperature |
| 49' | 822 | 357 | 2.0 | 850 | 60 | −2.0 | 2.0 | 40.0 | 230 |
| 50' | 822 | 357 | 2.0 | 855 | 60 | −2.1 | 2.0 | 40.0 | Room temperature |
| 51' | 822 | 357 | 2.0 | 795 | 60 | −1.9 | 2.0 | 40.0 | Room temperature |
| 52' | 822 | 357 | | | | <u>Absent</u> | | | |
| 53' | 822 | 357 | | | | <u>Absent</u> | | | |
| 54' | 822 | 357 | 2.0 | 850 | 60 | −2.2 | 2.0 | 40.0 | Room temperature |
| 55' | 953 | 369 | 2.0 | 990 | 60 | −2.1 | 2.0 | 40.0 | Room temperature |
| 56' | 953 | 369 | 2.0 | 950 | 60 | −2.2 | 2.0 | 40.0 | Room temperature |
| 57' | 847 | 419 | 2.0 | 860 | 60 | −1.9 | 2.0 | 40.0 | Room temperature |
| 58' | 878 | 397 | 2.0 | 900 | 60 | −1.9 | 2.0 | 40.0 | Room temperature |
| 59' | 878 | 397 | 2.0 | 910 | 60 | −2.0 | 2.0 | 40.0 | Room temperature |
| 60' | 837 | 418 | 2.0 | 840 | 60 | −2.2 | 2.0 | 40.0 | Room temperature |
| 61' | 892 | 456 | 2.0 | 930 | 60 | −1.9 | 2.0 | 40.0 | Room temperature |
| 62' | 887 | 395 | 2.0 | 950 | 60 | −1.9 | 2.0 | 40.0 | Room temperature |
| 63' | 880 | 401 | 2.0 | 895 | 60 | −2.1 | 2.0 | 40.0 | Room temperature |
| 64' | 802 | 342 | 2.0 | 900 | 60 | −2.2 | 2.0 | 40.0 | Room temperature |
| 65' | 832 | 384 | 2.0 | 830 | 60 | −2.0 | 2.0 | 40.0 | Room temperature |
| 66' | 871 | 370 | 2.0 | 890 | 60 | −1.9 | 2.0 | 40.0 | Room temperature |
| 67' | 826 | 455 | 2.0 | 855 | 60 | −2.1 | 2.0 | 40.0 | Room temperature |
| 68' | 840 | 370 | 2.0 | 840 | 60 | −2.1 | 2.0 | 40.0 | Room temperature |
| 69' | 840 | 370 | 2.0 | 850 | 60 | −2.0 | 2.0 | 40.0 | Room temperature |
| 70' | 840 | 370 | 2.0 | 870 | 60 | −2.2 | 2.0 | 40.0 | Room temperature |
| 71' | 840 | 370 | 2.0 | 845 | 60 | −1.2 | 2.0 | 40.0 | Room temperature |
| 72' | 840 | 370 | 2.0 | 840 | 60 | −1.9 | 2.0 | 40.0 | 310 |
| 73' | 840 | 370 | 2.0 | 860 | 60 | −1.9 | 2.0 | 40.0 | 190 |
| 74' | 840 | 370 | 2.0 | 875 | 60 | −1.9 | 2.0 | 40.0 | Room temperature |
| 75' | 844 | 378 | 2.0 | 915 | 60 | −2.2 | 2.0 | 40.0 | Room temperature |
| 76' | 889 | 466 | 2.0 | 920 | 60 | −2.2 | 2.0 | 40.0 | Room temperature |
| 77' | 816 | 419 | 2.0 | 870 | 60 | −2.0 | 2.0 | 40.0 | Room temperature |
| 78' | 888 | 471 | 2.0 | 895 | 60 | −2.2 | 2.0 | 40.0 | Room temperature |
| 79' | 945 | 411 | 2.0 | 955 | 60 | −1.9 | 2.0 | 40.0 | Room temperature |
| 80' | 853 | 271 | 2.0 | 915 | 60 | −1.9 | 2.0 | 40.0 | Room temperature |
| 81' | 825 | 381 | 2.0 | 855 | 60 | −1.9 | 2.0 | 40.0 | Room temperature |
| 82' | 825 | 381 | 2.0 | 855 | 60 | −1.9 | 2.0 | 40.0 | Room temperature |
| 83' | 825 | 381 | 2.0 | 865 | 60 | −2.2 | 2.0 | 40.0 | 200 |
| 84' | 825 | 381 | 2.0 | 865 | 60 | −2.2 | 2.0 | 40.0 | Room temperature |
| 85' | 825 | 381 | 2.0 | 835 | 60 | −2.1 | 2.0 | 40.0 | Room temperature |
| 86' | 825 | 381 | 2.0 | 835 | 60 | −2.0 | 2.0 | 40.0 | Room temperature |
| 87' | 846 | 365 | 2.0 | 880 | 60 | −2.0 | 2.0 | 40.0 | Room temperature |
| 88' | 812 | 300 | 2.0 | 860 | 60 | −1.9 | 2.0 | 40.0 | Room temperature |
| 89' | 825 | 381 | 2.0 | 865 | 60 | −1.9 | 2.0 | 40.0 | Room temperature |

\* Underlined values are outside the range of the present invention (Second Heat Treatment)

Heating to the highest heating temperature was performed and holding at the highest heating temperature was performed so that the average heating rate from 650° C. to the highest heating temperature became the condition shown in Tables 10 to 13. Thereafter, cooling to the cooling stop temperature was performed so that the average cooling rate between 700° C. and 600° C. became the average cooling rate shown in Tables 10 to 13. In the second heat treatment, heating was performed in the atmosphere shown in Tables 10 to 13 from 650° C. to the highest heating temperature is reached.

Next, electrogalvanizing is performed on some of the high strength steel sheets (Experimental Examples Nos. 54 and 69) after the second heat treatment to form electrogalvanized layers on both surfaces of the high strength steel sheet, whereby electrogalvanized steel sheets (EG) were obtained.

Furthermore, among the experimental examples, in Experimental Examples Nos. 1' to 80', hot-dip galvannealing was performed at the timing after cooling and isothermal holding (that is, at the timing shown in the pattern [1] in FIG. 4) under the conditions shown in the tables. In addition, in Experimental Examples 1' to 16', 18' to 58', 60' to 73', and 75' to 80' among Experimental Examples 1' to 80', an alloying treatment was performed subsequent to hot-dip galvanizing, whereas in Experimental Examples 17', 59', and 74', an alloying treatment was not performed after hot-dip galvanizing.

Figure 5:
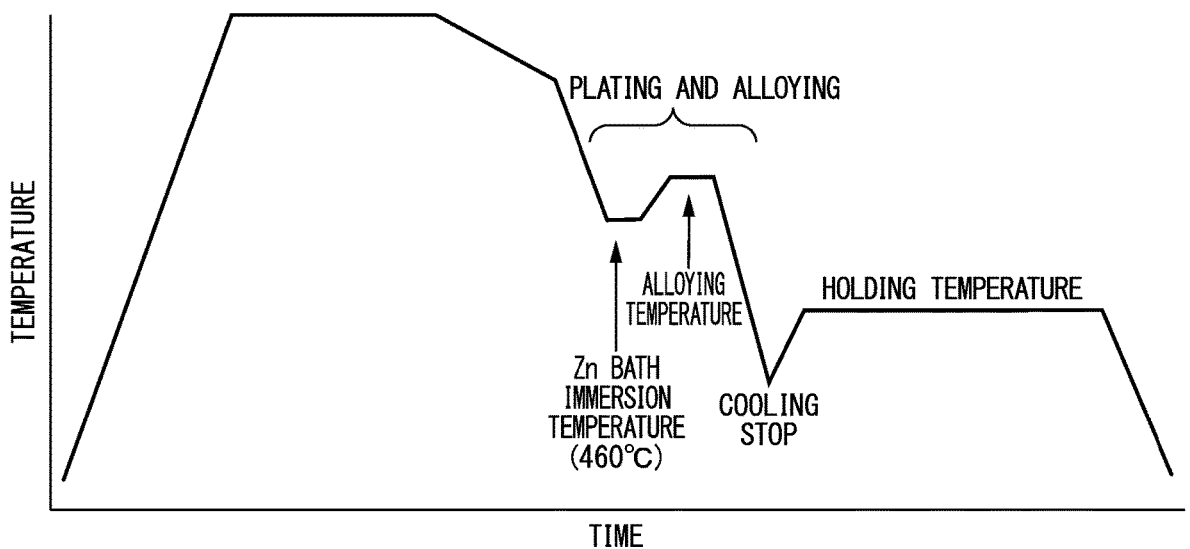
FIG. 5 is a diagram showing a second example of the temperature-time pattern of the second heat treatment to the hot-dip galvanizing and alloying treatment in the method for manufacturing the steel sheet according to the present embodiment.

In Experimental Examples Nos. 81' to 88', according to the pattern [2] shown in FIG. 5, as shown in the tables, heating to the highest heating temperature was performed, cooling to the average cooling rate was thereafter performed, hot-dip galvannealing and an alloying treatment excluding Experimental Example No. 86 were subsequently performed, and cooling and isothermal holding were performed under the conditions shown in Tables 10 to 13.

Figure 6:
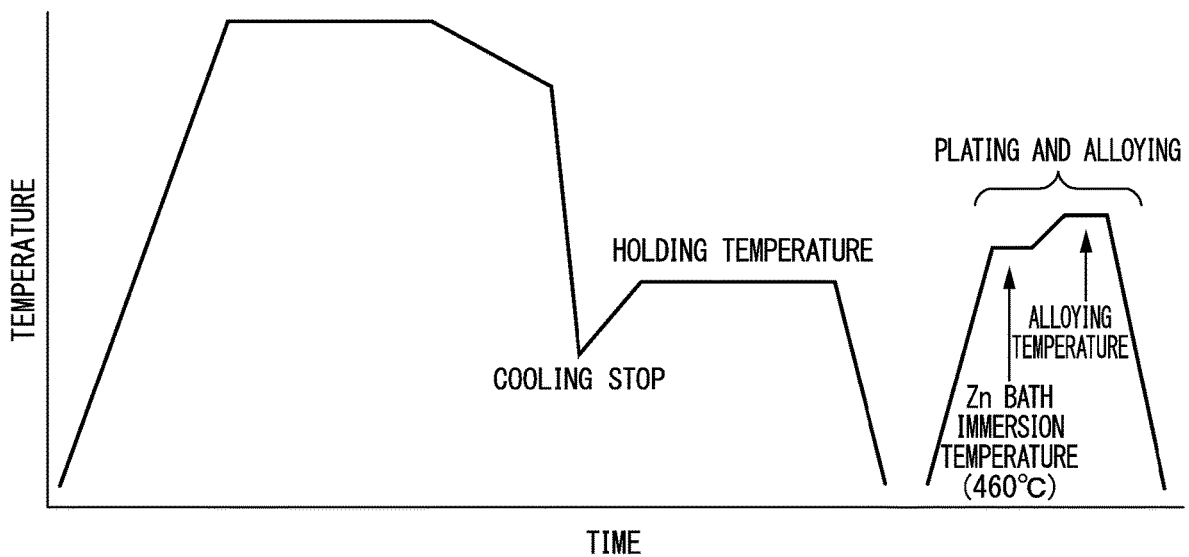
FIG. 6 is a diagram showing a third example of the temperature-time pattern of the second heat treatment to the hot-dip galvanizing and alloying treatment in the method for manufacturing the steel sheet according to the present embodiment.

In addition, in Experimental Example No. 89', according to the pattern [3] shown in FIG. 6, under the conditions shown in the tables, heating to the highest heating temperature was performed under the conditions shown in the tables according to the, cooling to room temperature was then performed once, and hot-dip galvannealing and an alloying treatment were thereafter performed again.

The hot-dip galvanizing was performed in each of the examples by immersing the steel sheet into a molten zinc bath at 460° C. to cause the adhesion amount to both surfaces of the steel sheet to be 50 g/m² per side.

$A_{c1}$ was obtained by Expression (8), and $A_{c3}$ was obtained by Expression (9).

$$A_{c1}=723-10.7\times Mn-16.9\times Ni+29.1\times Si+16.9\times Cr \quad (8)$$

(element symbols in Expression (8) indicate the mass % of the corresponding elements in steel)

TABLE 10

| Experimental Example | Second heat treatment | | | | | | | |
|---|---|---|---|---|---|---|---|---|
| | Average heating rate at 650° C. or higher ° C. | Highest heating temperature ° C. | Retention time s | Atmosphere | | | Average cooling rate between 700° C. and 600° C. ° C./s | Cooling stop temperature ° C. |
| | | | | $\log(P_{H2O}/P_{H2})$ | $H_2$ vol % | $O_2$ vol % | | |
| 1 | 1.8 | 775 | 90 | −0.7 | 2.0 | 0.003 | 40 | 370 |
| 2 | 1.8 | 795 | 90 | −0.7 | 2.0 | 0.003 | 40 | 370 |
| 3 | 1.8 | 780 | 110 | −0.7 | 2.0 | 0.003 | 40 | 390 |
| 4 | 1.8 | 775 | 90 | −0.7 | 2.0 | 0.003 | 40 | 400 |
| 5 | 1.8 | 795 | 90 | −0.7 | 2.0 | 0.003 | 40 | 400 |
| 6 | 1.8 | 795 | 90 | −0.7 | 2.0 | 0.003 | 40 | 410 |
| 7 | 1.8 | 785 | 90 | −0.7 | 2.0 | 0.003 | 40 | 390 |
| 8 | 1.8 | 780 | 90 | −0.7 | 2.0 | 0.003 | 40 | 360 |
| 9 | 1.8 | 775 | 90 | −1.6 | 2.0 | 0.003 | 40 | 360 |
| 10 | 1.8 | 790 | 20 | −1.0 | 2.0 | 0.003 | 40 | 360 |
| 11 | 1.8 | 780 | 90 | −0.7 | 2.0 | 0.003 | 40 | 360 |
| 12 | 1.8 | 795 | 90 | −0.7 | 2.0 | 0.003 | 40 | 370 |
| 13 | 1.8 | 825 | 90 | −0.7 | 2.0 | 0.003 | 40 | 190 |
| 14 | 1.8 | 815 | 90 | −0.7 | 2.0 | 0.003 | 40 | 190 |
| 15 | 1.8 | 820 | 90 | −1.6 | 2.0 | 0.003 | 40 | 230 |
| 16 | 1.8 | 805 | 90 | −0.7 | 2.0 | 0.003 | 40 | 200 |
| 17 | 1.8 | 830 | 90 | −0.7 | 2.0 | 0.003 | 40 | 270 |
| 18 | 1.8 | 785 | 90 | −0.7 | 2.0 | 0.003 | 40 | 140 |
| 19 | 1.8 | 800 | 90 | −0.7 | 2.0 | 0.003 | 40 | 200 |
| 20 | 1.8 | 780 | 90 | −1.5 | 2.0 | 0.003 | 40 | 140 |
| 21 | 1.8 | 790 | 90 | −0.7 | 2.0 | 0.003 | 40 | 120 |
| 22 | 1.8 | 825 | 90 | −0.7 | 2.0 | 0.003 | 40 | 380 |
| 23 | 1.8 | 810 | 90 | −0.7 | 2.0 | 0.003 | 40 | 340 |
| 24 | 1.8 | 825 | 90 | −1.6 | 2.0 | 0.003 | 40 | 390 |
| 25 | 1.8 | 820 | 90 | −1.6 | 2.0 | 0.003 | 40 | 350 |
| 26 | 1.8 | 895 | 90 | −0.7 | 2.0 | 0.003 | 40 | 380 |
| 27 | 1.8 | 805 | 90 | −0.7 | 2.0 | 0.003 | 40 | 360 |
| 28 | 1.8 | 810 | 90 | −0.7 | 2.0 | 0.003 | 40 | 360 |
| 29 | 1.8 | 825 | 90 | −0.7 | 2.0 | 0.003 | 40 | 280 |
| 30 | 1.8 | 810 | 90 | −0.7 | 2.0 | 0.003 | 40 | 360 |
| 31 | 1.8 | 820 | 90 | −0.7 | 2.0 | 0.003 | 40 | 380 |
| 32 | 1.8 | 800 | 90 | −0.7 | 2.0 | 0.003 | 40 | 320 |
| 33 | 1.8 | 805 | 90 | −0.7 | 2.0 | 0.003 | 40 | 320 |
| 34 | 1.8 | 740 | 90 | −0.7 | 2.0 | 0.003 | 40 | 360 |
| 35 | 1.8 | 745 | 90 | −0.7 | 2.0 | 0.003 | 40 | 400 |
| 36 | 1.8 | 755 | 90 | −0.7 | 2.0 | 0.003 | 40 | 390 |
| 37 | 1.8 | 755 | 90 | −0.7 | 2.0 | 0.003 | 40 | 390 |

TABLE 10-continued

| | | | | | | | | |
|---|---|---|---|---|---|---|---|---|
| 38 | 1.8 | 745 | 90 | −0.7 | 2.0 | 0.003 | 40 | 360 |
| 39 | 1.8 | 795 | 90 | −0.7 | 2.0 | 0.003 | 40 | 410 |

| | Second heat treatment | | | | | |
|---|---|---|---|---|---|---|
| Experimental Example | Holding temperature ° C. | Retention time between 300° C. and 480° C. s | Alloying temperature ° C. | Plating treatment timing | Ac1 ° C. | Ac3 ° C. |
| 1 | 410 | 205 | — | — | 729 | 825 |
| 2 | 390 | 205 | — | — | 729 | 825 |
| 3 | 400 | 250 | — | — | 729 | 825 |
| 4 | 400 | 205 | — | — | 729 | 825 |
| 5 | 400 | 205 | — | — | 729 | 825 |
| 6 | 390 | 205 | — | — | 729 | 825 |
| 7 | 390 | 205 | — | — | 729 | 825 |
| 8 | 380 | 205 | — | — | 729 | 825 |
| 9 | 400 | 205 | — | — | 729 | 825 |
| 10 | 410 | 205 | — | — | 729 | 825 |
| 11 | 380 | 205 | — | — | 729 | 825 |
| 12 | 400 | 205 | — | — | 729 | 825 |
| 13 | 390 | 205 | — | — | 746 | 846 |
| 14 | 400 | 205 | — | — | 746 | 846 |
| 15 | 390 | 205 | — | — | 746 | 846 |
| 16 | 410 | 205 | — | — | 746 | 846 |
| 17 | 400 | 205 | — | — | 746 | 846 |
| 18 | 410 | 205 | — | — | 745 | 812 |
| 19 | 390 | 205 | — | — | 745 | 812 |
| 20 | 400 | 205 | — | — | 745 | 812 |
| 21 | 400 | 205 | — | — | 745 | 812 |
| 22 | 400 | 205 | — | — | 727 | 856 |
| 23 | 380 | 205 | — | — | 727 | 856 |
| 24 | 390 | 205 | — | — | 727 | 856 |
| 25 | 370 | 205 | — | — | 727 | 856 |
| 26 | 390 | 205 | — | — | 727 | 856 |
| 27 | 380 | 205 | — | — | 727 | 856 |
| 28 | 370 | 205 | — | — | 727 | 856 |
| 29 | 400 | 205 | — | — | 727 | 856 |
| 30 | 390 | 205 | — | — | 743 | 861 |
| 31 | 400 | 205 | — | — | 743 | 861 |
| 32 | 360 | 205 | — | — | 727 | 841 |
| 33 | 340 | 205 | — | — | 727 | 841 |
| 34 | 400 | 205 | — | — | 712 | 775 |
| 35 | 400 | *7* | — | — | 712 | 775 |
| 36 | 390 | 50 | — | — | 712 | 775 |
| 37 | 390 | 205 | — | — | 712 | 775 |
| 38 | 400 | 205 | — | — | 712 | 775 |
| 39 | 400 | 205 | — | — | 709 | 868 |

\* Underlined values are outside the range of the present invention

TABLE 11

| | Second heat treatment | | | | | | | |
|---|---|---|---|---|---|---|---|---|
| Experimental Example | Average heating rate at 650° C. or higher ° C. | Highest heating temperature ° C. | Retention time s | Atmosphere $\log(P_{H2O}/P_{H2})$ | $H_2$ vol % | $O_2$ vol % | Average cooling rate between 700° C. and 600° C. ° C./s | Cooling stop temperature ° C. |
| 40 | 1.8 | 780 | 110 | −0.7 | 2.0 | 0.003 | 40 | 410 |
| 41 | 1.8 | 780 | 110 | −0.7 | 2.0 | 0.003 | 40 | 380 |
| 42 | 1.8 | 785 | *5* | −0.7 | 2.0 | 0.003 | 40 | 380 |
| 43 | 1.8 | 785 | 110 | −0.7 | 2.0 | 0.003 | *2* | 375 |
| 44 | 1.8 | 785 | 110 | −0.7 | 2.0 | 0.003 | 40 | 380 |
| 45 | 1.8 | 770 | 110 | −0.7 | 2.0 | 0.003 | 40 | 365 |
| 46 | 1.8 | 780 | 110 | −0.7 | 2.0 | 0.003 | 40 | 365 |
| 47 | 1.8 | 790 | 110 | −0.7 | 2.0 | 0.003 | 40 | 400 |
| 48 | 1.8 | 790 | 110 | *−1.5* | 2.0 | 0.003 | 40 | 400 |
| 49 | 1.8 | 790 | 110 | −0.7 | 2.0 | 0.003 | 40 | 400 |
| 50 | 1.8 | 880 | 110 | −0.7 | 2.0 | 0.003 | 40 | 360 |
| 51 | 1.8 | 880 | 110 | *−1.5* | 2.0 | 0.003 | 40 | 360 |
| 52 | 1.8 | 800 | 110 | −0.7 | 2.0 | 0.003 | 40 | 320 |
| 53 | 1.8 | 820 | 110 | −0.7 | 2.0 | 0.003 | 40 | 330 |
| 54 | 1.8 | 815 | 110 | −0.7 | 2.0 | 0.003 | 40 | 330 |

TABLE 11-continued

| | | | | | | | | |
|---|---|---|---|---|---|---|---|---|
| 55 | 1.8 | 790 | 110 | −0.7 | 2.0 | 0.003 | 40 | 260 |
| 56 | 1.8 | 830 | 110 | −0.7 | 2.0 | 0.003 | 40 | 350 |
| 57 | 1.8 | 805 | 110 | −0.7 | 2.0 | 0.003 | 40 | 350 |
| 58 | 1.8 | 825 | 110 | −0.7 | 2.0 | 0.003 | 40 | 350 |
| 59 | 1.8 | 765 | 110 | −0.7 | 2.0 | 0.003 | 40 | 300 |
| 60 | 1.8 | 780 | 110 | −0.7 | 2.0 | 0.003 | 40 | 340 |
| 61 | 1.8 | 830 | 110 | −0.7 | 2.0 | 0.003 | 40 | 380 |
| 62 | 1.8 | 785 | 110 | −0.7 | 2.0 | 0.003 | 40 | 395 |
| 63 | 1.8 | 790 | 110 | −0.7 | 2.0 | 0.003 | 40 | 375 |
| 64 | 1.8 | <u>730</u> | 110 | −0.7 | 2.0 | 0.003 | 40 | 380 |
| 65 | 1.8 | 800 | 110 | <u>−0.03</u> | 2.0 | 0.003 | 40 | 380 |
| 66 | 1.8 | 790 | 110 | −0.7 | 2.0 | 0.003 | 40 | 400 |
| 67 | 1.8 | 775 | 110 | −0.7 | 2.0 | 0.003 | 40 | 380 |
| 68 | 1.8 | 825 | 110 | −0.7 | 2.0 | 0.003 | 40 | 370 |
| 69 | 1.8 | 795 | 110 | −0.7 | 2.0 | 0.003 | 40 | 380 |
| 70 | 1.8 | 800 | 110 | −0.7 | 2.0 | 0.003 | 40 | 400 |
| 71 | 1.8 | 810 | 110 | −0.7 | 2.0 | 0.003 | 40 | 400 |
| 72 | 1.8 | 775 | 110 | −0.7 | 2.0 | 0.003 | 40 | 370 |
| 73 | 1.8 | 820 | 110 | −0.7 | 2.0 | 0.003 | 40 | 390 |
| 74 | 1.8 | 875 | 110 | −0.7 | 2.0 | 0.003 | 40 | 390 |
| 75 | 1.8 | 765 | 110 | −0.7 | 2.0 | 0.003 | 40 | 390 |
| 76 | 1.8 | 780 | 110 | −0.7 | 5.0 | 0.003 | 40 | 390 |
| 77 | 15.0 | 790 | 110 | −0.7 | 2.0 | 0.003 | 40 | 390 |
| 78 | 0.6 | 770 | 110 | −0.7 | 2.0 | 0.003 | 40 | 390 |

| Experimental Example | Second heat treatment | | Alloying temperature °C. | Plating treatment timing | Ac1 °C. | Ac3 °C. |
|---|---|---|---|---|---|---|
| | Holding temperature °C. | Retention time between 300° C. and 480° C. s | | | | |
| 40 | 410 | 250 | — | — | 725 | 822 |
| 41 | 390 | 250 | — | — | 725 | 822 |
| 42 | 400 | 250 | — | — | 725 | 822 |
| 43 | 375 | 250 | — | — | 725 | 822 |
| 44 | 400 | 250 | — | — | 725 | 822 |
| 45 | 375 | 250 | — | — | 725 | 822 |
| 46 | 385 | 250 | — | — | 725 | 822 |
| 47 | 420 | 250 | — | — | 725 | 822 |
| 48 | 420 | 250 | — | — | 725 | 822 |
| 49 | 400 | 250 | — | — | 725 | 822 |
| 50 | 380 | 250 | — | — | 698 | 953 |
| 51 | 370 | 250 | — | — | 698 | 953 |
| 52 | 380 | 250 | — | — | 758 | 847 |
| 53 | 330 | 80 | — | — | 744 | 878 |
| 54 | 340 | 250 | — | — | 744 | 878 |
| 55 | 400 | 250 | — | — | 725 | 837 |
| 56 | 350 | 250 | — | — | 751 | 892 |
| 57 | 370 | 250 | — | — | 706 | 887 |
| 58 | 350 | 250 | — | — | 757 | 880 |
| 59 | 310 | 250 | — | — | 724 | 802 |
| 60 | 350 | 250 | — | — | 733 | 832 |
| 61 | 380 | 250 | — | — | 758 | 871 |
| 62 | 395 | 250 | — | — | 728 | 826 |
| 63 | 395 | 250 | — | — | 741 | 840 |
| 64 | 380 | 250 | — | — | 741 | 840 |
| 65 | 390 | 250 | — | — | 741 | 840 |
| 66 | 420 | 250 | — | — | 741 | 840 |
| 67 | 380 | 250 | — | — | 741 | 840 |
| 68 | 370 | 250 | — | — | 741 | 840 |
| 69 | 390 | 250 | — | — | 741 | 840 |
| 70 | 410 | 250 | — | — | 742 | 844 |
| 71 | 420 | 250 | — | — | 737 | 889 |
| 72 | 370 | 250 | — | — | 714 | 816 |
| 73 | 400 | 250 | — | — | 752 | 888 |
| 74 | 410 | 250 | — | — | 803 | 945 |
| 75 | 410 | 250 | — | — | 699 | 853 |
| 76 | 390 | 250 | — | — | 729 | 825 |
| 77 | 400 | 250 | — | — | 729 | 825 |
| 78 | 390 | 250 | — | — | 729 | 825 |

\* Underlined values are outside the range of the present invention

TABLE 12

| Experi-mental Example | Second heat treatment ||||||||
|---|---|---|---|---|---|---|---|---|
| | Average heating rate at 650° C. or higher ° C. | Highest heating temperature ° C. | Retention time s | Atmosphere |||  Average cooling rate between 700° C. and 600° C. ° C./s | Cooling stop temperature ° C. |
| | | | | log(P$_{H2O}$/P$_{H2}$) | H$_2$ vol % | O$_2$ vol % | | |
| 1' | 1.3 | 790 | 108 | −0.7 | 4.0 | 0.003 | 30 | 410 |
| 2' | 1.3 | 790 | 108 | −0.7 | 4.0 | 0.003 | 30 | 400 |
| 3' | 1.3 | 780 | 108 | −0.7 | 4.0 | 0.003 | 30 | 420 |
| 4' | 1.3 | 790 | 108 | −0.7 | 4.0 | 0.003 | 30 | 420 |
| 5' | 1.3 | 790 | 108 | −0.7 | 4.0 | 0.003 | 30 | 400 |
| 6' | 1.3 | 790 | 108 | −0.7 | 4.0 | 0.003 | 30 | 400 |
| 7' | 1.3 | 790 | 108 | −0.7 | 4.0 | 0.003 | 30 | 390 |
| 8' | 1.3 | 790 | 108 | −0.7 | 4.0 | 0.003 | 30 | 400 |
| 9' | 1.3 | 790 | 108 | −1.6 | 4.0 | 0.003 | 30 | 420 |
| 10' | 1.3 | 790 | 108 | −1.0 | 4.0 | 0.003 | 30 | 400 |
| 11' | 1.3 | 780 | 108 | −0.7 | 2.0 | 0.003 | 30 | 400 |
| 12' | 1.3 | 780 | 108 | −0.7 | 4.0 | 0.008 | 30 | 410 |
| 13' | 16.0 | 790 | 108 | −0.7 | 4.0 | 0.003 | 30 | 390 |
| 14' | 0.5 | 790 | 108 | −0.7 | 4.0 | 0.003 | 30 | 410 |
| 15' | 1.3 | 800 | 108 | −0.7 | 4.0 | 0.003 | 30 | 410 |
| 16' | 1.3 | 790 | 108 | −0.7 | 4.0 | 0.003 | 30 | 400 |
| 17' | 1.3 | 790 | 108 | −0.7 | 4.0 | 0.003 | 30 | 400 |
| 18' | 1.3 | 810 | 108 | −0.7 | 4.0 | 0.003 | 30 | 220 |
| 19' | 1.3 | 800 | 108 | −0.7 | 4.0 | 0.003 | 30 | 220 |
| 20' | 1.3 | 810 | 108 | −1.7 | 4.0 | 0.003 | 30 | 220 |
| 21' | 1.3 | 810 | 108 | −0.7 | 4.0 | 0.003 | 30 | 220 |
| 22' | 1.3 | 815 | 108 | −1.7 | 4.0 | 0.003 | 30 | 260 |
| 23' | 1.3 | 790 | 108 | −0.7 | 4.0 | 0.003 | 30 | 170 |
| 24' | 1.3 | 790 | 108 | −0.7 | 4.0 | 0.003 | 30 | 210 |
| 25' | 1.3 | 780 | 108 | −1.5 | 4.0 | 0.003 | 30 | 170 |
| 26' | 1.3 | 790 | 108 | −0.7 | 4.0 | 0.003 | 30 | 180 |
| 27' | 1.3 | 820 | 108 | −0.7 | 4.0 | 0.003 | 30 | 370 |
| 28' | 1.3 | 810 | 108 | −0.7 | 4.0 | 0.003 | 30 | 370 |
| 29' | 1.3 | 820 | 108 | −1.5 | 4.0 | 0.003 | 30 | 370 |
| 30' | 1.3 | 820 | 108 | −1.6 | 4.0 | 0.003 | 30 | 370 |
| 31' | 1.3 | 880 | 108 | −0.7 | 4.0 | 0.003 | 30 | 370 |
| 32' | 1.3 | 810 | 108 | −0.7 | 4.0 | 0.003 | 30 | 370 |
| 33' | 1.3 | 810 | 108 | −0.7 | 4.0 | 0.003 | 30 | 370 |
| 34' | 1.3 | 810 | 108 | −0.7 | 4.0 | 0.003 | 30 | 370 |
| 35' | 1.3 | 810 | 108 | −0.7 | 4.0 | 0.003 | 30 | 380 |
| 36' | 1.3 | 810 | 108 | −0.7 | 4.0 | 0.003 | 30 | 380 |
| 37' | 1.3 | 800 | 108 | −0.7 | 4.0 | 0.003 | 30 | 350 |
| 38' | 1.3 | 800 | 108 | −0.7 | 4.0 | 0.003 | 30 | 350 |
| 39' | 1.3 | 740 | 108 | −0.7 | 4.0 | 0.003 | 30 | 390 |
| 40' | 1.3 | 740 | 108 | −0.7 | 4.0 | 0.003 | 30 | 390 |
| 41' | 1.3 | 740 | 108 | −0.7 | 4.0 | 0.003 | 30 | 390 |
| 42' | 1.3 | 740 | 108 | −0.7 | 4.0 | 0.003 | 30 | 390 |
| 43' | 1.3 | 740 | 108 | −0.7 | 4.0 | 0.003 | 30 | 390 |

| Experi-mental Example | Second heat treatment |||| Ac1 ° C. | Ac3 ° C. |
|---|---|---|---|---|---|---|
| | Holding temperature ° C. | Retention time between 300° C. and 480° C. s | Alloying temperature ° C. | Plating treatment timing | | |
| 1' | 410 | 120 | 490 | [1] | 729 | 825 |
| 2' | 410 | 120 | 500 | [1] | 729 | 825 |
| 3' | 410 | 120 | 500 | [1] | 729 | 825 |
| 4' | 410 | 120 | 500 | [1] | 729 | 825 |
| 5' | 400 | 120 | 490 | [1] | 729 | 825 |
| 6' | 410 | 120 | 500 | [1] | 729 | 825 |
| 7' | 390 | 120 | 500 | [1] | 729 | 825 |
| 8' | 410 | 120 | 500 | [1] | 729 | 825 |
| 9' | 410 | 120 | 490 | [1] | 729 | 825 |
| 10' | 410 | 120 | 490 | [1] | 729 | 825 |
| 11' | 400 | 120 | 490 | [1] | 729 | 825 |
| 12' | 400 | 120 | 500 | [1] | 729 | 825 |
| 13' | 400 | 120 | 490 | [1] | 729 | 825 |
| 14' | 410 | 120 | 480 | [1] | 729 | 825 |
| 15' | 400 | 120 | 480 | [1] | 729 | 825 |
| 16' | 390 | 120 | 490 | [1] | 729 | 825 |
| 17' | 400 | 120 | — | [1] | 729 | 825 |
| 18' | 380 | 120 | 490 | [1] | 746 | 846 |

TABLE 12-continued

| | | | | | | |
|---|---|---|---|---|---|---|
| 19' | 380 | 120 | 490 | [1] | 746 | 846 |
| 20' | 380 | 120 | 480 | [1] | 746 | 846 |
| 21' | 390 | 120 | 480 | [1] | 746 | 846 |
| 22' | 390 | 120 | 490 | [1] | 746 | 846 |
| 23' | 380 | 120 | 490 | [1] | 745 | 812 |
| 24' | 380 | 120 | 490 | [1] | 745 | 812 |
| 25' | 380 | 120 | 490 | [1] | 745 | 812 |
| 26' | 390 | 120 | 500 | [1] | 745 | 812 |
| 27' | 380 | 120 | 490 | [1] | 727 | 856 |
| 28' | 380 | 120 | 490 | [1] | 727 | 856 |
| 29' | 380 | 120 | 490 | [1] | 727 | 856 |
| 30' | 380 | 120 | 480 | [1] | 727 | 856 |
| 31' | 380 | 120 | 480 | [1] | 727 | 856 |
| 32' | 380 | 120 | 490 | [1] | 727 | 856 |
| 33' | 380 | 120 | 490 | [1] | 727 | 856 |
| 34' | 380 | 120 | 490 | [1] | 727 | 856 |
| 35' | 380 | 120 | 490 | [1] | 743 | 861 |
| 36' | 380 | 120 | 490 | [1] | 743 | 861 |
| 37' | 350 | 120 | 490 | [1] | 727 | 841 |
| 38' | 350 | 120 | 490 | [1] | 727 | 841 |
| 39' | 400 | 120 | 480 | [1] | 712 | 775 |
| 40' | 400 | _7_ | 480 | [1] | 712 | 775 |
| 41' | 400 | 40 | 480 | [1] | 712 | 775 |
| 42' | 410 | 120 | 490 | [1] | 712 | 775 |
| 43' | 400 | 120 | 490 | [1] | 712 | 775 |

\* Underlined values are outside the range of the present invention

TABLE 13

| | Second heat treatment | | | | | | |
|---|---|---|---|---|---|---|---|
| Experimental Example | Average heating rate at 650° C. or higher ° C. | Highest heating temperature ° C. | Retention time s | Atmosphere log($P_{H2O}/P_{H2}$) | H$_2$ | O$_2$ | Average cooling rate between 700° C. and 600° C. ° C./s | Cooling stop temperature ° C. |
| 44' | 1.3 | 800 | 108 | −0.7 | 4.0 | 0.003 | 30 | 400 |
| 45' | 1.3 | 780 | 108 | −0.7 | 4.0 | 0.003 | 30 | 400 |
| 46' | 1.3 | 780 | 108 | −0.7 | 4.0 | 0.003 | 30 | 400 |
| 47' | 1.3 | 790 | 5 | −0.7 | 4.0 | 0.003 | 30 | 390 |
| 48' | 1.3 | 790 | 108 | −0.7 | 4.0 | 0.003 | _2_ | 390 |
| 49' | 1.3 | 790 | 108 | −0.7 | 4.0 | 0.003 | 30 | 390 |
| 50' | 1.3 | 780 | 108 | −0.7 | 4.0 | 0.003 | 30 | 380 |
| 51' | 1.3 | 780 | 108 | −0.7 | 4.0 | 0.003 | 30 | 380 |
| 52' | 1.3 | 780 | 108 | −0.7 | 4.0 | 0.003 | 30 | 390 |
| 53' | 1.3 | 800 | 108 | _−1.5_ | 4.0 | 0.003 | 30 | 380 |
| 54' | 1.3 | 790 | 108 | −0.7 | 4.0 | 0.003 | 30 | 390 |
| 55' | 1.3 | 870 | 108 | −0.7 | 4.0 | 0.003 | 30 | 380 |
| 56' | 1.3 | 870 | 108 | _−1.6_ | 4.0 | 0.003 | 30 | 370 |
| 57' | 1.3 | 800 | 108 | −0.7 | 4.0 | 0.003 | 30 | 350 |
| 58' | 1.3 | 810 | 108 | −0.7 | 4.0 | 0.003 | 30 | 350 |
| 59' | 1.3 | 820 | 108 | −0.7 | 4.0 | 0.003 | 30 | 350 |
| 60' | 1.3 | 790 | 108 | −0.7 | 4.0 | 0.003 | 30 | 230 |
| 61' | 1.3 | 820 | 108 | −0.7 | 4.0 | 0.003 | 30 | 370 |
| 62' | 1.3 | 810 | 108 | −0.7 | 4.0 | 0.003 | 30 | 370 |
| 63' | 1.3 | 830 | 108 | −0.7 | 4.0 | 0.003 | 30 | 370 |
| 64' | 1.3 | 770 | 108 | −0.7 | 4.0 | 0.003 | 30 | 300 |
| 65' | 1.3 | 780 | 108 | −0.7 | 4.0 | 0.003 | 30 | 350 |
| 66' | 1.3 | 830 | 108 | −0.7 | 4.0 | 0.003 | 30 | 400 |
| 67' | 1.3 | 780 | 108 | −0.7 | 4.0 | 0.003 | 30 | 400 |
| 68' | 1.3 | 790 | 108 | −0.7 | 4.0 | 0.003 | 30 | 430 |
| 69' | 1.3 | _735_ | 108 | −0.7 | 4.0 | 0.003 | 30 | 430 |
| 70' | 1.3 | 800 | 108 | _0.0_ | 4.0 | 0.003 | 30 | 430 |
| 71' | 1.3 | 790 | 108 | −0.7 | 4.0 | 0.003 | 30 | 430 |
| 72' | 1.3 | 775 | 108 | −0.7 | 4.0 | 0.003 | 30 | 430 |
| 73' | 1.3 | 820 | 108 | −0.7 | 4.0 | 0.003 | 30 | 420 |
| 74' | 1.3 | 795 | 108 | −0.7 | 4.0 | 0.003 | 30 | 430 |
| 75' | 1.3 | 800 | 108 | −0.7 | 4.0 | 0.003 | 30 | 410 |

TABLE 13-continued

| | | | | | | | | |
|---|---|---|---|---|---|---|---|---|
| 76' | 1.3 | 810 | 108 | −0.7 | 4.0 | 0.003 | 30 | 410 |
| 77' | 1.3 | 775 | 108 | −0.7 | 4.0 | 0.003 | 30 | 400 |
| 78' | 1.3 | 820 | 108 | −0.7 | 4.0 | 0.003 | 30 | 400 |
| 79' | 1.3 | 875 | 108 | −0.7 | 4.0 | 0.003 | 30 | 400 |
| 80' | 1.3 | 765 | 108 | −0.7 | 4.0 | 0.003 | 30 | 400 |
| 81' | 1.3 | 785 | 108 | −0.7 | 4.0 | 0.003 | 30 | 400 |
| 82' | 1.3 | 790 | 108 | −0.7 | 4.0 | 0.003 | 30 | 200 |
| 83' | 1.3 | 785 | 108 | −0.7 | 4.0 | 0.003 | 30 | 310 |
| 84' | 1.3 | 795 | 108 | −0.7 | 4.0 | 0.003 | 30 | 60 |
| 85' | 1.3 | 785 | 108 | −0.7 | 4.0 | 0.003 | 30 | 180 |
| 86' | 1.3 | 790 | 108 | −0.7 | 4.0 | 0.003 | 30 | 200 |
| 87' | 1.3 | 810 | 108 | −0.7 | 4.0 | 0.003 | 30 | 180 |
| 88' | 1.3 | 790 | 108 | −0.7 | 4.0 | 0.003 | 30 | 170 |
| 89' | 1.3 | 790 | 108 | −0.7 | 4.0 | 0.003 | 30 | 410 |

| Experimental Example | Second heat treatment | | | | Ac1 °C. | Ac3 °C. |
|---|---|---|---|---|---|---|
| | Holding temperature °C. | Retention time between 300° C. and 480° C. s | Alloying temperature °C. | Plating treatment timing | | |
| 44' | 390 | 120 | 480 | [1] | 709 | 868 |
| 45' | 410 | 120 | 490 | [1] | 725 | 822 |
| 46' | 380 | 120 | 490 | [1] | 725 | 822 |
| 47' | 380 | 120 | 480 | [1] | 725 | 822 |
| 48' | 380 | 120 | 480 | [1] | 725 | 822 |
| 49' | 380 | 120 | 480 | [1] | 725 | 822 |
| 50' | 370 | 120 | 480 | [1] | 725 | 822 |
| 51' | 370 | 120 | 480 | [1] | 725 | 822 |
| 52' | 400 | 120 | 480 | [1] | 725 | 822 |
| 53' | 380 | 120 | 480 | [1] | 725 | 822 |
| 54' | 400 | 120 | 480 | [1] | 725 | 822 |
| 55' | 390 | 120 | 490 | [1] | 698 | 953 |
| 56' | 390 | 120 | 490 | [1] | 698 | 953 |
| 57' | 380 | 120 | 490 | [1] | 758 | 847 |
| 58' | 380 | 80 | 490 | [1] | 744 | 878 |
| 59' | 400 | 120 | — | [1] | 744 | 878 |
| 60' | 380 | 120 | 490 | [1] | 725 | 837 |
| 61' | 380 | 120 | 490 | [1] | 751 | 892 |
| 62' | 400 | 120 | 490 | [1] | 706 | 887 |
| 63' | 400 | 120 | 480 | [1] | 757 | 880 |
| 64' | 380 | 120 | 490 | [1] | 724 | 802 |
| 65' | 380 | 120 | 490 | [1] | 733 | 832 |
| 66' | 410 | 120 | 480 | [1] | 758 | 871 |
| 67' | 410 | 120 | 490 | [1] | 728 | 826 |
| 68' | 420 | 120 | 480 | [1] | 741 | 840 |
| 69' | 430 | 120 | 490 | [1] | 741 | 840 |
| 70' | 420 | 120 | 490 | [1] | 741 | 840 |
| 71' | 420 | 120 | 490 | [1] | 741 | 840 |
| 72' | 420 | 120 | 490 | [1] | 741 | 840 |
| 73' | 420 | 120 | 490 | [1] | 741 | 840 |
| 74' | 420 | 120 | — | [1] | 741 | 840 |
| 75' | 400 | 120 | 490 | [1] | 742 | 844 |
| 76' | 410 | 120 | 480 | [1] | 737 | 889 |
| 77' | 390 | 120 | 500 | [1] | 714 | 816 |
| 78' | 390 | 120 | 490 | [1] | 752 | 888 |
| 79' | 400 | 120 | 490 | [1] | 803 | 945 |
| 80' | 400 | 120 | 490 | [1] | 699 | 853 |
| 81' | 390 | 120 | 500 | [2] | 729 | 825 |
| 82' | 400 | 120 | 490 | [2] | 729 | 825 |
| 83' | 400 | 120 | 490 | [2] | 729 | 825 |
| 84' | 400 | 120 | 500 | [2] | 729 | 825 |
| 85' | 390 | 300 | 500 | [2] | 729 | 825 |
| 86' | 400 | 120 | — | [2] | 729 | 825 |
| 87' | 380 | 120 | 490 | [2] | 746 | 846 |
| 88' | 380 | 120 | 490 | [2] | 745 | 812 |
| 89' | 400 | 120 | 490 | [3] | 729 | 825 |

* Underlined values are outside the range of the present invention

Next, for the steel sheets of Experimental Examples Nos. 1 to 78 and Experimental Examples Nos. 1' to No. 89' thus obtained, the steel structure (the steel structure of the steel sheet inside) in the ⅛ to ⅜ thickness range centered on the ¼ thickness position from the surface was measured by the above-described method, and the volume fractions of soft ferrite, retained austenite, tempered martensite, fresh martensite, sum of pearlite and cementite, hard ferrite, and bainite were examined.

In addition, for the steel sheet inside of the steel sheets of Experimental Examples Nos. 1 to 78 and Experimental Examples Nos. 1' to 89', the number proportion of retained austenite having an aspect ratio of 2.0 or more in the total retained austenite was examined by the above-described method.

The results are shown in Tables 14 to 17.

TABLE 14

| Experimental Example | Soft ferrite vol % | Retained austenite Fraction vol % | Retained austenite Proportion with aspect ratio ≥2.0 % | Tempered martensite % | Fresh martensite vol % | Pearlite + cementite vol % | Bainite vol % | Hard ferrite vol % | Primary residual structure | Note |
|---|---|---|---|---|---|---|---|---|---|---|
| 1 | 6 | 14 | 83 | 0 | 4 | 0 | 15 | 61 | Hard α | Present Invention |
| 2 | 31 | 14 | 41 | 0 | 7 | 0 | 14 | 34 | Hard α | Comparative Example |
| 3 | 5 | 14 | 84 | 0 | 3 | 0 | 11 | 67 | Hard α | Present Invention |
| 4 | 8 | 14 | 66 | 0 | 5 | 0 | 15 | 58 | Hard α | Present Invention |
| 5 | 6 | 14 | 44 | 0 | 4 | 0 | 30 | 46 | Hard α | Comparative Example |
| 6 | 6 | 13 | 89 | 0 | 4 | 0 | 11 | 66 | Hard α | Comparative Example |
| 7 | 23 | 12 | 71 | 0 | 3 | 0 | 24 | 38 | Hard α | Present Invention |
| 8 | 39 | 13 | 70 | 0 | 3 | 0 | 31 | 14 | Bainite | Comparative Example |
| 9 | 9 | 14 | 84 | 0 | 3 | 0 | 15 | 59 | Hard α | Comparative Example |
| 10 | 7 | 12 | 82 | 0 | 4 | 0 | 16 | 61 | Hard α | Present Invention |
| 11 | 38 | 13 | 46 | 0 | 6 | 0 | 43 | 0 | Bainite | Comparative Example |
| 12 | 5 | 13 | 83 | 0 | 5 | 0 | 14 | 63 | Hard α | Present Invention |
| 13 | 5 | 16 | 84 | 20 | 4 | 0 | 0 | 55 | Hard α | Present Invention |
| 14 | 6 | 15 | 76 | 21 | 3 | 0 | 10 | 45 | Hard α | Present Invention |
| 15 | 5 | 17 | 81 | 19 | 4 | 0 | 9 | 46 | Hard α | Comparative Example |
| 16 | 5 | 15 | 87 | 15 | 4 | 0 | 9 | 52 | Hard α | Comparative Example |
| 17 | 28 | 15 | 45 | 23 | 5 | 0 | 28 | 0 | Bainite | Comparative Example |
| 18 | 0 | 26 | 81 | 25 | 9 | 0 | 0 | 40 | Hard α | Present Invention |
| 19 | 0 | 21 | 64 | 16 | 18 | 0 | 7 | 39 | Hard α | Present Invention |
| 20 | 0 | 27 | 74 | 25 | 7 | 0 | 0 | 41 | Hard α | Comparative Example |
| 21 | 0 | 25 | 83 | 26 | 7 | 0 | 6 | 37 | Hard α | Present Invention |
| 22 | 21 | 7 | 87 | 0 | 4 | 0 | 12 | 56 | Hard α | Present Invention |
| 23 | 7 | 5 | 90 | 0 | 5 | 0 | 15 | 68 | Hard α | Present Invention |
| 24 | 8 | 6 | 81 | 0 | 5 | 0 | 16 | 65 | Hard α | Comparative Example |
| 25 | 4 | 5 | 83 | 0 | 4 | 0 | 15 | 72 | Hard α | Comparative Example |
| 26 | 10 | 2 | 50 | 43 | 5 | 0 | 40 | 0 | Bainite | Comparative Example |
| 27 | 19 | 7 | 76 | 0 | 3 | 0 | 14 | 57 | Hard α | Present Invention |
| 28 | 8 | 6 | 86 | 0 | 2 | 0 | 15 | 69 | Hard α | Present Invention |
| 29 | 40 | 1 | 57 | 28 | 2 | 0 | 29 | 0 | Bainite | Comparative Example |
| 30 | 6 | 10 | 76 | 0 | 4 | 0 | 15 | 65 | Hard α | Present Invention |
| 31 | 6 | 12 | 82 | 0 | 4 | 0 | 15 | 63 | Hard α | Present Invention |
| 32 | 8 | 10 | 80 | 0 | 4 | 0 | 15 | 63 | Hard α | Present Invention |
| 33 | 5 | 8 | 81 | 0 | 4 | 0 | 13 | 70 | Hard α | Present Invention |
| 34 | 4 | 20 | 83 | 0 | 6 | 0 | 13 | 57 | Hard α | Present Invention |
| 35 | 9 | 18 | 83 | 0 | 32 | 0 | 10 | 31 | Hard α | Comparative Example |
| 36 | 7 | 19 | 85 | 0 | 14 | 0 | 11 | 49 | Hard α | Present Invention |
| 37 | 8 | 18 | 78 | 0 | 4 | 0 | 8 | 62 | Hard α | Present Invention |
| 38 | 19 | 17 | 38 | 14 | 10 | 0 | 32 | 9 | Bainite | Comparative Example |
| 39 | 4 | 23 | 78 | 0 | 9 | 0 | 13 | 51 | Hard α | Present Invention |

* Underlined values are outside the range of the present invention

TABLE 15

| Experimental Example | Soft ferrite vol % | Retained austenite Fraction vol % | Retained austenite Proportion with aspect ratio ≥2.0 % | Tempered martensite % | Fresh martensite vol % | Pearlite + cementite vol % | Bainite vol % | Hard ferrite vol % | Primary residual structure | Note |
|---|---|---|---|---|---|---|---|---|---|---|
| 40 | 6 | 13 | 79 | 0 | 5 | 0 | 17 | 59 | Hard α | Present Invention |
| 41 | 7 | 14 | 56 | 0 | 5 | 0 | 14 | 60 | Hard α | Present Invention |
| 42 | 7 | 5 | 87 | 0 | 4 | 6 | 12 | 66 | Hard α | Present Invention |
| 43 | 7 | 2 | 75 | 0 | 2 | 12 | 12 | 65 | Hard α | Comparative Example |
| 44 | 6 | 12 | 79 | 0 | 4 | 0 | 13 | 65 | Hard α | Present Invention |

TABLE 15-continued

Internal structure

| Experimental Example | Soft ferrite vol % | Retained austenite Fraction vol % | Retained austenite Proportion with aspect ratio ≥2.0 % | Tempered martensite % | Fresh martensite vol % | Pearlite + cementite vol % | Bainite vol % | Hard ferrite vol % | Primary residual structure | Note |
|---|---|---|---|---|---|---|---|---|---|---|
| 45 | 11 | 15 | 84 | 0 | 5 | 0 | 14 | 55 | Hard α | Present Invention |
| 46 | 25 | 14 | 75 | 0 | 5 | 0 | 11 | 45 | Hard α | Present Invention |
| 47 | 11 | 12 | <u>42</u> | 0 | 9 | 0 | 68 | 0 | Bainite | Comparative Example |
| 48 | 13 | 14 | <u>47</u> | 0 | 9 | 0 | 64 | 0 | Bainite | Comparative Example |
| 49 | 7 | 13 | 60 | 0 | 4 | 0 | 13 | 63 | Hard α | Present Invention |
| 50 | 10 | 13 | 78 | 0 | 3 | 0 | 14 | 60 | Hard α | Present Invention |
| 51 | 9 | 13 | 88 | 0 | 3 | 0 | 12 | 63 | Hard α | Comparative Example |
| 52 | 24 | 12 | 85 | 0 | 3 | 7 | 8 | 46 | Hard α | Present Invention |
| 53 | 9 | 6 | 84 | 0 | 11 | 0 | 10 | 64 | Hard α | Present Invention |
| 54 | 5 | 10 | 86 | 0 | 3 | 0 | 15 | 67 | Hard α | Present Invention |
| 55 | 7 | 4 | 84 | 31 | 0 | 0 | 20 | 38 | Hard α | Present Invention |
| 56 | 8 | 5 | 89 | 0 | 5 | 0 | 18 | 64 | Hard α | Present Invention |
| 57 | 6 | 10 | 84 | 0 | 2 | 0 | 15 | 67 | Hard α | Present Invention |
| 58 | 1 | 13 | 88 | 0 | 5 | 0 | 12 | 69 | Hard α | Present Invention |
| 59 | 0 | 16 | 86 | 0 | 7 | 0 | 12 | 65 | Hard α | Present Invention |
| 60 | 0 | 14 | 90 | 0 | 3 | 0 | 16 | 67 | Hard α | Present Invention |
| 61 | 0 | 14 | 88 | 0 | 5 | 0 | 17 | 64 | Hard α | Present Invention |
| 62 | 25 | 5 | 84 | 18 | 0 | 6 | 11 | 35 | Hard α | Present Invention |
| 63 | 2 | 18 | 90 | 0 | 4 | 0 | 16 | 60 | Hard α | Present Invention |
| 64 | 6 | <u>0</u> | — | 0 | 2 | 6 | 86 | 0 | Bainite | Comparative Example |
| 65 | 4 | 11 | 85 | 0 | 3 | 0 | 12 | 70 | Hard α | Comparative Example |
| 66 | 3 | 17 | 85 | 0 | 4 | 0 | 14 | 62 | Hard α | Present Invention |
| 67 | 3 | 16 | 63 | 0 | 4 | 0 | 17 | 60 | Hard α | Present Invention |
| 68 | 12 | 13 | 65 | 10 | 7 | 0 | 12 | 46 | Hard α | Present Invention |
| 69 | 4 | 19 | 86 | 0 | 4 | 0 | 11 | 62 | Hard α | Present Invention |
| 70 | 6 | 15 | 89 | 0 | 4 | 0 | 18 | 57 | Hard α | Present Invention |
| 71 | 25 | <u>2</u> | 84 | 0 | 5 | 0 | 11 | 57 | Hard α | Comparative Example |
| 72 | 13 | 5 | 79 | 0 | 2 | 0 | 16 | 64 | Hard α | Comparative Example |
| 73 | <u>68</u> | 5 | <u>37</u> | 0 | 1 | 8 | 2 | 16 | Hard α | Comparative Example |
| 74 | 3 | 18 | 83 | 0 | 13 | 0 | 14 | 52 | Hard α | Comparative Example |
| 75 | 0 | 8 | <u>42</u> | 0 | 25 | 0 | 9 | 58 | Hard α | Comparative Example |
| 76 | 6 | 14 | 78 | 0 | 5 | 0 | 16 | 59 | Hard α | Present Invention |
| 77 | 8 | 12 | 81 | 0 | 4 | 0 | 15 | 61 | Hard α | Present Invention |
| 78 | 21 | 14 | 70 | 0 | 6 | 0 | 12 | 47 | Hard α | Present Invention |

* Underlined values are outside the range of the present invention

TABLE 16

Internal structure

| Experimental Example | Soft ferrite vol % | Retained austenite Fraction vol % | Retained austenite Proportion with aspect ratio ≥2.0 % | Tempered martensite % | Fresh martensite vol % | Pearlite + cementite vol % | Bainite vol % | Hard ferrite vol % | Primary residual structure | Note |
|---|---|---|---|---|---|---|---|---|---|---|
| 1' | 6 | 16 | 78 | 0 | 3 | 0 | 17 | 58 | Hard α | Present Invention |
| 2' | <u>36</u> | 14 | <u>41</u> | 0 | 4 | 0 | 14 | 32 | Hard α | Comparative Example |
| 3' | <u>5</u> | 14 | 84 | 0 | 2 | 0 | 11 | 68 | Hard α | Comparative Example |
| 4' | 9 | 14 | 64 | 0 | 4 | 0 | 14 | 59 | Hard α | Present Invention |
| 5' | 7 | 13 | <u>38</u> | 0 | 4 | 0 | 31 | 45 | Hard α | Comparative Example |
| 6' | 9 | 15 | 90 | 0 | 4 | 0 | 10 | 62 | Hard α | Comparative Example |
| 7' | 22 | 13 | 72 | 0 | 4 | 0 | 28 | 33 | Hard α | Present Invention |
| 8' | <u>37</u> | 13 | 65 | 0 | 5 | 0 | 32 | 13 | Bainite | Comparative Example |
| 9' | 7 | 14 | 82 | 0 | 2 | 0 | 14 | 63 | Hard α | Comparative Example |
| 10' | 9 | 14 | 80 | 0 | 4 | 0 | 10 | 63 | Hard α | Present Invention |
| 11' | 7 | 14 | 87 | 0 | 4 | 0 | 16 | 59 | Hard α | Present Invention |
| 12' | 6 | 14 | 79 | 0 | 3 | 0 | 16 | 61 | Hard α | Present Invention |
| 13' | 5 | 15 | 86 | 0 | 5 | 0 | 16 | 59 | Hard α | Present Invention |
| 14' | 13 | 15 | 75 | 0 | 4 | 0 | 12 | 56 | Hard α | Present Invention |
| 15' | <u>41</u> | 9 | <u>38</u> | 0 | 7 | 0 | 43 | 0 | Bainite | Comparative Example |
| 16' | 6 | 15 | 79 | 0 | 3 | 0 | 13 | 63 | Hard α | Present Invention |
| 17' | 7 | 15 | 91 | 0 | 4 | 0 | 13 | 61 | Hard α | Present Invention |
| 18' | 3 | 18 | 87 | 18 | 3 | 0 | 2 | 56 | Hard α | Present Invention |
| 19' | 3 | 15 | 95 | 20 | 3 | 0 | 13 | 46 | Hard α | Present Invention |
| 20' | 7 | 17 | 75 | 18 | 4 | 0 | 7 | 47 | Hard α | Comparative Example |
| 21' | 5 | 16 | 93 | 14 | 3 | 0 | 11 | 51 | Hard α | Comparative Example |

TABLE 16-continued

| | | Internal structure | | | | | | | | |
|---|---|---|---|---|---|---|---|---|---|---|
| | | Retained austenite | | | | | | | | |
| Experimental Example | Soft ferrite vol % | Fraction vol % | Proportion with aspect ratio ≥2.0 % | Tempered martensite % | Fresh martensite vol % | Pearlite + cementite vol % | Bainite vol % | Hard ferrite vol % | Primary residual structure | Note |
| 22' | 26 | 14 | <u>43</u> | 25 | 5 | 0 | 30 | 0 | Bainite | Comparative Example |
| 23' | 0 | 28 | 75 | 24 | 7 | 0 | 0 | 41 | Hard α | Present Invention |
| 24' | 0 | 21 | 59 | 16 | 19 | 0 | 7 | 37 | Hard α | Present Invention |
| 25' | 0 | 28 | 71 | 24 | 7 | 0 | 4 | 37 | Hard α | Comparative Example |
| 26' | 0 | 25 | 77 | 24 | 7 | 0 | 5 | 39 | Hard α | Present Invention |
| 27' | 20 | 6 | 93 | 0 | 2 | 0 | 10 | 62 | Hard α | Present Invention |
| 28' | 6 | 4 | 85 | 0 | 4 | 0 | 15 | 71 | Hard α | Present Invention |
| 29' | 8 | 5 | 79 | 0 | 5 | 0 | 12 | 70 | Hard α | Comparative Example |
| 30' | 3 | 6 | 82 | 0 | 4 | 0 | 17 | 70 | Hard α | Comparative Example |
| 31' | 9 | 5 | <u>47</u> | 43 | 5 | 0 | 38 | 0 | Bainite | Comparative Example |
| 32' | 19 | 6 | 78 | 0 | 4 | 0 | 15 | 56 | Hard α | Present Invention |
| 33' | 7 | 5 | 93 | 0 | 4 | 0 | 12 | 72 | Hard α | Present Invention |
| 34' | <u>39</u> | <u>2</u> | 52 | 28 | 2 | 0 | 29 | 0 | Bainite | Comparative Example |
| 35' | 5 | 11 | 84 | 0 | 3 | 0 | 14 | 67 | Hard α | Present Invention |
| 36' | 7 | 13 | 87 | 0 | 3 | 0 | 14 | 63 | Hard α | Present Invention |
| 37' | 7 | 10 | 88 | 0 | 3 | 0 | 18 | 62 | Hard α | Present Invention |
| 38' | 7 | 8 | 89 | 0 | 2 | 0 | 16 | 67 | Hard α | Present Invention |
| 39' | 6 | 18 | 79 | 0 | 7 | 0 | 14 | 55 | Hard α | Present Invention |
| 40' | 8 | 17 | 74 | 0 | <u>33</u> | 0 | 10 | 32 | Hard α | Comparative Example |
| 41' | 4 | 18 | 89 | 0 | 15 | 0 | 8 | 55 | Hard α | Present Invention |
| 42' | 8 | 18 | 84 | 0 | 4 | 0 | 15 | 55 | Hard α | Present Invention |
| 43' | 18 | 17 | <u>40</u> | 14 | 10 | 0 | 29 | 12 | Bainite | Comparative Example |

* Underlined values are outside the range of the present invention

TABLE 17

| | | Internal structure | | | | | | | | |
|---|---|---|---|---|---|---|---|---|---|---|
| | | Retained austenite | | | | | | | | |
| Experimental Example | Soft ferrite vol % | Fraction vol % | Proportion with aspect ratio ≥2.0 % | Tempered martensite % | Fresh martensite vol % | Pearlite + cementite vol % | Bainite vol % | Hard ferrite vol % | Primary residual structure | Note |
| 44' | 3 | 22 | 79 | 0 | 8 | 0 | 16 | 51 | Hard α | Present Invention |
| 45' | 6 | 15 | 91 | 0 | 3 | 0 | 12 | 64 | Hard α | Present Invention |
| 46' | 4 | 15 | 68 | 0 | 4 | 0 | 15 | 62 | Hard α | Present Invention |
| 47' | 6 | 6 | 78 | 0 | 5 | 6 | 17 | 60 | Hard α | Present Invention |
| 48' | 7 | 3 | 82 | 0 | 1 | <u>13</u> | 13 | 63 | Hard α | Comparative Example |
| 49' | 6 | 12 | 80 | 0 | 5 | 0 | 12 | 65 | Hard α | Present Invention |
| 50' | 8 | 13 | 78 | 0 | 3 | 0 | 11 | 65 | Hard α | Present Invention |
| 51' | 27 | 13 | 85 | 0 | 4 | 0 | 8 | 48 | Hard α | Present Invention |
| 52' | 12 | 12 | <u>45</u> | 0 | 9 | 0 | 67 | 0 | Bainite | Comparative Example |
| 53' | 12 | 14 | <u>47</u> | 0 | 9 | 0 | 65 | 0 | Bainite | Comparative Example |
| 54' | 6 | 10 | 63 | 0 | 4 | 0 | 12 | 68 | Hard α | Present Invention |
| 55' | 11 | 13 | 80 | 0 | 1 | 0 | 11 | 64 | Hard α | Present Invention |
| 56' | 9 | 13 | 83 | 0 | 3 | 0 | 17 | 58 | Hard α | Comparative Example |
| 57' | 24 | 12 | 79 | 0 | 2 | 7 | 8 | 47 | Hard α | Present Invention |
| 58' | 9 | 8 | 94 | 0 | 12 | 0 | 10 | 61 | Hard α | Present Invention |
| 59' | 6 | 11 | 80 | 0 | 3 | 0 | 14 | 66 | Hard α | Present Invention |
| 60' | 7 | 5 | 83 | 33 | 1 | 0 | 18 | 36 | Hard α | Present Invention |
| 61' | 7 | 4 | 84 | 0 | 6 | 0 | 13 | 70 | Hard α | Present Invention |
| 62' | 5 | 10 | 83 | 0 | 2 | 0 | 12 | 71 | Hard α | Present Invention |
| 63' | 2 | 14 | 82 | 0 | 4 | 0 | 12 | 68 | Hard α | Present Invention |
| 64' | 0 | 16 | 86 | 0 | 7 | 0 | 16 | 61 | Hard α | Present Invention |
| 65' | 0 | 16 | 84 | 0 | 2 | 0 | 13 | 69 | Hard α | Present Invention |
| 66' | 0 | 16 | 87 | 0 | 4 | 0 | 11 | 69 | Hard α | Present Invention |
| 67' | 23 | 5 | 84 | 16 | 1 | 6 | 8 | 42 | Hard α | Present Invention |
| 68' | 1 | 17 | 85 | 0 | 5 | 0 | 18 | 59 | Hard α | Present Invention |
| 69' | 4 | <u>1</u> | 80 | 0 | 2 | 6 | 87 | 0 | Bainite | Comparative Example |
| 70' | 4 | 14 | 89 | 0 | 5 | 0 | 12 | 65 | Hard α | Comparative Example |
| 71' | 3 | 18 | 81 | 0 | 2 | 0 | 15 | 62 | Hard α | Present Invention |
| 72' | 3 | 18 | 63 | 0 | 4 | 0 | 15 | 60 | Hard α | Present Invention |
| 73' | 12 | 11 | 64 | 10 | 6 | 0 | 12 | 49 | Hard α | Present Invention |
| 74' | 3 | 17 | 82 | 0 | 4 | 0 | 13 | 63 | Hard α | Present Invention |
| 75' | 7 | 16 | 85 | 0 | 5 | 0 | 16 | 56 | Hard α | Present Invention |
| 76' | 26 | <u>2</u> | 88 | 0 | 4 | 0 | 14 | 54 | Hard α | Comparative Example |

TABLE 17-continued

| | | | | Internal structure | | | | | | |
|---|---|---|---|---|---|---|---|---|---|---|
| | | Retained austenite | | | | | | | | |
| Experimental Example | Soft ferrite vol % | Fraction vol % | Proportion with aspect ratio ≥2.0 % | Tempered martensite vol % | Fresh martensite vol % | Pearlite + cementite vol % | Bainite vol % | Hard ferrite vol % | Primary residual structure | Note |
| 77' | 11 | 4 | 87 | 0 | 3 | 0 | 12 | 70 | Hard α | Comparative Example |
| 78' | 68 | 1 | 36 | 0 | 1 | 8 | 3 | 19 | Hard α | Comparative Example |
| 79' | 4 | 20 | 86 | 0 | 13 | 0 | 12 | 51 | Hard α | Comparative Example |
| 80' | 0 | 6 | 45 | 0 | 26 | 0 | 11 | 57 | Hard α | Comparative Example |
| 81' | 7 | 17 | 83 | 0 | 5 | 0 | 13 | 58 | Hard α | Present Invention |
| 82' | 6 | 20 | 87 | 20 | 4 | 0 | 9 | 41 | Hard α | Present Invention |
| 83' | 6 | 19 | 82 | 5 | 4 | 0 | 8 | 58 | Hard α | Present Invention |
| 84' | 6 | 15 | 88 | 43 | 1 | 0 | 4 | 31 | Hard α | Present Invention |
| 85' | 4 | 17 | 85 | 24 | 2 | 0 | 8 | 45 | Hard α | Present Invention |
| 86' | 5 | 19 | 82 | 18 | 2 | 0 | 10 | 46 | Hard α | Present Invention |
| 87' | 3 | 19 | 88 | 24 | 1 | 0 | 7 | 46 | Hard α | Present Invention |
| 88' | 0 | 29 | 74 | 41 | 5 | 0 | 5 | 20 | Hard α | Present Invention |
| 89' | 6 | 11 | 82 | 6 | 1 | 0 | 15 | 61 | Hard α | Present Invention |

* Underlined values are outside the range of the present invention

Next, for the steel sheets of Experimental Examples Nos. 1 to 78 and Experimental Examples Nos. 1' to 89', the steel structure and hardness were measured by the above-described method, and the thickness of the soft layer, the volume fraction of ferrite having an aspect ratio of 3.0 or more in the ferrite in the soft layer, and the ratio between the volume fractions of the retained austenite in the soft layer and the retained austenite in the steel sheet inside were examined. The results are shown in Tables 18 to 21.

Furthermore, for the steel sheets of Experimental Examples Nos. 1 to 78 and Experimental Examples Nos. 1' to 89', the peak of the emission intensity at a wavelength indicating Si was analyzed in the depth direction from the surface by the radio-frequency glow discharge analysis method, and whether or not a peak (a peak indicating that an internal oxide layer containing Si oxides was present) of the emission intensity at a wavelength indicating Si had appeared in a depth range of more than 0.2 μm to 10.0 μm or less was examined.

In addition, for the steel sheets of Experimental Examples Nos. 1 to 78 and Experimental Examples Nos. 1' to 89', the peak of the emission intensity at a wavelength indicating Si appearing between the depths of more than 0.2 μm and 10.0 μm or less in the depth direction from the surface was evaluated as an internal oxide peak "present", and no peak appeared was evaluated as an internal oxide peak "absent". The results are shown in Tables 18 to 21.

TABLE 18

| | Surface layer structure | | | | |
|---|---|---|---|---|---|
| Experimental Example | Soft layer thickness μm | Proportion of ferrite having aspect ratio of 3.0 or more % | Residual γ in soft layer/residual γ of steel sheet inside % | Internal oxide peak | Note |
| 1 | 28 | 71 | 25 | Present | Present Invention |
| 2 | 34 | 48 | 22 | Present | Comparative Example |
| 3 | 35 | 85 | 27 | Present | Present Invention |
| 4 | 32 | 63 | 23 | Present | Present Invention |
| 5 | 31 | 78 | 26 | Present | Comparative Example |
| 6 | 38 | 25 | 17 | Present | Comparative Example |
| 7 | 35 | 53 | 25 | Present | Present Invention |
| 8 | 47 | 44 | 20 | Present | Comparative Example |
| 9 | 0 | — | — | Absent | Comparative Example |
| 10 | 21 | 75 | 72 | Present | Present Invention |
| 11 | 29 | 18 | 26 | Present | Comparative Example |
| 12 | 30 | 83 | 29 | Present | Present Invention |
| 13 | 38 | 76 | 30 | Present | Present Invention |
| 14 | 35 | 77 | 28 | Present | Present Invention |
| 15 | 29 | 27 | 82 | Present | Comparative Example |
| 16 | 43 | 21 | 16 | Present | Comparative Example |
| 17 | 40 | 14 | 18 | Present | Comparative Example |
| 18 | 47 | 79 | 20 | Present | Present Invention |
| 19 | 55 | 71 | 22 | Present | Present Invention |
| 20 | 0 | — | — | Absent | Comparative Example |
| 21 | 50 | 82 | 25 | Present | Present Invention |
| 22 | 15 | 60 | 19 | Present | Present Invention |
| 23 | 17 | 65 | 18 | Present | Present Invention |
| 24 | 16 | 20 | 84 | Present | Comparative Example |
| 25 | 0 | — | — | Absent | Comparative Example |
| 26 | 20 | 35 | 33 | Present | Comparative Example |
| 27 | 23 | 52 | 21 | Present | Present Invention |

TABLE 18-continued

| | Surface layer structure | | | | |
|---|---|---|---|---|---|
| Experimental Example | Soft layer thickness μm | Proportion of ferrite having aspect ratio of 3.0 or more % | Residual γ in soft layer/residual γ of steel sheet inside % | Internal oxide peak | Note |
| 28 | 16 | 73 | 10 | Present | Present Invention |
| 29 | 20 | <u>29</u> | 12 | Present | Comparative Example |
| 30 | 26 | 73 | 21 | Present | Present Invention |
| 31 | 29 | 77 | 24 | Present | Present Invention |
| 32 | 22 | 84 | 15 | Present | Present Invention |
| 33 | 22 | 80 | 12 | Present | Present Invention |
| 34 | 35 | 71 | 20 | Present | Present Invention |
| 35 | 35 | 76 | 23 | Present | Comparative Example |
| 36 | 39 | 75 | 14 | Present | Present Invention |
| 37 | 32 | 85 | 9 | Present | Present Invention |
| 38 | 35 | <u>37</u> | 28 | Present | Comparative Example |
| 39 | 41 | 78 | 25 | Present | Present Invention |

* Underlined values are outside the range of the present invention

TABLE 19

| | Surface layer structure | | | | |
|---|---|---|---|---|---|
| Experimental Example | Soft layer thickness μm | Proportion of ferrite having aspect ratio of 3.0 or more % | Residual γ in soft layer/residual γ of steel sheet inside % | Internal oxide peak | Note |
| 40 | 33 | 79 | 23 | Present | Present Invention |
| 41 | 33 | 85 | 28 | Present | Present Invention |
| 42 | 16 | 80 | 45 | Present | Present Invention |
| 43 | 41 | 60 | 0 | Present | Comparative Example |
| 44 | 35 | 84 | 30 | Present | Present Invention |
| 45 | 30 | 81 | 25 | Present | Present Invention |
| 46 | 31 | 78 | 25 | Present | Present Invention |
| 47 | 33 | <u>26</u> | 18 | Present | Comparative Example |
| 48 | <u>0</u> | — | — | Absent | Comparative Example |
| 49 | 34 | 82 | 27 | Present | Present Invention |
| 50 | 26 | 90 | 7 | Present | Present Invention |
| 51 | <u>0</u> | — | — | Absent | Comparative Example |
| 52 | 19 | 86 | 4 | Present | Present Invention |
| 53 | 21 | 80 | 15 | Present | Present Invention |
| 54 | 20 | 85 | 23 | Present | Present Invention |
| 55 | 30 | 70 | 0 | Present | Present Invention |
| 56 | 18 | 81 | 0 | Present | Present Invention |
| 57 | 30 | 80 | 18 | Present | Present Invention |
| 58 | 25 | 74 | 14 | Present | Present Invention |
| 59 | 28 | 70 | 18 | Present | Present Invention |
| 60 | 26 | 85 | 18 | Present | Present Invention |
| 61 | 29 | 70 | 16 | Present | Present Invention |
| 62 | 34 | 78 | 15 | Present | Present Invention |
| 63 | 26 | 88 | 26 | Present | Present Invention |
| 64 | 25 | 81 | 0 | Present | Comparative Example |
| 65 | <u>112</u> | 76 | 5 | Present | Comparative Example |
| 66 | 40 | 59 | 11 | Present | Present Invention |
| 67 | 31 | 85 | 23 | Present | Present Invention |
| 68 | 32 | 82 | 18 | Present | Present Invention |
| 69 | 29 | 75 | 21 | Present | Present Invention |
| 70 | 22 | 68 | 31 | Present | Present Invention |
| 71 | 10 | 56 | 0 | Present | Comparative Example |
| 72 | 25 | 64 | 25 | Present | Comparative Example |
| 73 | 17 | <u>30</u> | 0 | Present | Comparative Example |
| 74 | 45 | <u>75</u> | 30 | Present | Comparative Example |
| 75 | 21 | 56 | 18 | Present | Comparative Example |
| 76 | 30 | 85 | 21 | Present | Present Invention |
| 77 | 13 | 80 | 20 | Present | Present Invention |
| 78 | 44 | 66 | 11 | Present | Present Invention |

* Underlined values are outside the range of the present invention

TABLE 20

| Experimental Example | Soft layer thickness μm | Surface layer structure Proportion of ferrite having aspect ratio of 3.0 or more % | Residual γ in soft layer/residual γ of steel sheet inside % | Internal oxide peak | Note |
|---|---|---|---|---|---|
| 1' | 31 | 82 | 28 | Present | Present Invention |
| 2' | 36 | <u>45</u> | 19 | Present | Comparative Example |
| 3' | 33 | 89 | 24 | Present | Present Invention |
| 4' | 30 | 66 | 27 | Present | Present Invention |
| 5' | 35 | 60 | 25 | Present | Comparative Example |
| 6' | 39 | <u>24</u> | 15 | Present | Comparative Example |
| 7' | 32 | 55 | 30 | Present | Present Invention |
| 8' | 33 | <u>39</u> | 20 | Present | Comparative Example |
| 9' | <u>0</u> | — | — | Absent | Comparative Example |
| 10' | 14 | 77 | <u>74</u> | Present | Present Invention |
| 11' | 26 | 81 | 33 | Present | Present Invention |
| 12' | 40 | 77 | 28 | Present | Present Invention |
| 13' | 20 | 90 | 44 | Present | Present Invention |
| 14' | 43 | 65 | 13 | Present | Present Invention |
| 15' | 32 | <u>36</u> | 25 | Present | Comparative Example |
| 16' | 38 | 86 | 23 | Present | Present Invention |
| 17' | 39 | 75 | 30 | Present | Present Invention |
| 18' | 53 | 85 | 22 | Present | Present Invention |
| 19' | 50 | 80 | 24 | Present | Present Invention |
| 20' | 34 | <u>31</u> | <u>83</u> | Present | Comparative Example |
| 21' | 58 | <u>27</u> | 14 | Present | Comparative Example |
| 22' | <u>0</u> | — | — | Absent | Comparative Example |
| 23' | 51 | 85 | 29 | Present | Present Invention |
| 24' | 53 | 82 | 28 | Present | Present Invention |
| 25' | <u>0</u> | — | — | Absent | Comparative Example |
| 26' | 55 | 83 | 33 | Present | Present Invention |
| 27' | 18 | 54 | 17 | Present | Present Invention |
| 28' | 16 | 61 | 15 | Present | Present Invention |
| 29' | 12 | <u>30</u> | <u>82</u> | Present | Comparative Example |
| 30' | <u>0</u> | — | — | Absent | Comparative Example |
| 31' | 22 | <u>34</u> | 19 | Present | Comparative Example |
| 32' | 18 | 56 | 20 | Present | Present Invention |
| 33' | 17 | 59 | 20 | Present | Present Invention |
| 34' | 20 | <u>35</u> | 22 | Present | Comparative Example |
| 35' | 26 | 71 | 22 | Present | Present Invention |
| 36' | 31 | 75 | 25 | Present | Present Invention |
| 37' | 25 | 85 | 12 | Present | Present Invention |
| 38' | 25 | 78 | 9 | Present | Present Invention |
| 39' | 36 | 69 | 18 | Present | Present Invention |
| 40' | 39 | 73 | 23 | Present | Comparative Example |
| 41' | 43 | 77 | 12 | Present | Present Invention |
| 42' | 37 | 87 | 10 | Present | Present Invention |
| 43' | 40 | <u>35</u> | 24 | Present | Comparative Example |

* Underlined values are outside the range of the present invention

TABLE 21

| Experimental Example | Soft layer thickness μm | Surface layer structure Proportion of ferrite having aspect ratio of 3.0 or more % | Residual γ in soft layer/residual γ of steel sheet inside % | Internal oxide peak | Note |
|---|---|---|---|---|---|
| 44' | 44 | 80 | 22 | Present | Present Invention |
| 45' | 33 | 79 | 25 | Present | Present Invention |
| 46' | 37 | 85 | 28 | Present | Present Invention |
| 47' | 21 | 83 | 44 | Present | Present Invention |
| 48' | 41 | 63 | 0 | Present | Comparative Example |
| 49' | 35 | 89 | 32 | Present | Present Invention |
| 50' | 35 | 82 | 24 | Present | Present Invention |
| 51' | 32 | 78 | 24 | Present | Present Invention |
| 52' | 34 | <u>31</u> | 16 | Present | Comparative Example |
| 53' | <u>0</u> | — | — | Absent | Comparative Example |
| 54' | 34 | 81 | 25 | Present | Present Invention |
| 55' | 29 | 88 | 8 | Present | Present Invention |
| 56' | <u>0</u> | — | — | Absent | Comparative Example |
| 57' | 21 | 82 | 6 | Present | Present Invention |
| 58' | 26 | 83 | 14 | Present | Present Invention |
| 59' | 20 | 81 | 24 | Present | Present Invention |

TABLE 21-continued

| | | Surface layer structure | | | |
|---|---|---|---|---|---|
| Experimental Example | Soft layer thickness μm | Proportion of ferrite having aspect ratio of 3.0 or more % | Residual γ in soft layer/residual γ of steel sheet inside % | Internal oxide peak | Note |
| 60' | 32 | 69 | 0 | Present | Present Invention |
| 61' | 21 | 80 | 0 | Present | Present Invention |
| 62' | 30 | 83 | 20 | Present | Present Invention |
| 63' | 30 | 70 | 13 | Present | Present Invention |
| 64' | 33 | 73 | 19 | Present | Present Invention |
| 65' | 27 | 87 | 18 | Present | Present Invention |
| 66' | 31 | 66 | 15 | Present | Present Invention |
| 67' | 35 | 75 | 17 | Present | Present Invention |
| 68' | 28 | 84 | 27 | Present | Present Invention |
| 69' | 31 | 82 | 0 | Present | Comparative Example |
| 70' | <u>115</u> | 72 | 4 | Present | Comparative Example |
| 71' | 40 | 60 | 12 | Present | Present Invention |
| 72' | 33 | 86 | 24 | Present | Present Invention |
| 73' | 35 | 84 | 20 | Present | Present Invention |
| 74' | 33 | 75 | 21 | Present | Present Invention |
| 75' | 22 | 64 | 32 | Present | Present Invention |
| 76' | 9 | 55 | 0 | Present | Comparative Example |
| 77' | 24 | 66 | 23 | Present | Comparative Example |
| 78' | 18 | <u>31</u> | 0 | Present | Comparative Example |
| 79' | 45 | 75 | 32 | Present | Comparative Example |
| 80' | 22 | 58 | 15 | Present | Comparative Example |
| 81' | 37 | 89 | 20 | Present | Present Invention |
| 82' | 36 | 84 | 31 | Present | Present Invention |
| 83' | 42 | 84 | 28 | Present | Present Invention |
| 84' | 40 | 84 | 24 | Present | Present Invention |
| 85' | 36 | 86 | 23 | Present | Present Invention |
| 86' | 37 | 83 | 27 | Present | Present Invention |
| 87' | 44 | 91 | 21 | Present | Present Invention |
| 88' | 49 | 85 | 24 | Present | Present Invention |
| 89' | 35 | 77 | 29 | Present | Present Invention |

* Underlined values are outside the range of the present invention

For the steel sheets of Experimental Examples Nos. 1 to 78 and Experimental Examples Nos. 1' to 89', the maximum tensile stress (TS), elongation (El), hole expansibility (hole expansion ratio), hydrogen embrittlement resistance of a bent portion, chemical convertibility, and plating adhesion were examined. The results are shown in Tables 22 to 25.

A JIS No. 5 tensile test piece was taken so that the direction perpendicular to the rolling direction was the tensile direction, the maximum tensile stress and elongation were measured according to JIS Z 2241, and the hole expansibility was measured according to JIS Z 2256. Those having a maximum tensile stress of 700 MPa or more were evaluated as good.

In addition, in order to evaluate the balance between strength, elongation, and hole expansibility, a value represented by Expression (11) was calculated using the results of the maximum tensile stress (TS), elongation (El), and hole expansibility (hole expansion ratio) measured by the above-described methods. The larger the value represented by Expression (11), the better the balance between strength, elongation, and hole expansibility. Those having a value of Expression (11) of $80 \times 10^{-7}$ or more were evaluated as good.

$$TS^2 \times El \times \lambda \quad (11)$$

(in Expression (11), TS represents the maximum tensile stress (MPa), El represents the elongation (%), and λ represents the hole expansibility (%))

The results are shown in Tables 22 to 25.

The hydrogen embrittlement resistance of the bent portion was evaluated by the following method.

First, a strip-shaped test piece of 30 mm×120 mm was taken from a steel sheet so that the longitudinal direction of the test piece and the rolling direction of the steel sheet were perpendicular to each other, and both ends of the test piece were drilled for bolt fastening. Next, the test piece was bent by 180° with a punch having a radius of 5 mm. Thereafter, the U-bending test piece after springback was fastened with a bolt and a nut to apply stress. At this time, a GL-5 mm strain gauge was attached to the top portion of the U-bending test piece, and a stress of 0.8 times the tensile strength was applied by controlling the amount of strain. At that time, the stress was set by converting the strain into a stress from a stress-strain curve obtained in advance by a tensile test. The end surface of the U-bending test piece was subjected to shear-cut.

The U-bending test piece after the stress was applied was continuously subjected to cathodic hydrogen charging using an electrochemical cell until the test piece fractured. An electrolyte used was a 3% NaCl aqueous solution to which 3 g/L of ammonium thiocyanate was added, and a charge current density was $-0.05$ mA/cm$^2$. The test piece after fracture was immediately stored in liquid nitrogen, and the amount of hydrogen in the steel was measured by a temperature-programmed hydrogen analysis method (temperature rising rate: 100° C./hour, measured up to 300° C.) using a gas chromatograph. The amount of hydrogen released from the steel material from room temperature to 200° C. was determined as the amount of diffusible hydrogen.

The same test was performed 3 times, and the average value was defined as the limit diffusion hydrogen amount. For materials having a tensile strength of 1100 MPa or less, those with a limit diffusion hydrogen amount of 1.0 ppm or more were determined as "Ex", those with 0.6 to 1.0 ppm as "G", and those with less than 0.6 ppm as "B". For materials with a tensile strength of more than 1100 MPa and less than 1350 MPa, those with a limit diffusion hydrogen amount of 0.8 ppm or more were determined as "Ex", those with 0.5 to 0.8 ppm as "G", and those with less than 0.5 ppm as "B". For materials with a tensile strength of more than 1350 MPa, those with a limit diffusion hydrogen amount of 0.6 ppm or more were determined as "Ex", those with 0.3 to 0.6 ppm as "G", and those with less than 0.3 ppm as "B".

In addition, for the steel sheets of Experimental Examples Nos. 1 to 78 excluding Nos. 54 and 69, chemical convertibility was measured by the following method.

The steel sheet was cut into 70 mm×150 mm, and an 18 g/l aqueous solution of a degreasing agent (trade name: FINECLEANER E2083) manufactured by Nihon Parkerizing Co., Ltd. was sprayed and applied thereto at 40° C. for 120 seconds. Next, the steel sheet to which the degreasing agent was applied was washed with water to be degreased, and immersed in a 0.5 g/l aqueous solution of a surface conditioner (trade name: PREPALENE XG) manufactured by Nippon Parkerizing Co., Ltd. at room temperature for 60 seconds. Thereafter, the steel sheet to which the surface conditioner was applied was immersed in a zinc phosphate treatment agent (trade name: PALBOND L3065) manufactured by Nippon Parkerizing Co., Ltd. for 120 seconds, washed with water, and dried. As a result, a chemical conversion film formed of the zinc phosphate coating was formed on the surface of the steel sheet.

A test piece having a width of 70 μmm and a length of 150 mm was taken from the steel sheet on which the chemical conversion film was formed. Thereafter, three locations (center portion and both end portions) along the length direction of the test piece were observed with a scanning electron microscope (SEM) at a magnification of 1,000 folds. For each test piece, the degree of adhesion of grains of the chemical conversion film was evaluated according to the following criteria.

"Ex" Zinc phosphate crystals of the chemical conversion film are densely attached to the surface.

"G" Zinc phosphate crystals are sparse, and there is a slight gap between adjacent crystals (a portion commonly referred to as "lack of hiding" where the zinc phosphate coating is not attached).

"B" Points that are not coated with the chemical conversion coating are clearly seen on the surface.

"EG", "GI", and "GA" described regarding the surface in Tables 21 to 25 respectively indicate an electrogalvanized steel sheet, a hot-dip galvanized steel sheet, and a hot-dip galvannealed steel sheet.

In addition, for the steel sheets of Experimental Examples Nos. 54, 69, and 1' to 89', the plating adhesion was measured by the method described below.

A 30 mm×100 mm test piece was taken from these steel sheets and subjected to a 90° V bending test. Thereafter, a commercially available sellotape (registered trademark) was attached along the bend ridge, and the width of the plating attached to the tape was measured as the peeling width. The evaluation was performed as follows.

Ex: Small plating peeling (peeling width less than 5 mm)

G: Peeling to the extent that there is no practical problem (peeling width of 5 mm or more and less than 10 mm)

B: Peeling is severe (peeling width 10 mm or more)

The plating adhesion grades Ex and G were determined to be acceptable.

The evaluation results for each experimental example will be described below.

TABLE 22

| Experimental Example | Plating | TS MPa | El % | TS · EL/ 1000 MPa · %/ 1000 | Hole expansion ratio % | $TS^2*El*\lambda*10^{-7}$ | Hydrogen embrittlement resistance of bent portion | Chemical convertibility | Plating adhesion | Note |
|---|---|---|---|---|---|---|---|---|---|---|
| 1 |  | 1012 | 29.8 | 30.1 | 53 | 161 | Ex | Ex | — | Present Invention |
| 2 |  | 985 | 31.7 | 31.2 | 15 | 46 | B | Ex | — | Comparative Example |
| 3 |  | 1016 | 28.5 | 29.0 | 48 | 141 | Ex | G | — | Present Invention |
| 4 |  | 1062 | 28.8 | 30.6 | 35 | 113 | Ex | Ex | — | Present Invention |
| 5 |  | 1038 | 28.2 | 29.3 | 25 | 76 | Ex | Ex | — | Comparative Example |
| 6 |  | 1056 | 28.1 | 29.6 | 50 | 156 | B | Ex | — | Comparative Example |
| 7 |  | 968 | 29.7 | 28.8 | 39 | 108 | G | Ex | — | Present Invention |
| 8 |  | 908 | 33.6 | 30.5 | 28 | 77 | B | Ex | — | Comparative Example |
| 9 |  | 1045 | 27.9 | 29.1 | 48 | 145 | B | B | — | Comparative Example |
| 10 |  | 1005 | 28.2 | 28.4 | 48 | 136 | G | G | — | Present Invention |
| 11 |  | 943 | 32.2 | 30.4 | 16 | 46 | B | Ex | — | Comparative Example |
| 12 |  | 1022 | 28.3 | 28.9 | 50 | 148 | Ex | Ex | — | Present Invention |
| 13 |  | 1196 | 22.3 | 26.7 | 46 | 149 | Ex | Ex | — | Present Invention |
| 14 |  | 1194 | 22.0 | 26.3 | 50 | 155 | Ex | Ex | — | Present Invention |
| 15 |  | 1243 | 21.7 | 26.9 | 43 | 145 | B | Ex | — | Comparative Example |
| 16 |  | 1220 | 22.7 | 27.7 | 46 | 156 | B | Ex | — | Comparative Example |
| 17 |  | 1231 | 20.7 | 25.5 | 22 | 70 | B | Ex | — | Comparative Example |
| 18 |  | 1513 | 21.5 | 32.5 | 28 | 139 | Ex | Ex | — | Present Invention |
| 19 |  | 1607 | 19.6 | 31.5 | 16 | 81 | Ex | Ex | — | Present Invention |
| 20 |  | 1550 | 21.7 | 33.7 | 30 | 156 | B | B | — | Comparative Example |
| 21 |  | 1490 | 21.9 | 32.7 | 31 | 152 | Ex | Ex | — | Present Invention |
| 22 |  | 723 | 37.0 | 26.7 | 52 | 100 | Ex | Ex | — | Present Invention |
| 23 |  | 817 | 32.5 | 26.5 | 54 | 117 | Ex | Ex | — | Present Invention |
| 24 |  | 832 | 31.8 | 26.4 | 54 | 118 | B | Ex | — | Comparative Example |
| 25 |  | 847 | 31.6 | 26.3 | 53 | 119 | B | B | — | Comparative Example |
| 26 |  | 1133 | 9.8 | 11.1 | 39 | 49 | B | Ex | — | Comparative Example |
| 27 |  | 736 | 32.1 | 23.6 | 54 | 95 | Ex | Ex | — | Present Invention |
| 28 |  | 775 | 30.1 | 23.3 | 60 | 109 | Ex | Ex | — | Present Invention |
| 29 |  | 879 | 20.1 | 17.6 | 50 | 78 | B | Ex | — | Comparative Example |
| 30 |  | 963 | 28.0 | 26.9 | 50 | 130 | Ex | Ex | — | Present Invention |
| 31 |  | 934 | 28.2 | 26.3 | 49 | 122 | Ex | Ex | — | Present Invention |
| 32 |  | 911 | 27.6 | 25.2 | 49 | 113 | Ex | Ex | — | Present Invention |
| 33 |  | 915 | 27.8 | 25.4 | 54 | 126 | Ex | Ex | — | Present Invention |

TABLE 22-continued

| Experimental Example | Plating | TS MPa | El % | TS · EL/1000 MPa · %/1000 | Hole expansion ratio % | $TS^2 \cdot El \cdot \lambda \cdot 10^{-7}$ | Hydrogen embrittlement resistance of bent portion | Chemical convertibility | Plating adhesion | Note |
|---|---|---|---|---|---|---|---|---|---|---|
| 34 | | 1187 | 27.2 | 32.2 | 42 | 159 | Ex | Ex | — | Present Invention |
| 35 | | 1560 | 23.0 | 35.9 | 8 | 45 | B | Ex | — | Comparative Example |
| 36 | | 1357 | 25.1 | 34.1 | 24 | 113 | Ex | Ex | — | Present Invention |
| 37 | | 1169 | 27.2 | 31.8 | 38 | 142 | Ex | Ex | — | Present Invention |
| 38 | | 1368 | 21.8 | 29.8 | 9 | 37 | B | Ex | — | Comparative Example |
| 39 | | 1312 | 26.4 | 34.6 | 22 | 98 | Ex | Ex | — | Present Invention |

TABLE 23

| Experimental Example | Plating | TS MPa | El % | TS · EL/1000 MPa · %/1000 | Hole expansion ratio % | $TS^2 \cdot El \cdot \lambda \cdot 10^{-7}$ | Hydrogen embrittlement resistance of bent portion | Chemical convertibility | Plating adhesion | Note |
|---|---|---|---|---|---|---|---|---|---|---|
| 40 | | 1020 | 27.6 | 28.2 | 45 | 130 | Ex | Ex | — | Present Invention |
| 41 | | 1010 | 27.2 | 27.4 | 38 | 106 | Ex | Ex | — | Present Invention |
| 42 | | 1029 | 23.5 | 24.2 | 38 | 95 | Ex | Ex | — | Present Invention |
| 43 | | 918 | 22.9 | 21.0 | 32 | 61 | Ex | Ex | — | Comparative Example |
| 44 | | 991 | 26.1 | 25.8 | 50 | 128 | Ex | Ex | — | Present Invention |
| 45 | | 1004 | 26.3 | 26.4 | 44 | 117 | Ex | Ex | — | Present Invention |
| 46 | | 939 | 29.1 | 27.3 | 42 | 109 | Ex | Ex | — | Present Invention |
| 47 | | 1097 | 25.6 | 28.1 | 23 | 71 | B | Ex | — | Comparative Example |
| 48 | | 1130 | 26.3 | 29.8 | 22 | 73 | B | B | — | Comparative Example |
| 49 | | 1027 | 28.1 | 28.9 | 40 | 120 | Ex | Ex | — | Present Invention |
| 50 | | 969 | 27.9 | 27.0 | 52 | 137 | Ex | Ex | — | Present Invention |
| 51 | | 1018 | 27.9 | 28.4 | 48 | 137 | B | B | — | Comparative Example |
| 52 | | 919 | 30.1 | 27.7 | 38 | 98 | Ex | Ex | — | Present Invention |
| 53 | | 1041 | 23.2 | 24.2 | 39 | 99 | Ex | Ex | — | Present Invention |
| 54 | EG | 894 | 28.3 | 25.3 | 56 | 128 | Ex | — | Ex | Present Invention |
| 55 | | 1065 | 15.2 | 16.1 | 63 | 108 | Ex | Ex | — | Present Invention |
| 56 | | 826 | 28.4 | 23.5 | 54 | 105 | Ex | Ex | — | Present Invention |
| 57 | | 945 | 27.5 | 25.9 | 54 | 133 | Ex | Ex | — | Present Invention |
| 58 | | 1010 | 27.9 | 28.2 | 40 | 114 | Ex | Ex | — | Present Invention |
| 59 | | 1218 | 24.6 | 30.0 | 41 | 148 | Ex | Ex | — | Present Invention |
| 60 | | 1045 | 26.6 | 27.8 | 53 | 153 | Ex | Ex | — | Present Invention |
| 61 | | 1055 | 27.3 | 28.8 | 49 | 147 | Ex | Ex | — | Present Invention |
| 62 | | 974 | 22.0 | 21.5 | 49 | 102 | Ex | Ex | — | Present Invention |
| 63 | | 1082 | 27.3 | 29.5 | 51 | 162 | Ex | Ex | — | Present Invention |
| 64 | | 875 | 19.2 | 16.8 | 46 | 68 | B | Ex | — | Comparative Example |
| 65 | | 691 | 31.7 | 21.9 | 54 | 81 | Ex | Ex | — | Comparative Example |
| 66 | | 1092 | 27.2 | 29.7 | 45 | 145 | Ex | G | — | Present Invention |
| 67 | | 1095 | 27.5 | 30.1 | 37 | 121 | Ex | Ex | — | Present Invention |
| 68 | | 1167 | 22.1 | 25.8 | 33 | 99 | Ex | Ex | — | Present Invention |
| 69 | EG | 1077 | 28.5 | 30.6 | 49 | 160 | Ex | — | Ex | Present Invention |
| 70 | | 1014 | 28.0 | 28.4 | 47 | 136 | Ex | Ex | — | Present Invention |
| 71 | | 611 | 38.4 | 23.5 | 50 | 72 | Ex | Ex | — | Comparative Example |
| 72 | | 912 | 26.1 | 23.8 | 17 | 37 | Ex | Ex | — | Comparative Example |
| 73 | | 648 | 33.2 | 21.5 | 85 | 118 | Ex | Ex | — | Comparative Example |
| 74 | | 1198 | 21.5 | 25.7 | 6 | 18 | B | Ex | — | Comparative Example |
| 75 | | 1461 | 9.5 | 13.8 | 4 | 8 | B | Ex | — | Comparative Example |
| 76 | | 1046 | 26.5 | 27.7 | 53 | 154 | Ex | Ex | — | Present Invention |
| 77 | | 1010 | 27.5 | 27.8 | 52 | 146 | Ex | Ex | — | Present Invention |
| 78 | | 981 | 27.7 | 27.2 | 38 | 101 | Ex | Ex | — | Present Invention |

TABLE 24

| Experimental Example | Plating | TS MPa | El % | TS · EL/1000 MPa · %/1000 | Hole expansion ratio % | $TS^2 \cdot El \cdot \lambda \cdot 10^{-7}$ | Hydrogen embrittlement resistance of bent portion | Chemical convertibility | Plating adhesion | Note |
|---|---|---|---|---|---|---|---|---|---|---|
| 1' | GA | 1018 | 27.3 | 27.8 | 50 | 141 | Ex | — | Ex | Present Invention |
| 2' | GA | 1033 | 29.4 | 30.3 | 13 | 41 | B | — | Ex | Comparative Example |
| 3' | GA | 998 | 34.3 | 34.2 | 61 | 208 | Ex | — | G | Present Invention |
| 4' | GA | 1032 | 28.3 | 29.2 | 32 | 97 | Ex | — | Ex | Present Invention |
| 5' | GA | 1040 | 27.4 | 28.5 | 24 | 72 | Ex | — | Ex | Comparative Example |
| 6' | GA | 1019 | 28.3 | 28.8 | 45 | 132 | B | — | Ex | Comparative Example |
| 7' | GA | 949 | 29.6 | 28.1 | 38 | 103 | Ex | — | Ex | Present Invention |
| 8' | GA | 877 | 32.9 | 28.8 | 27 | 69 | B | — | Ex | Comparative Example |
| 9' | GA | 1032 | 25.8 | 26.6 | 48 | 131 | B | — | B | Comparative Example |

TABLE 24-continued

| Experimental Example | Plating | TS MPa | El % | TS·EL/1000 MPa·%/1000 | Hole expansion ratio % | $TS^2 \cdot El \cdot \lambda \cdot 10^{-7}$ | Hydrogen embrittlement resistance of bent portion | Chemical convertibility | Plating adhesion | Note |
|---|---|---|---|---|---|---|---|---|---|---|
| 10' | GA | 1049 | 26.4 | 27.7 | 48 | 141 | G | — | G | Present Invention |
| 11' | GA | 1040 | 25.2 | 26.2 | 53 | 143 | Ex | — | Ex | Present Invention |
| 12' | GA | 1040 | 28.3 | 29.4 | 48 | 145 | Ex | — | G | Present Invention |
| 13' | GA | 1083 | 28.9 | 31.3 | 49 | 166 | Ex | — | Ex | Present Invention |
| 14' | GA | 952 | 32.2 | 30.7 | 37 | 108 | Ex | — | Ex | Present Invention |
| 15' | GA | 965 | 32.3 | 31.2 | 14 | 43 | B | — | Ex | Comparative Example |
| 16' | GA | 1036 | 27.3 | 28.3 | 44 | 129 | Ex | — | Ex | Present Invention |
| 17' | GI | 1018 | 29.1 | 29.7 | 53 | 159 | Ex | — | Ex | Present Invention |
| 18' | GA | 1210 | 21.1 | 25.5 | 42 | 130 | Ex | — | Ex | Present Invention |
| 19' | GA | 1238 | 20.9 | 25.9 | 52 | 167 | Ex | — | Ex | Present Invention |
| 20' | GA | 1252 | 22.3 | 27.9 | 42 | 148 | B | — | Ex | Comparative Example |
| 21' | GA | 1221 | 23.9 | 29.2 | 48 | 172 | B | — | Ex | Comparative Example |
| 22' | GA | 1184 | 20.5 | 24.2 | 20 | 58 | B | — | B | Comparative Example |
| 23' | GA | 1569 | 20.7 | 32.5 | 26 | 133 | Ex | — | Ex | Present Invention |
| 24' | GA | 1533 | 20.2 | 31.0 | 18 | 86 | Ex | — | Ex | Present Invention |
| 25' | GA | 1495 | 20.2 | 30.2 | 27 | 122 | B | — | B | Comparative Example |
| 26' | GA | 1453 | 22.2 | 32.3 | 26 | 122 | Ex | — | Ex | Present Invention |
| 27' | GA | 716 | 39.0 | 27.9 | 47 | 94 | Ex | — | Ex | Present Invention |
| 28' | GA | 824 | 31.7 | 26.1 | 57 | 124 | Ex | — | Ex | Present Invention |
| 29' | GA | 833 | 30.9 | 25.7 | 54 | 115 | B | — | Ex | Comparative Example |
| 30' | GA | 838 | 29.8 | 25.0 | 52 | 109 | B | — | B | Comparative Example |
| 31' | GA | 1113 | 12.8 | 14.2 | 40 | 64 | B | — | Ex | Comparative Example |
| 32' | GA | 771 | 33.3 | 25.7 | 56 | 111 | Ex | — | Ex | Present Invention |
| 33' | GA | 749 | 29.4 | 22.0 | 66 | 109 | Ex | — | Ex | Present Invention |
| 34' | GA | 868 | 20.2 | 17.6 | 49 | 75 | B | — | Ex | Comparative Example |
| 35' | GA | 935 | 29.1 | 27.2 | 50 | 126 | Ex | — | Ex | Present Invention |
| 36' | GA | 948 | 27.4 | 26.0 | 47 | 117 | Ex | — | Ex | Present Invention |
| 37' | GA | 861 | 29.1 | 25.0 | 52 | 112 | Ex | — | Ex | Present Invention |
| 38' | GA | 870 | 28.2 | 24.5 | 53 | 114 | Ex | — | Ex | Present Invention |
| 39' | GA | 1211 | 26.1 | 31.6 | 39 | 151 | Ex | — | Ex | Present Invention |
| 40' | GA | 1568 | 23.0 | 36.1 | 13 | 74 | Ex | — | Ex | Comparative Example |
| 41' | GA | 1305 | 25.1 | 32.7 | 26 | 111 | Ex | — | Ex | Present Invention |
| 42' | GA | 1100 | 28.0 | 30.8 | 37 | 127 | Ex | — | Ex | Present Invention |
| 43' | GA | 1316 | 22.1 | 29.0 | 18 | 69 | Ex | — | Ex | Comparative Example |

TABLE 25

| Experimental Example | Plating | TS MPa | El % | TS·EL/1000 MPa·%/1000 | Hole expansion ratio % | $TS^2 \cdot El \cdot \lambda \cdot 10^{-7}$ | Hydrogen embrittlement resistance of bent portion | Chemical convertibility | Plating adhesion | Note |
|---|---|---|---|---|---|---|---|---|---|---|
| 44' | GA | 1340 | 25.7 | 34.4 | 23 | 106 | Ex | — | Ex | Present Invention |
| 45' | GA | 1069 | 28.9 | 30.9 | 47 | 154 | Ex | — | Ex | Present Invention |
| 46' | GA | 1022 | 27.4 | 28.0 | 41 | 116 | Ex | — | Ex | Present Invention |
| 47' | GA | 1003 | 23.4 | 23.5 | 37 | 86 | Ex | — | Ex | Present Invention |
| 48' | GA | 923 | 22.1 | 20.4 | 35 | 65 | Ex | — | Ex | Comparative Example |
| 49' | GA | 1051 | 24.6 | 25.8 | 50 | 136 | Ex | — | Ex | Present Invention |
| 50' | GA | 968 | 27.2 | 26.4 | 42 | 107 | Ex | — | Ex | Present Invention |
| 51' | GA | 880 | 29.1 | 25.6 | 42 | 94 | Ex | — | Ex | Present Invention |
| 52' | GA | 1148 | 25.7 | 29.5 | 17 | 58 | B | — | Ex | Comparative Example |
| 53' | GA | 1085 | 25.7 | 27.8 | 19 | 57 | B | — | B | Comparative Example |
| 54' | GA | 1094 | 28.8 | 31.5 | 32 | 110 | Ex | — | Ex | Present Invention |
| 55' | GA | 918 | 27.0 | 24.8 | 45 | 103 | Ex | — | Ex | Present Invention |
| 56' | GA | 1049 | 25.8 | 27.1 | 54 | 153 | B | — | B | Comparative Example |
| 57' | GA | 943 | 30.0 | 28.2 | 39 | 103 | Ex | — | Ex | Present Invention |
| 58' | GA | 1075 | 22.9 | 24.7 | 41 | 108 | Ex | — | Ex | Present Invention |
| 59' | GI | 885 | 27.1 | 24.0 | 59 | 124 | Ex | — | Ex | Present Invention |
| 60' | GA | 1051 | 16.0 | 16.8 | 57 | 100 | Ex | — | Ex | Present Invention |
| 61' | GA | 824 | 29.9 | 24.6 | 48 | 97 | Ex | — | Ex | Present Invention |
| 62' | GA | 977 | 27.8 | 27.1 | 56 | 150 | Ex | — | Ex | Present Invention |
| 63' | GA | 1020 | 28.7 | 29.2 | 37 | 111 | Ex | — | Ex | Present Invention |
| 64' | GA | 1258 | 25.7 | 32.3 | 43 | 173 | Ex | — | Ex | Present Invention |
| 65' | GA | 1016 | 28.7 | 29.2 | 57 | 169 | Ex | — | Ex | Present Invention |
| 66' | GA | 1028 | 27.7 | 28.5 | 51 | 149 | Ex | — | Ex | Present Invention |
| 67' | GA | 980 | 22.4 | 21.9 | 40 | 86 | Ex | — | Ex | Present Invention |
| 68' | GA | 1116 | 27.3 | 30.4 | 44 | 148 | Ex | — | Ex | Present Invention |
| 69' | GA | 914 | 18.8 | 17.2 | 44 | 69 | Ex | — | Ex | Comparative Example |
| 70' | GA | 684 | 34.1 | 23.3 | 55 | 87 | Ex | — | Ex | Comparative Example |
| 71' | GA | 1056 | 28.6 | 30.2 | 44 | 140 | Ex | — | G | Present Invention |
| 72' | GA | 1075 | 27.5 | 29.5 | 42 | 132 | Ex | — | Ex | Present Invention |
| 73' | GA | 1130 | 22.5 | 25.4 | 33 | 96 | Ex | — | Ex | Present Invention |

TABLE 25-continued

| Experimental Example | Plating | TS MPa | El % | TS · EL/ 1000 MPa · %/ 1000 | Hole expansion ratio % | $TS^2 \cdot El \cdot \lambda \cdot 10^{-7}$ | Hydrogen embrittlement resistance of bent portion | Chemical convertibility | Plating adhesion | Note |
|---|---|---|---|---|---|---|---|---|---|---|
| 74' | GI | 1074 | 27.8 | 29.9 | 46 | 148 | Ex | — | Ex | Present Invention |
| 75' | GA | 1017 | 29.3 | 29.8 | 46 | 139 | Ex | — | Ex | Present Invention |
| 76' | GA | 628 | 37.0 | 23.2 | 51 | 75 | Ex | — | Ex | Comparative Example |
| 77' | GA | 868 | 24.8 | 21.6 | 16 | 31 | Ex | — | Ex | Comparative Example |
| 78' | GA | 656 | 32.8 | 21.5 | 82 | 116 | Ex | — | Ex | Comparative Example |
| 79' | GA | 1229 | 20.8 | 25.5 | 3 | 9 | B | — | Ex | Comparative Example |
| 80' | GA | 1534 | 9.1 | 13.9 | 8 | 16 | B | — | Ex | Comparative Example |
| 81' | GA | 1038 | 29.7 | 30.8 | 48 | 154 | Ex | — | Ex | Present Invention |
| 82' | GA | 1055 | 26.9 | 28.4 | 57 | 171 | Ex | — | Ex | Present Invention |
| 83' | GA | 1054 | 29.1 | 30.7 | 51 | 165 | Ex | — | Ex | Present Invention |
| 84' | GA | 1124 | 22.3 | 25.1 | 44 | 124 | Ex | — | Ex | Present Invention |
| 85' | GA | 1026 | 27.7 | 28.4 | 58 | 169 | Ex | — | Ex | Present Invention |
| 86' | GI | 1018 | 29.6 | 30.1 | 51 | 156 | Ex | — | Ex | Present Invention |
| 87' | GA | 1263 | 21.8 | 27.5 | 45 | 156 | Ex | — | Ex | Present Invention |
| 88' | GA | 1609 | 19.7 | 31.7 | 31 | 158 | Ex | — | Ex | Present Invention |
| 89' | GA | 936 | 25.6 | 24.0 | 56 | 126 | Ex | — | Ex | Present Invention |

Experimental Examples Nos. 1, 3, 4, 7, 10, 12 to 14, 18, 19, 21 to 23, 27, 28, 30 to 34, 36, 37, 39 to 42, 44 to 46, 49, 50, 52 to 63, 66 to 70, 76 to 78, 1', 3', 4', 7', 10' to 14', 16' to 19', 23', 24', 26' to 28', 32', 33', 35' to 39', 41', 42', 44' to 47', 49' to 51', 54', 55', 57' to 68', 71' to 75', and 81' to 89', which are examples of the present invention, had high strength, excellent ductility and hole expansibility, and good bendability after working, chemical convertibility, and plating adhesion.

Regarding the steel sheets of Experimental Examples Nos. 11, 17, 29, 47, and 48, since the first heat treatment was not performed and the metallographic structure did not contain hard ferrite, the balance between strength, elongation, and hole expansion ratio was poor.

In the steel sheet of Experimental Example No. 2, since the highest heating temperature in the first heat treatment was low, the amount of soft ferrite is large, and the number proportion of retained austenite having an aspect ratio of 2.0 or more is insufficient, so that the balance between strength, elongation, and hole expansion ratio was poor.

In the steel sheet of Experimental Example No. 5, since the average heating rate from 650° C. to the highest heating temperature in the first heat treatment was slow, the number proportion of retained austenite having an aspect ratio of 2.0 or more was insufficient, and the balance between strength, elongation, and hole expansion ratio was poor.

In the steel sheets of Experimental Examples Nos. 6, 15, 16, and 24, since the log($PH_2O/PH_2$) in the first heat treatment was high and a desired surface layer structure could not be obtained, the hydrogen embrittlement of the bent portion was poor.

In the steel sheet of Experimental Example No. 8, since the cooling rate in the first heat treatment was slow, the fraction of soft ferrite in the internal structure of the steel sheet was large. For this reason, the steel sheet of Experimental Example No. 8 had a poor balance between strength, elongation, and hole expansion ratio.

In the steel sheets of Experimental Examples Nos. 9, 15, 20, 25, 48, and 51, since the log($PH_2O/PH_2$) in the second heat treatment was low and a desired surface layer structure could not be obtained, the hydrogen embrittlement resistance of the bent portion was poor.

Regarding the steel sheets of Experimental Examples Nos. 9, 20, 25, 48, and 51, since there was no internal oxidation peak, the chemical convertibility was evaluated as "B".

In the steel sheet of Experimental Example No. 26, since the highest heating temperature in the second heat treatment was high, the metallographic structure did not contain hard ferrite, and furthermore, a desired surface layer structure could not be obtained. Therefore, the balance between strength, elongation, and hole expansion ratio was poor, and the hydrogen embrittlement resistance of the bent portion was poor.

In the steel sheet of Experimental Example No. 35, since the retention time at 300° C. to 480° C. in the second heat treatment was insufficient, the fraction of fresh martensite in the internal structure was large, and the balance between strength, elongation and hole expansion ratio was poor.

In the steel sheet of Experimental Example No. 38, since the cooling stop temperature in the first heat treatment was high, the number proportion of retained austenite having an aspect ratio of 2.0 or more was insufficient, and the balance between strength, elongation, and hole expansion ratio was poor.

In the steel sheet of Experimental Example No. 43, since the cooling rate in the second heat treatment was slow, the fraction of the sum of pearlite and cementite in the internal structure of the steel sheet was large, and the balance between strength, elongation, and hole expansion ratio was poor.

In the steel sheet of Experimental Example No. 64, since the highest heating temperature in the second heat treatment was low, the fraction of retained austenite in the internal structure of the steel sheet was insufficient, and the balance between strength, elongation, and hole expansion ratio was poor.

In the steel sheet of Experimental Example No. 65, since the log($PH_2O/PH_2$) in the second heat treatment was large, the thickness of the soft layer in the surface layer structure of the steel sheet was large, and the maximum tensile stress (TS) was insufficient.

In the steel sheets of Experimental Examples Nos. 71 to 75, the chemical composition was outside the range of the present invention. In the steel sheet of Experimental Example No. 71, since the C content was insufficient, the maximum tensile stress (TS) was insufficient. In the steel sheet of Experimental Example No. 72, since the Nb content was large, the bendability after working was poor. In the steel sheet of Experimental Example No. 73, since the Mn content was insufficient, the maximum tensile stress (TS) was insufficient. In the steel sheet of Experimental Example No. 74, since the Si content was large, the hole expansibility was poor. In the steel sheet of Experimental Example No. 75, since the Mn content and the P content were large, the elongation and the hole expansibility were poor.

In the steel sheets of Experimental Examples No. 15', 22', 34', 52', and 53', since the first heat treatment was not performed, the metallographic structure did not contain hard ferrite, so that the balance between strength, elongation, and hole expansion ratio was poor.

In the steel sheet of Experimental Example No. 2', since the highest heating temperature in the first heat treatment was low, the number proportion of retained austenite having an aspect ratio of 2.0 or more was insufficient, and the balance between strength, elongation, and hole expansion ratio was poor.

In the steel sheet of Experimental Example No. 5', since the average heating rate from 650° C. to the highest heating temperature in the first heat treatment was slow, the number proportion of retained austenite having an aspect ratio of 2.0 or more was insufficient, and the balance between strength, elongation, and hole expansion ratio was poor.

In the steel sheets of Experimental Examples Nos. 6', 20', 21', and 29', since the $\log(PH_2O/PH_2)$ in the first heat treatment was high and a desired surface layer structure could not be obtained, the hydrogen embrittlement of the bent portion was poor.

In the steel sheet of Experimental Example No. 8', since the cooling rate in the first heat treatment was slow, the fraction of soft ferrite was large. Therefore, the balance between strength, elongation, and hole expansion ratio was poor.

In the steel sheets of Experimental Examples Nos. 9', 20', 22', 25', 29', 30', 53', and 56', since the $\log(PH_2O/PH_2)$ in the second heat treatment was low and a desired surface layer structure could not be obtained, the hydrogen embrittlement resistance of the bent portion was poor.

Regarding the steel sheets of Experimental Examples No. 9', 22', 25', 30', 53' and 56', since no soft layer was formed in the surface layer structure of the steel sheet and there was no internal oxidation peak, the plating adhesion was evaluated as "B".

In the steel sheet of Experimental Example No. 31', since the maximum attainment temperature in the second heat treatment was high, the metallographic structure did not contain hard ferrite, and furthermore, a desired surface layer structure could not be obtained. Therefore, the balance between strength, elongation, and hole expansion ratio was poor, and the hydrogen embrittlement resistance of the bent portion was poor.

In the steel sheet of Experimental Example No. 40', since the retention time at 300° C. to 480° C. in the second heat treatment was insufficient, the fraction of fresh martensite in the internal structure was large, and the balance between strength, elongation and hole expansion ratio was poor.

In the steel sheet of Experimental Example No. 43', since the cooling stop temperature in the first heat treatment was high, the number proportion of retained austenite having an aspect ratio of 2.0 or more was insufficient, and the balance between strength, elongation, and hole expansion ratio was poor.

In the steel sheet of Experimental Example No. 48', since the cooling rate in the second heat treatment was slow, the fraction of the sum of pearlite and cementite in the internal structure of the steel sheet was large, and the balance between strength, elongation, and hole expansion ratio was poor.

In the steel sheet of Experimental Example No. 69', since the maximum attainment temperature in the second heat treatment was low, the fraction of retained austenite in the internal structure of the steel sheet was insufficient, and the balance between strength, elongation, and hole expansion ratio was poor.

In the steel sheet of Experimental Example No. 70', since the $\log(PH_2O/PH_2)$ in the second heat treatment was large, the thickness of the soft layer in the surface layer structure of the steel sheet was large, and the maximum tensile stress (TS) was insufficient.

In the steel sheets of Experimental Examples Nos. 76' to 80', the chemical composition was outside the range of the present invention. In particular, in the steel sheet of Experimental Example No. 76', since the C content was insufficient, the maximum tensile stress (TS) was insufficient. In the steel sheet of Experimental Example No. 77', since the Nb content was large, the bendability after working was poor. In the steel sheet of Experimental Example No. 78', since the Mn content was insufficient, the maximum tensile stress (TS) was insufficient. In the steel sheet of Experimental Example No. 79', since the Si content was large, the hole expansibility was poor. In the steel sheet of Experimental Example No. 80', since the Mn content and the P content were large, the elongation and the hole expansibility were poor.

While the preferred embodiments and examples of the present invention have been described above, these embodiments and examples are merely examples within the scope of the gist of the present invention, and additions, omissions, substitutions, and other changes of the configuration can be made without departing from the gist of the present invention. That is, the present invention is not limited by the above description, but is limited only by the appended claims, and can be appropriately changed within the scope.

INDUSTRIAL APPLICABILITY

According to the present invention, it is possible to provide a high strength steel sheet having excellent ductility and hole expansibility, and excellent chemical convertibility and plating adhesion, and further having good bendability after working, and a method for manufacturing the same.

Since the steel sheet of the present invention has excellent ductility and hole expansibility and has good bendability after working, the steel sheet is suitable as a steel sheet for a vehicle which is formed into various shapes by press working or the like. Moreover, since the steel sheet of the present invention is excellent in chemical convertibility and plating adhesion, the steel sheet is suitable as a steel sheet in which a chemical conversion film or a plated layer is formed on the surface.

BRIEF DESCRIPTION OF THE REFERENCE SYMBOLS

1 Steel sheet
11 ⅛ to ⅜ thickness range centered on ¼ thickness position from surface of steel sheet (steel sheet inside)
12 Soft layer

What is claimed is:

1. A steel sheet comprising, as a chemical composition, by mass %:
C: 0.050% to 0.500%;
Si: 0.01% to 3.00%;
Mn: 0.50% to 5.00%;
P: 0.0001% to 0.1000%;

S: 0.0001% to 0.0100%;
Al: 0.001% to 2.500%;
N: 0.0001% to 0.0100%;
O: 0.0001% to 0.0100%;
Ti: 0% to 0.300%;
V: 0% to 1.00%;
Nb: 0% to 0.100%;
Cr: 0% to 2.00%;
Ni: 0% to 2.00%;
Cu: 0% to 2.00%;
Co: 0% to 2.00%;
Mo: 0% to 1.00%;
W: 0% to 1.00%;
B: 0% to 0.0100%;
Sn: 0% to 1.00%;
Sb: 0% to 1.00%;
Ca: 0% to 0.0100%;
Mg: 0% to 0.0100%;
Ce: 0% to 0.0100%;
Zr: 0% to 0.0100%;
La: 0% to 0.0100%;
Hf: 0% to 0.0100%;
Bi: 0% to 0.0100%;
REM: 0% to 0.0100%; and
a remainder including Fe and impurities;
wherein a steel structure in a ⅛ to ⅜ thickness range centered on a ¼ thickness position from a surface contains, by volume fraction,
a soft ferrite: 0% to 30%,
a retained austenite: 3% to 40%,
a fresh martensite: 0% to 30%,
a sum of pearlite and cementite: 0% to 10%, and
a remainder including hard ferrite,
wherein soft ferrite is defined as ferrite that does not contain retained austenite in the grains, and wherein hard ferrite is defined as ferrite containing retained austenite in the grains,
in the ⅛ to ⅜ thickness range, a number proportion of retained austenite having an aspect ratio of 2.0 or more in the total retained austenite is 50% or more,
when a region having a hardness of 80% or less of a hardness of the ⅛ to ⅜ thickness range is defined as a soft layer, the soft layer having a thickness of 1 to 100 μm from the surface in a sheet thickness direction is present,
in ferrite contained in the soft layer, a volume fraction of grains having an aspect ratio of 3.0 or more is 50% or more,
a volume fraction of retained austenite in the soft layer is 80% or less of the volume fraction of the retained austenite in the ⅛ to ⅜ thickness range, and
when an emission intensity at a wavelength indicating Si is analyzed in the sheet thickness direction from the surface by a radio-frequency glow discharge analysis method, a peak of the emission intensity at the wavelength indicating Si appears in a range of more than 0.2 μm and 10.0 μm or less from the surface.

2. The steel sheet according to claim 1,
wherein the chemical composition includes one or more of
Ti: 0.001% to 0.300%,
V: 0.001% to 1.00%,
Nb: 0.001% to 0.100%,
Cr: 0.001% to 2.00%,
Ni: 0.001% to 2.00%,
Cu: 0.001% to 2.00%,
Co: 0.001% to 2.00%,
Mo: 0.001% to 1.00%,
W: 0.001% to 1.00%,
B: 0.0001% to 0.0100%,
Sn: 0.001% to 1.00%,
Sb: 0.001% to 1.00%,
Ca: 0.0001% to 0.0100%,
Mg: 0.0001% to 0.0100%,
Ce: 0.0001% to 0.0100%,
Zr: 0.0001% to 0.0100%,
La: 0.0001% to 0.0100%,
Hf: 0.0001% to 0.0100%,
Bi: 0.0001% to 0.0100%, and
REM: 0.0001% to 0.0100%.

3. The steel sheet according to claim 1,
wherein the chemical composition satisfies Expression (i), $$Si+0.1\times Mn+0.6\times Al \geq 0.35 \ldots \quad (i)$$

wherein Si, Mn, and Al in the Expression (i) are, respectively, amounts of corresponding elements by mass %.

4. The steel sheet according to claim 2,
wherein the chemical composition satisfies Expression (i), $$Si+0.1\times Mn+0.6\times Al \geq 0.35 \ldots \quad (i)$$

wherein Si, Mn, and Al in the Expression are, respectively, amounts of corresponding elements by mass %.

5. The steel sheet according to claim 1,
wherein the steel sheet has a hot-dip galvanized layer or an electrogalvanized layer on the surface.

6. The steel sheet according to claim 2,
wherein the steel sheet has a hot-dip galvanized layer or an electrogalvanized layer on the surface.

7. The steel sheet according to claim 3,
wherein the steel sheet has a hot-dip galvanized layer or an electrogalvanized layer on the surface.

8. The steel sheet according to claim 4,
wherein the steel sheet has a hot-dip galvanized layer or an electrogalvanized layer on the surface.

9. A method for manufacturing the steel sheet according to claim 1, the method comprising:
performing a first heat treatment satisfying (a) to (e) on a hot-rolled steel sheet which has been obtained by hot-rolling a slab having the chemical composition according to claim 1 and pickling, or on a cold-rolled steel sheet which has been obtained by cold-rolling the hot-rolled steel sheet,
wherein:
(a) an atmosphere containing 0.1 vol % or more of $H_2$ and satisfying Expression (ii) is adopted from 650° C. to a first heating temperature, wherein said first heating temperature is defined as a temperature in a range of from $A_{c3}$−30° C. to 1000° C.,
(b) holding is performed at said first heating temperature for 1 second to 1000 seconds,
(c) heating is performed such that an average heating rate in a temperature range from 650° C. to said first heating temperature is 0.5° C./s to 500° C./s, and
(d) after holding at said first heating temperature, cooling is performed such that an average cooling rate in a temperature range from 700° C. to Ms is 5° C./s or more,
(e) cooling at the average cooling rate of 5° C./s or more to a cooling stop temperature of Ms or lower; and
thereafter performing a second heat treatment satisfying (A) to (E),
wherein:
(A) an atmosphere containing 0.1 vol % or more of $H_2$ and 0.020 vol % or less of $O_2$ and having a log($PH_2O/PH_2$)

satisfying Expression (iii) is adopted from 650° C. to a second heating temperature, wherein said second heating temperature is defined as a temperature in a range of from $A_{c1}+25°$ C. to $A_{c3}-10°$ C., (B) holding is performed at said second heating temperature for 1 second to 1000 seconds, (C) heating is performed such that an average heating rate from 650° C. to said second heating temperature is 0.5° C./s to 500° C./s, (D) cooling is performed such that an average cooling rate in a temperature range of 700° C. to 600° C. is 3° C./s or more, and (E) after cooling at the average cooling rate of 3° C./s or more, holding is performed at 300° C. to 480° C. for 10 seconds or more, $$\log(PH_2O/PH_2) < -1.1 \ldots \quad \text{(ii)}$$

$$-1.1 \leq \log(PH_2O/PH_2) \leq -0.07 \ldots \quad \text{(iii)}$$

wherein, in Expression (ii) and Expression (iii), $PH_2O$ represents a partial pressure of water vapor, and $PH_2$ represents a partial pressure of hydrogen.

10. The method for manufacturing the steel sheet according to claim 9, wherein hot-dip galvanizing is performed after the cooling in (D).

* * * * *